(12) United States Patent
Kawakami et al.

(10) Patent No.: US 9,774,034 B2
(45) Date of Patent: Sep. 26, 2017

(54) LITHIUM-MANGANESE COMPOSITE OXIDE AND SECONDARY BATTERY

(71) Applicant: SEMICONDUCTOR ENERGY LABORATORY CO., LTD., Atsugi-shi, Kanagawa-ken (JP)

(72) Inventors: Takahiro Kawakami, Kanagawa (JP); Mayumi Mikami, Kanagawa (JP); Shunsuke Adachi, Kanagawa (JP); Shuhei Yoshitomi, Kanagawa (JP); Teruaki Ochiai, Kanagawa (JP); Yumiko Yoneda, Kanagawa (JP); Yohei Momma, Kanagawa (JP); Satoshi Seo, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 107 days.

(21) Appl. No.: 14/553,674

(22) Filed: Nov. 25, 2014

(65) Prior Publication Data
US 2015/0155556 A1    Jun. 4, 2015

(30) Foreign Application Priority Data

Nov. 29, 2013   (JP) .................................. 2013-247345
Oct. 17, 2014   (JP) .................................. 2014-212170

(51) Int. Cl.
*H01M 4/02* (2006.01)
*H01M 4/36* (2006.01)
(Continued)

(52) U.S. Cl.
CPC ........ *H01M 4/505* (2013.01); *C01G 45/1228* (2013.01); *C01G 53/50* (2013.01);
(Continued)

(58) Field of Classification Search
CPC ............ H01B 1/02; H01B 1/08; H01M 4/525; H01M 4/366
(Continued)

(56) References Cited

U.S. PATENT DOCUMENTS 4,302,518 A   11/1981   Goodenough et al.
4,668,595 A    5/1987   Yoshino et al.
(Continued)

FOREIGN PATENT DOCUMENTS

CN    102244256 A  *  11/2011  .......... H01M 10/052
CN    102544572 A      7/2012
(Continued)

OTHER PUBLICATIONS

Wei ("Spherical concentration-gradient LiMn1.87Ni0.13O4 spinel as a high performance cathode for lithium ion batteries." J. Mater. Chem. A, 2013,1, 4010-4016, online Jan. 29, 2013).*
(Continued)

*Primary Examiner* — Tri V Nguyen
(74) *Attorney, Agent, or Firm* — Nixon Peabody LLP; Jeffrey L. Costellia

(57) ABSTRACT

To increase the amount of lithium ions that can be received in and released from a positive electrode active material to achieve high capacity and high energy density of a secondary battery. A lithium manganese oxide particle includes a first region and a second region. The valence number of manganese in the first region is lower than the valence number of manganese in the second region. The lithium manganese oxide has high structural stability and high capacity characteristics.

14 Claims, 39 Drawing Sheets

(51) Int. Cl.
*H01M 4/505* (2010.01)
*H01M 4/525* (2010.01)
*H01M 4/58* (2010.01)
*C01G 45/12* (2006.01)
*C01G 53/00* (2006.01)

(52) U.S. Cl.
CPC .......... *H01M 4/366* (2013.01); *H01M 4/525* (2013.01); *H01M 4/5825* (2013.01); *C01P 2002/80* (2013.01); *C01P 2002/85* (2013.01); *C01P 2002/89* (2013.01); *C01P 2004/04* (2013.01)

(58) Field of Classification Search
USPC ........ 252/500–519.1, 182.1; 429/218.1, 223, 429/224
See application file for complete search history.

(56) References Cited

U.S. PATENT DOCUMENTS

| | | |
|---|---|---|
| 5,240,794 A | 8/1993 | Thackeray et al. |
| 5,443,929 A | 8/1995 | Yamamoto et al. |
| 5,783,333 A | 7/1998 | Mayer |
| 5,834,139 A | 11/1998 | Shodai et al. |
| 5,871,866 A | 2/1999 | Barker et al. |
| 5,910,382 A | 6/1999 | Goodenough et al. |
| 6,085,015 A | 7/2000 | Armand et al. |
| 6,514,640 B1 | 2/2003 | Armand et al. |
| 7,303,840 B2 | 12/2007 | Thackeray et al. |
| 7,393,476 B2 | 7/2008 | Shiozaki et al. |
| 7,892,679 B2 | 2/2011 | Shimizu et al. |
| 8,557,440 B2 | 10/2013 | Yu et al. |
| 8,945,772 B2 | 2/2015 | Kawakami et al. |
| 2001/0010807 A1 | 8/2001 | Matsubara |
| 2002/0195591 A1 | 12/2002 | Ravet et al. |
| 2004/0234857 A1 | 11/2004 | Shiozaki et al. |
| 2006/0051671 A1 | 3/2006 | Thackeray et al. |
| 2006/0051673 A1* | 3/2006 | Johnson ............. C01G 45/1221 429/224 |
| 2006/0121352 A1 | 6/2006 | Kejha et al. |
| 2006/0188780 A1 | 8/2006 | Fujii et al. |
| 2007/0026315 A1 | 2/2007 | Lampe-Onnerud et al. |
| 2007/0148546 A1 | 6/2007 | Shimizu et al. |
| 2007/0160906 A1 | 7/2007 | Tooyama et al. |
| 2007/0212609 A1 | 9/2007 | Iwami |
| 2008/0160410 A1* | 7/2008 | Sun ..................... H01M 4/0471 429/220 |
| 2009/0087731 A1 | 4/2009 | Fukui et al. |
| 2009/0123813 A1 | 5/2009 | Chiang et al. |
| 2009/0220862 A1 | 9/2009 | Toyama et al. |
| 2010/0233542 A1 | 9/2010 | Endo et al. |
| 2011/0229757 A1 | 9/2011 | Kawakami et al. |
| 2012/0164532 A1 | 6/2012 | Senoue et al. |
| 2012/0315544 A1 | 12/2012 | Yasuda et al. |
| 2013/0273428 A1 | 10/2013 | Kawakami et al. |
| 2014/0131633 A1 | 5/2014 | Ito et al. |
| 2014/0332715 A1 | 11/2014 | Kawakami et al. |
| 2015/0014605 A1 | 1/2015 | Kawakami et al. |
| 2015/0099178 A1 | 4/2015 | Kawakami et al. |
| 2016/0308202 A1* | 10/2016 | Kuriyama ............. H01M 4/131 |

FOREIGN PATENT DOCUMENTS

| | | | |
|---|---|---|---|
| CN | 103035922 A | 4/2013 | |
| CN | 103236537 A * | 7/2013 | ............. C01G 45/00 |
| CN | 103326016 A * | 9/2013 | ............. H01M 4/505 |
| JP | 08-037007 A | 2/1996 | |
| JP | 11-025983 A | 1/1999 | |
| JP | 2005-332629 A | 12/2005 | |
| JP | 2008-511960 | 4/2008 | |
| JP | 2008-166156 A | 7/2008 | |
| JP | 2009-179501 A | 8/2009 | |
| JP | 2012-084257 A | 4/2012 | |
| JP | 2012-142157 A | 7/2012 | |
| JP | 2013-004234 A | 1/2013 | |
| JP | 2013-093319 A | 5/2013 | |
| JP | 2013-100197 A | 5/2013 | |
| JP | 2014-237579 A | 12/2014 | |
| KR | 2013-0038160 A | 4/2013 | |
| WO | WO-2014/181885 | 11/2014 | |

OTHER PUBLICATIONS

Li ("Novel approach to preparation of LiMn2O4 core/LiNixMn2-xO4 shell composite." Appl Surf Sc, 255, 5651-5655, online Nov. 1, 2008).*

Myung ("Spherical core-shell Li[(Li0.05Mn0.95)0.8(Ni0.25Mn0.75)0.2]2O4 spinels as high performance cathodes for lithium batteries." Energy Environ. Sci., 2011, 4, 935, pub 2011).*

M. Thackeray et al., "$Li_2MnO_3$-stabilized $LiMO_2$ (M=Mn, Ni, Co) electrodes for lithium-ion batteries", *J. Mater. Chem.*, Apr. 20, 2007, vol. 17 (2007), Issue 30, pp. 3112-3125.

Mukai K. et al., "Magnetic properties of the chemically delithiated $Li_xMn_2O_4$ with $0.07 \leq x \leq 1$", *J. Solid State Chem.*, Mar. 21, 2011, vol. 184 (2011), Issue 5, pp. 1096-1104.

S. Lee et al., "Antiferromagnetic ordering in $Li_2MnO_3$ single crystals with a two-dimensional honeycomb lattice", *J. Phys.: Condens. Matter*, Oct. 23, 2012, vol. 24 (2012), Issue 45, article id. 456004.

Z. Wang et al., "EELS analysis of cation valence states and oxygen vacancies in magnetic oxides", *Micron*, Apr. 5, 2000, vol. 31 (2000), Issue 5, pp. 571-580.

H. Tan et al., "Oxidation state and chemical shift investigation in transition metal oxides by EELS", *Ultramicroscopy*, Mar. 10, 2012, vol. 116 (2012), pp. 24-33.

V. Berbenni et al., "Thermogravimetry and X-ray diffraction study of the thermal decomposition processes in $Li_2CO_3$—$MnCO_3$ mixtures", *J. Anal. Appl. Pyrolysis*, Oct. 22, 2001, vol. 62 (2002), Issue 1, pp. 45-62.

D. Y. W. Yu et al., "Electrochemical Activities in $Li_2MnO_3$", *J. Electrochem. Soc.*, Apr. 3, 2009, vol. 156 (2009), Issue 6, pp. A417-A424.

Oishi M. et al., "Charge compensation mechanisms in $Li_{1.16}Ni_{0.15}Co_{0.19}Mn_{0.50}O_2$ positive electrode material for Li-ion batteries analyzed by a combination of hard and soft X-ray absorption near edge structure", *J. Power Sources*, Aug. 28, 2012, vol. 222 (2013), Issue 15, pp. 45-51.

International Search Report (Application No. PCT/IB2014/066276) Dated Mar. 10, 2015.

Written Opinion (Application No. PCT/IB2014/066276) Dated Mar. 10, 2015.

* cited by examiner

Charging

FIG. 22A
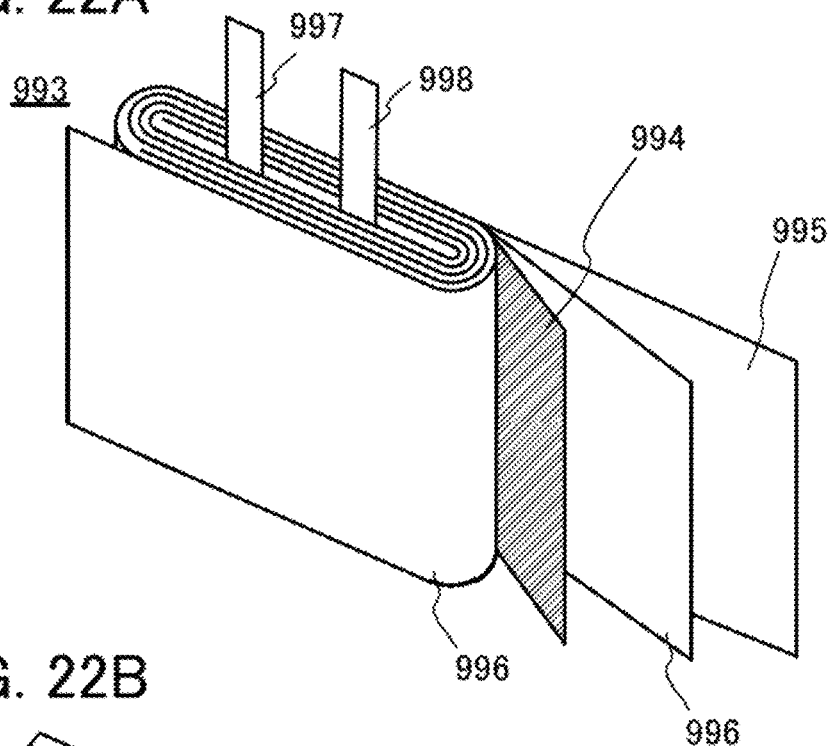
FIG. 22B
FIG. 22C
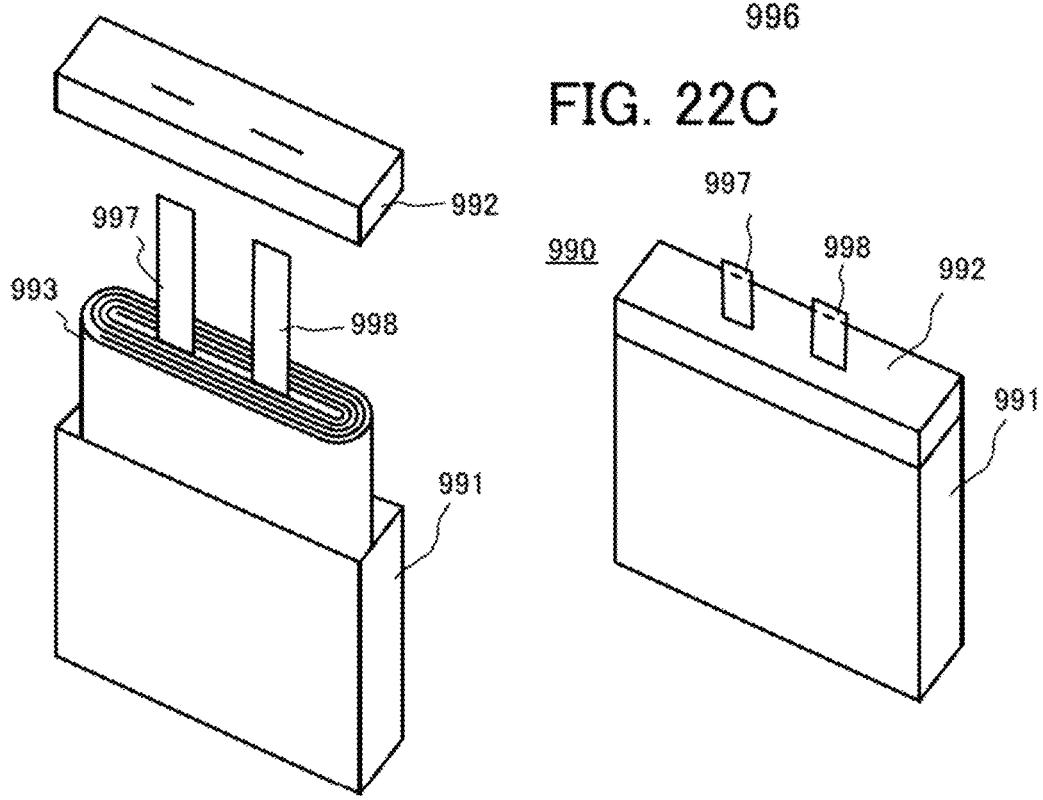

FIG. 24A1
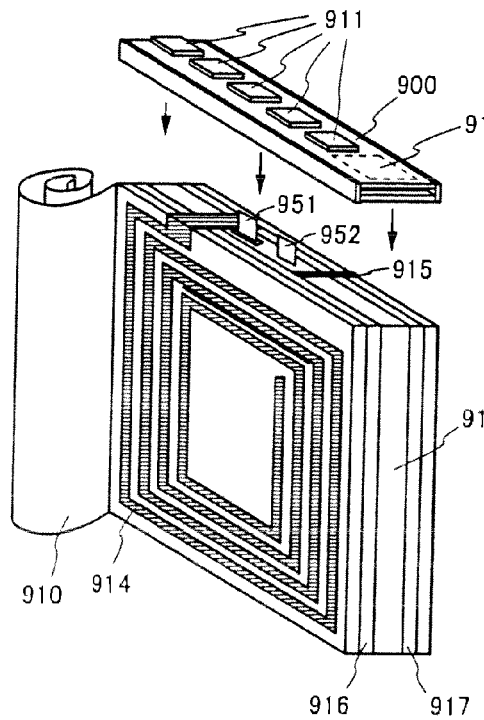
FIG. 24A2
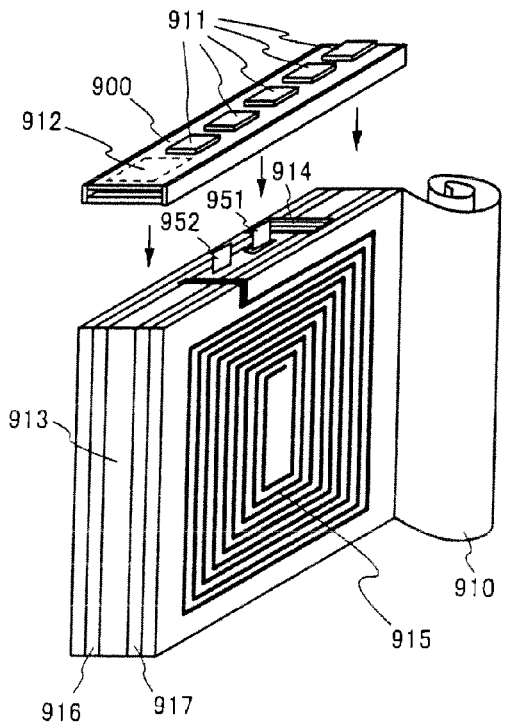
FIG. 24B1
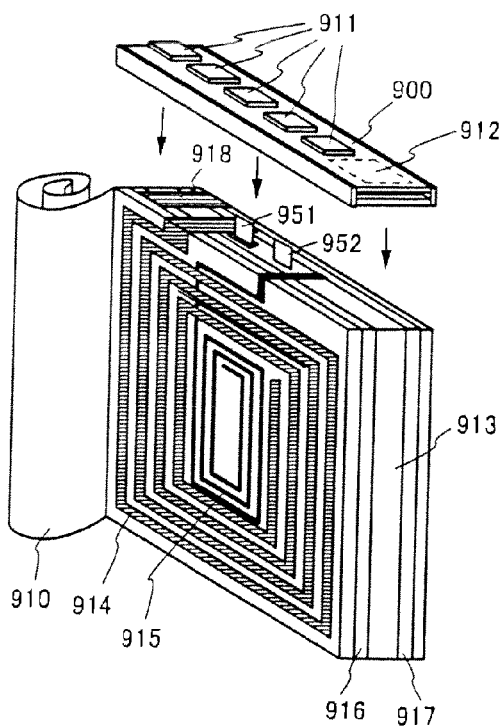
FIG. 24B2
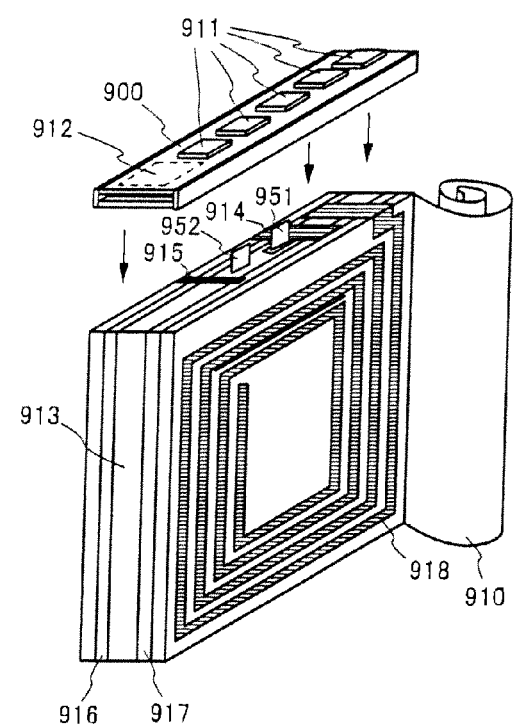

LITHIUM-MANGANESE COMPOSITE OXIDE AND SECONDARY BATTERY

TECHNICAL FIELD

The present invention relates to an object, a method, or a manufacturing method. In addition, the present invention relates to a process, a machine, manufacture, and a composition of matter. In particular, one embodiment of the present invention relates to a semiconductor device, a display device, a light-emitting device, a power storage device, a memory device, a driving method thereof, or a manufacturing method thereof. In particular, one embodiment of the present invention relates to a structure of a secondary battery and a method for manufacturing the secondary battery. In particular, one embodiment of the present invention relates to a positive electrode active material of a lithium-ion secondary battery.

BACKGROUND ART

Examples of the secondary battery include a nickel-metal hydride battery, a lead-acid battery, and a lithium-ion secondary battery.

Such secondary batteries are used as power sources in portable information terminals typified by mobile phones. In particular, lithium-ion secondary batteries have been actively developed because capacity thereof can be increased and size thereof can be reduced.

In a lithium-ion secondary battery, as a positive electrode active material, a phosphate compound having an olivine structure and containing lithium and iron, manganese, cobalt, or nickel, such as lithium iron phosphate ($LiFePO_4$), lithium manganese phosphate ($LiMnPO_4$), lithium cobalt phosphate ($LiCoPO_4$), and lithium nickel phosphate ($LiNiPO_4$), which are disclosed in Patent Document 1, has been known.

In addition, as described in Non-Patent Document 1 and Non-Patent Document 2, a method for measuring the valence of a metal in a metal oxide, and the like by electron energy loss spectroscopy (EELS) is known.

REFERENCE

Patent Document

[Patent Document 1] Japanese Published Patent Application No. H11-025983

Non-Patent Document

[Non-Patent Document 1] Z. L. Wang et al., "EELS analysis of cation valence states and oxygen vacancies in magnetic oxides", Micron, 2000, vol. 31, pp. 571-580

[Non-Patent Document 2] H. Tan et al., "Oxidation state and chemical shift investigation in transition metal oxides by EELS", Ultramicroscopy, 2012, vol. 116, pp. 24-33

DISCLOSURE OF INVENTION

An object of one embodiment of the present invention is to increase the amount of lithium ions in a positive electrode active material. Another object of one embodiment of the present invention is to increase the amount of lithium ions that can be received in and released from a positive electrode active material to increase the capacity of a secondary battery. Another object of one embodiment of the present invention is to increase the amount of lithium ions that can be received in and released from a positive electrode active material to achieve high energy density. Another object of one embodiment of the present invention is to increase the amount of lithium ions that can be received in and released from a positive electrode active material to achieve high capacity and high energy density of a secondary battery.

Another object of one embodiment of the present invention is to provide a positive electrode active material that can be manufactured at low cost.

Furthermore, high ionic conductivity and high electric conductivity are required as properties of a positive electrode active material of a lithium-ion secondary battery. Thus, another object of one embodiment of the present invention is to provide a positive electrode active material having high ionic conductivity and high electric conductivity.

Another object of one embodiment of the present invention is to increase the capacity of a positive electrode of a lithium-ion secondary battery. Another object of one embodiment of the present invention is to achieve high energy density of a positive electrode of a lithium-ion secondary battery. Another object of one embodiment of the present invention is to achieve high capacity and high energy density of a positive electrode of a lithium-ion secondary battery. Another object of one embodiment of the present invention is to achieve high capacity and high energy density of a lithium-ion secondary battery.

Another object of one embodiment of the present invention is to provide a novel material. Another object of one embodiment of the present invention is to provide a novel positive electrode active material. Another object of one embodiment of the present invention is to provide a novel battery. An object of one embodiment of the present invention is to provide a novel power storage device. Another object of one embodiment of the present invention is to provide a novel lithium-ion secondary battery.

Note that the description of these objects does not impede the existence of other objects. In one embodiment of the present invention, there is no need to achieve all the above objects. Other objects will be apparent from and can be derived from the description of the specification, the drawings, the claims, and the like.

A lithium manganese oxide particle is an oxide containing at least lithium and manganese. A lithium manganese oxide particle may contain another metal, or an element such as silicon or phosphorus. In the case where a lithium manganese oxide particle is used as a positive electrode material of a lithium-ion secondary battery, the amount of lithium in the lithium manganese oxide particle may be decreased by release of lithium in charging.

One embodiment of the present invention is a lithium manganese oxide particle including a first region and a second region. The valence number of manganese in the first region is lower than the valence number of manganese in the second region.

The valence number of manganese in the first region is preferably higher than or equal to 1.5 and lower than or equal to 5. The valence number of manganese in the second region is preferably higher than or equal to 2. The lithium manganese oxide particle is preferably granular. In the case where the lithium manganese oxide particle is a primary particle, the second region is preferably on an inner side of the first region. The first region is preferably within 30 nm of a surface of the particle.

One embodiment of the present invention is a lithium manganese oxide particle including a first region and a second region. The ratio of the integral intensity of $L_3$ peak to the integral intensity of $L_2$ peak ($L_3/L_2$) of manganese that is obtained by electron energy loss spectroscopy in the first region is greater than that in the second region.

In the first region, the ratio of the integral intensity of $L_3$ peak to the integral intensity of $L_2$ peak ($L_3/L_2$) of manganese that is obtained by electron energy loss spectroscopy is preferably greater than 1 and less than or equal to 10. In the second region, the ratio of the integral intensity of $L_3$ peak to the integral intensity of $L_2$ peak ($L_3/L_2$) of manganese that is obtained by electron energy loss spectroscopy is preferably less than or equal to 4. The lithium manganese oxide particle is preferably granular. In the case where the lithium manganese oxide particle is a primary particle, the second region is preferably on an inner side of the first region. The first region is preferably within 30 nm of a surface of the particle.

In any of the above structures, a composition of the lithium manganese oxide particle is preferably represented by $Li_aMn_bM_cO_d$ in which an element represented by M is silicon, phosphorus, or a metal element other than lithium and manganese, and is more preferably nickel. Furthermore, it is preferable that a, b, and c satisfy $0 \leq a/(b+c) < 2$ and $0.05 \leq c/b \leq 1$.

In any of the above structures, it is preferable that the lithium manganese oxide include nickel and that the valence number of nickel in the first region be lower than the valence number of nickel in the second region.

One embodiment of the present invention is a lithium manganese oxide particle including nickel. The valence number of manganese of the lithium manganese oxide particle is higher than or equal to 3.5. The valence number of nickel of the lithium manganese oxide particle is lower than or equal to 3. The valences of manganese and nickel are obtained from X-ray absorption near edge structure.

One embodiment of the present invention is a secondary battery using any of the above lithium manganese oxide particles as a positive electrode active material.

The amount of lithium ions in a positive electrode active material can be increased according to one embodiment of the present invention. The amount of lithium ions that can be received in and released from a positive electrode active material can be increased to increase the capacity of a secondary battery according to one embodiment of the present invention. The amount of lithium ions that can be received in and released from a positive electrode active material can be increased to achieve high energy density according to one embodiment of the present invention. The amount of lithium ions that can be received in and released from a positive electrode active material can be increased to achieve high capacity and high energy density of a secondary battery according to one embodiment of the present invention.

A positive electrode active material that can be formed at low cost can be provided according to one embodiment of the present invention.

A positive electrode active material having high ionic conductivity and high electric conductivity can be provided according to one embodiment of the present invention.

The capacity of a positive electrode of a lithium-ion secondary battery can be increased according to one embodiment of the present invention. High energy density of a positive electrode of a lithium-ion secondary battery can be achieved according to one embodiment of the present invention. High capacity and high energy density of a positive electrode of a lithium-ion secondary battery can be achieved according to one embodiment of the present invention. High capacity and high energy density of a lithium-ion secondary battery can be achieved according to one embodiment of the present invention.

A novel material can be provided according to one embodiment of the present invention. A novel positive electrode active material can be provided according to one embodiment of the present invention. A novel battery can be provided according to one embodiment of the present invention. A novel power storage device can be provided according to one embodiment of the present invention. A novel lithium-ion secondary battery can be provided.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF DRAWINGS

In the accompanying drawings:

FIGS. 22A to 22C illustrate an example of a power storage device;

FIGS. 24A1, 24A2, 24B1, and 24B2 illustrate examples of a power storage device;

BEST MODE FOR CARRYING OUT THE INVENTION

Figure 1:
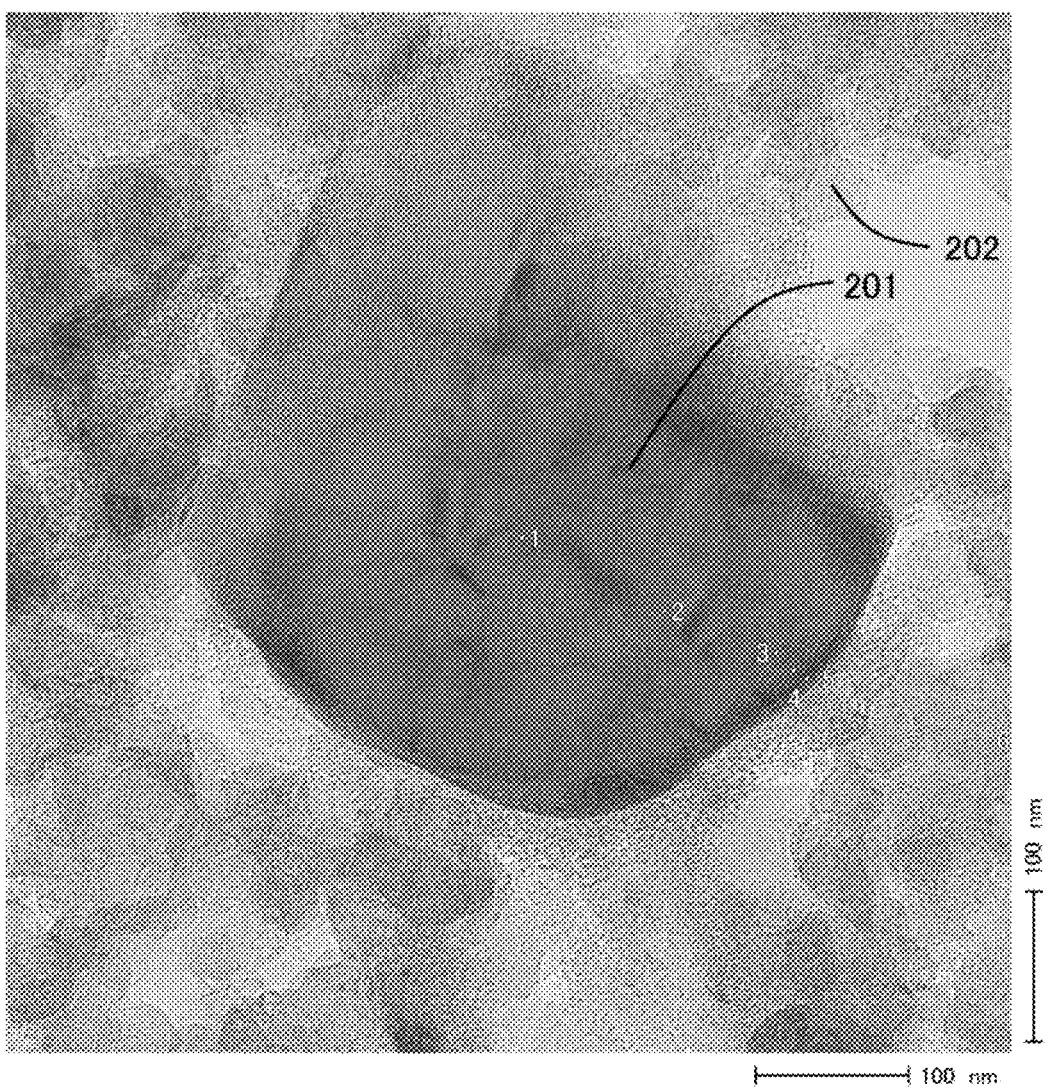
FIG. 1 is a photograph taken with a transmission electron microscope.

Embodiments and examples of the present invention will be described below in detail with reference to the drawings. However, the present invention is not limited to the description below, and it is easily understood by those skilled in the art that modes and details disclosed herein can be modified in various ways. Further, the present invention is not construed as being limited to description of the embodiments and the examples.

Embodiment 1

The inventors have found that high capacity can be obtained when a lithium manganese oxide composite particle of this embodiment is used as a positive electrode material of a lithium-ion secondary battery. Furthermore, the inventors also have found that the lithium manganese oxide particle of this embodiment has a distribution of the valences of manganese.

One embodiment of the present invention is a lithium manganese oxide composite particle including a first region and a second region. The valence number of manganese in the first region is lower than the valence number of manganese in the second region.

One embodiment of the present invention is a lithium manganese oxide particle including a first region and a second region. The valence number of manganese in the first region is preferably higher than or equal to 1.5 and lower than or equal to 5, more preferably higher than or equal to 2 and lower than or equal to 4, still more preferably higher than or equal to 2.5 and lower than 4. The valence number of manganese in the second region is preferably higher than or equal to 2, more preferably higher than or equal to 3, still more preferably higher than or equal to 4.

[Estimation of Lithium Manganese Oxide Particle by Electron Energy Loss Spectroscopy]

The valence numbers of manganese can be calculated from the measurement results of electron energy loss spectroscopy (EELS). For example, FIG. 2b in Non-Patent Document 1 shows the EELS measurement results of manganese compounds with different valence numbers of manganese. According to Non-Patent Document 1, the ratios of $L_3$ peak to $L_2$ peak obtained by EELS of manganese compounds with different valence numbers of manganese vary. Here, $L_3$ peak is a peak of the transition from $2p^{3/2}$ to $3d^{3/2}$ and $3d^{5/2}$, and $L_2$ peak is a peak of the transition from $2p^{1/2}$ to $3d^{3/2}$. Assume that the ratios of the integral intensity of $L_3$ peak to the integral intensity of $L_2$ peak (hereinafter referred to as $L_3/L_2$) of manganese of compounds MnO (bivalent), $Mn_3O_4$ (8/3-valent), $Mn_2O_3$ (trivalent), and $MnO_2$ (tetravalent) that are obtained by EELS are w, x, y, and z, respectively. When w $L_3/L_2$ is satisfied, the valence number of manganese can be estimated to be lower than or equal to 2. When x<$L_3/L_2$≤w is satisfied, the valence number of manganese can be estimated to be higher than or equal to 2 and lower than 8/3. When y<$L_3/L_2$≤x is satisfied, the valence number of manganese can be estimated to be higher than or equal to 8/3 and lower than 3. When z<$L_3/L_2$≤y is satisfied, the valence number of manganese can be estimated to be higher than or equal to 3 and lower than 4. When $L_3/L_2$≤z is satisfied, the valence number of manganese can be estimated to be higher than or equal to 4. In addition, for example, Non-Patent Document 2 discloses that the $L_3/L_2$ ratios of MnO, $Mn_3O_4$, $Mn_2O_3$, and $MnO_2$ are 3.98, 2.75, 2.50, and 1.85, respectively.

The case where the valence number is not an integer is described here. In the case where the valence number of an element is between 2 and 3, such as 8/3, for example, the bivalent element and the trivalent element, which have different valence numbers, may coexist. The valence number of the element is the average of the different valence numbers. For example, when the ratio of the bivalent element to the trivalent element is 1:2, the average valence number is calculated as follows: (2×1+3×2)÷3=8/3. In the case where the valence number is not an integer, for example, when the valence number is between 1 and 2 or between 3 and 4, the average valence number can be calculated in the same manner.

One embodiment of the present invention is a lithium manganese oxide particle including a first region and a second region. For example, in the first region, $L_3/L_2$ of manganese obtained by EELS is preferably greater than or equal to the average value of $L_3/L_2$ of $MnO_2$ and $L_3/L_2$ of $Mn_2O_3$ and less than or equal to $L_3/L_2$ of MnO. In the second region, for example, $L_3/L_2$ of manganese obtained by EELS is preferably less than or equal to the average value of $L_3/L_2$ of $MnO_2$ and $L_3/L_2$ of $Mn_2O_3$.

One embodiment of the present invention is a lithium manganese oxide particle including a first region and a second region. For example, in the first region, $L_3/L_2$ of manganese obtained by EELS is preferably greater than or equal to 1 and less than or equal to 10, more preferably greater than or equal to 1.7 and less than or equal to 10, still more preferably greater than or equal to 2.15 and less than or equal to 4.1. In the second region, for example, $L_3/L_2$ is preferably less than or equal to 4, more preferably less than or equal to 2.7, still more preferably less than or equal to 2.1.

Here, $L_3/L_2$ obtained by EELS depends on the way to remove background. The measurement data described in this specification was obtained by removing background mainly using a Hartree-Slater cross section.

Here, the $L_3$ peak of manganese is a peak derived from the transition from $2p^{3/2}$ to $3d^{3/2}$ and $3d^{5/2}$, and the $L_2$ peak of manganese is a peak derived from the transition from $2p^{1/2}$ to $3d^{3/2}$.

The $L_2$ peak of manganese means a local maximum point in a range of the energy loss of greater than or equal to 648.5 eV and less than or equal to 665 eV. The $L_3$ peak of manganese means a local maximum point in a range of the energy loss of greater than or equal to 635 eV and less than or equal to 648.5 eV. The integral intensity of a peak means an intensity obtained by integrating the intensity in a certain range with a peak value as the center. For example, the integral intensity in the range with a peak value of 644 eV and a width of 8 eV is obtained by integrating the peak intensity in a range of 644 eV±4 eV.

Figure 31A:
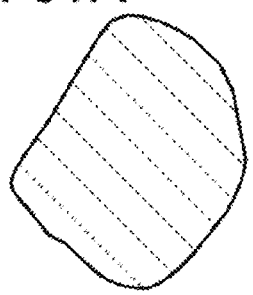
FIGS. 31A to 31F each illustrate a shape of a particle.
Figure 31B:
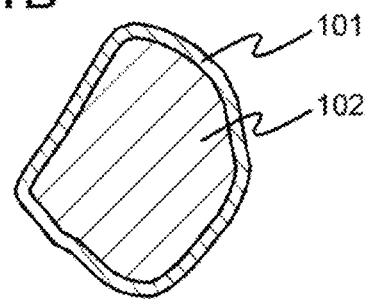
Figure 31C:
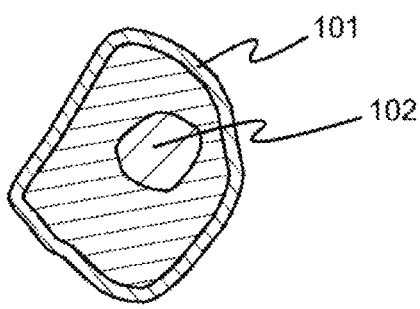
Figure 31D:
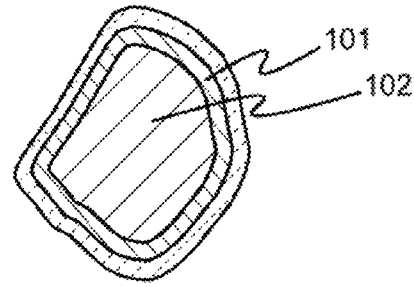
Figure 31E:
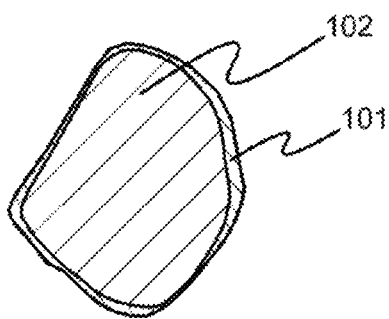
Figure 31F:
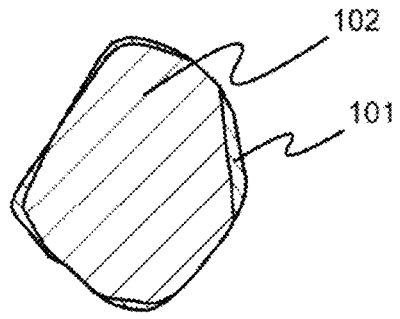

Here, the lithium manganese oxide particle is preferably granular. A particle here has a cross-sectional shape illustrated in FIG. 31A, for example. FIGS. 31B, 31C, 31D, 31E, and 31F each illustrate an example in which a particle includes a first region 101 and a second region 102. The second region 102 is inside the first region 101. The first region 101 may be in contact with a surface of the particle as illustrated in FIG. 31B and the like, and is not necessarily in contact with a surface of the particle as illustrated in FIG. 31D. The first region 101 and the second region 102 are not necessarily in contact with each other as illustrated in FIG. 31C. The thickness of the first region 101 is not necessarily uniform and may be partly small as illustrated in FIG. 31E. The first region 101 is not necessarily continuous as illustrated in FIG. 31F.

Figure 32A:
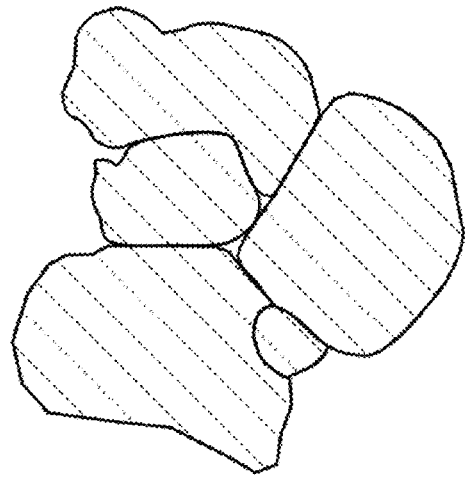
FIGS. 32A to 32D each illustrate a shape of a particle.
Figure 32B:
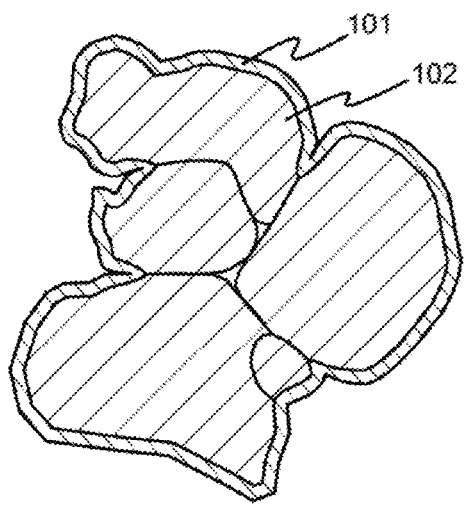
Figure 32C:
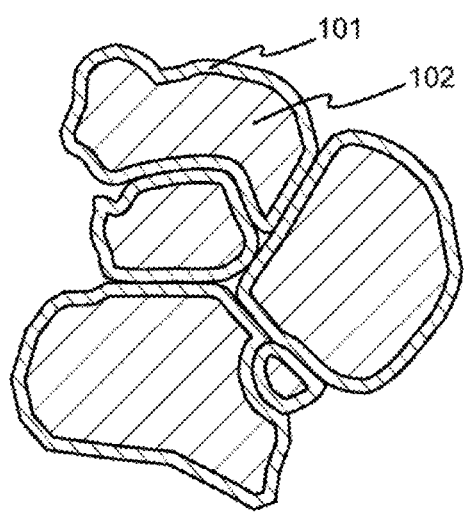
Figure 32D:
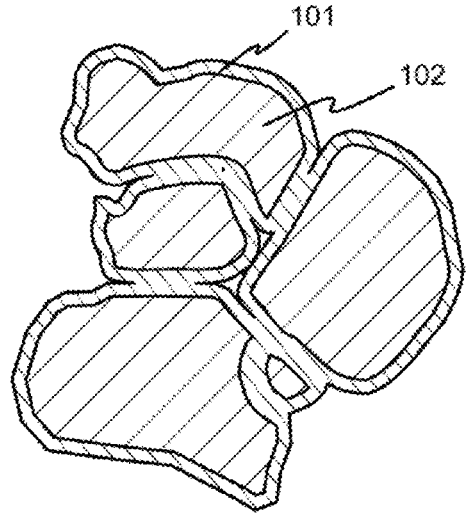

The particle may be a group of a plurality of grains as illustrated in FIG. 32A, for example. FIGS. 32B, 32C, and 32D each illustrate an example in which the particle illustrated in FIG. 32A includes the first region 101 and the second region 102. As illustrated in FIG. 32B, the first region 101 may be provided on the outer side of a group of a plurality of grains and is not necessarily provided in a portion where some of the plurality of grains are in contact with each other, for example. As illustrated in FIG. 32C, the first region 101 may be provided on the outer side of each grain, for example. FIG. 32D illustrates an example in which part of the first region 101 in FIG. 32C is connected to another part of the first region 101.

Note that the structure and shape of a particle are not limited to the ones illustrated in FIGS. 31A to 31F and FIGS. 32A to 32D.

In the case where the lithium manganese complex oxide particle is a particle, the second region is preferably on inner side of the first region. Alternatively, the first region is preferably within 30 nm, more preferably 20 nm, still more preferably 10 nm of a surface of the lithium manganese oxide particle. The first region may be in contact with the surface of the particle.

As a general example of a battery reaction in a lithium-ion secondary battery, an example of a battery reaction in which $LiFePO_4$ is used for a positive electrode and graphite is used for a negative electrode is described with Chemical Reaction Formula 1 and Chemical Reaction Formula 2. In the case of charging the lithium-ion secondary battery, a reaction of Chemical Reaction Formula 1 occurs at the positive electrode.

$LiFePO_4 \rightarrow FePO_4 + Li^+ + e^-$ [Chemical Reaction Formula 1]

In Chemical Reaction Formula 1, an oxidation reaction occurs. The valence number of iron in the left side of Chemical Reaction Formula 1 is 2 and the valence number of iron in the right side is 3, which means that the valence number of iron increases through the reaction.

A reaction of Chemical Reaction Formula 2 occurs at a negative electrode.

$xC + Li^+ + e^- \rightarrow LiC_x$, $x \geq 6$ [Chemical Reaction Formula 2]

In the case of discharging the lithium-ion secondary battery, a reaction of Chemical Reaction Formula 3 occurs at the positive electrode.

$FePO_4 + Li^+ + e^- \rightarrow LiFePO_4$ [Chemical Reaction Formula 3]

In Chemical Reaction Formula 3, a reduction reaction occurs. The valence number of iron in the left side of Chemical Reaction Formula 3 is 3 and the valence number of iron in the right side is 2, which means that the valence number of iron decreases through the reaction.

A reaction of Chemical Reaction Formula 4 occurs at the negative electrode.

$LiC_x \rightarrow xC + Li^+ + e^-$, $x \geq 6$ [Chemical Reaction Formula 4]

In other words, the oxidation reaction expressed by Chemical Reaction Formula 1 occurs at the positive electrode in charging and the reduction reaction expressed by Chemical Reaction Formula 3 occurs at the positive electrode in discharging.

Next, the valence of manganese after charging and after discharging in the lithium manganese oxide particle of one embodiment of the present invention is described. A secondary battery using the lithium manganese oxide particle of one embodiment of the present invention as a positive electrode active material is charged and discharged, and EELS measurement is performed after charging and discharging. The measurement result indicates that in the second region, $L_3/L_2$ of manganese after discharging slightly decreases as compared to that after charging. Accordingly, it is estimated that the valence number of manganese increases, i.e., an oxidation reaction of manganese occurs. This indicates that an element other than manganese takes part in a reduction reaction at the positive electrode. A reduction reaction of nickel, charge compensation by another element, or the like probably contributes to the battery reaction. Note that the detailed result will be described in Example below.

In contrast, the EELS measurement result indicates that in the first region, the valence number of manganese increases in charging and decreases in discharging. Therefore, in the first region, an oxidation reaction of manganese probably contributes to charging and a reduction reaction of manganese probably contributes to discharging.

In a lithium-ion secondary battery, lithium is extracted form a positive electrode active material in an oxidation reaction and lithium is inserted into the positive electrode active material in a reduction reaction. For example, a bonding state of an oxygen atom might change in a battery reaction by charge compensation of an oxygen atom. In that case, extraction of lithium might be less likely to occur than in the case of extraction of lithium by a change in the valence number of manganese or nickel. In such a case, first, extraction of lithium occurs by an increase in the valence number of manganese, for example, in the first region positioned on the outer side of the particle, that is, positioned closer to an electrolyte. Then, extraction of lithium is likely to occur owing to the concentration gradient of lithium in the vicinity of a boundary between the second region and the first region, which may lead to charging in the second region. A region where charging and discharging are likely to occur is positioned on the outer side of a particle, whereby charging and discharging on the inner side thereof possibly easily occur. As a result, high capacity can be obtained. In addition, the charging and discharging rate can be increased.

In the case where the capacity per unit weight or volume in the second region is higher than that in the first region, the first region enables the second region with high capacity to be charged and discharged more stably, so that high capacity can be easily obtained. Accordingly, a power storage device with high capacity can be obtained. In addition, a long-life power storage device can be obtained owing to stable charging and discharging. Furthermore, the reliability of a power storage device can be improved.

Figure 4:
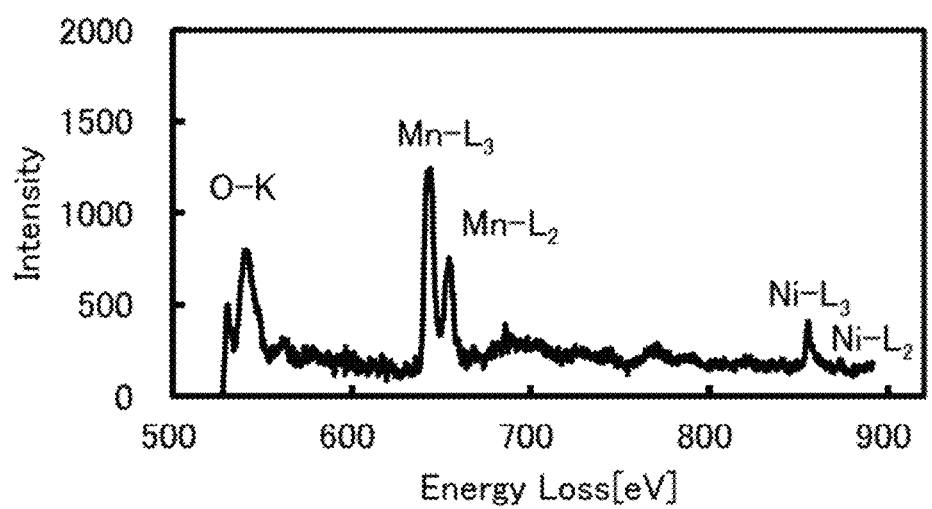
FIG. 4 is a graph showing the measurement result of electron energy loss spectroscopy.

FIG. 4 shows an example of the measurement result of electron energy loss spectroscopy (EELS).

From the data shown in FIG. 4, the integral intensities of the $L_3$ peak and the $L_2$ peak of manganese are calculated, and $L_3/L_2$ is 2.1. The background is removed using a Hartree-Slater cross section. Note that the EELS measurement results of the lithium manganese oxide particle of one embodiment of the present invention are described in detail in Example 2 below.

The valence number of manganese can be estimated from the obtained $L_3/L_2$. For example, according to Non-Patent Document 1, the valence number of manganese is higher than 3 and lower than 4.

[Synthesis of Lithium Manganese Oxide Particle]

A method for forming a lithium manganese oxide particle of one embodiment of the present invention will be described in detail below. Here, an example in which the lithium manganese oxide particle includes lithium, manganese, oxygen, and nickel as a fourth element is described; however, the fourth element is not limited to nickel. The fourth element can be selected from silicon, phosphorus, and a metal other than lithium and manganese. The lithium manganese oxide particle may include five or more elements.

Here, the composition of the lithium manganese oxide particle including lithium, manganese, oxygen, and the fourth element is represented by $Li_aMn_bM_cO_d$ (M is Si, P, or a metal other than Li and Mn). For example, a/(b+c) is preferably greater than or equal to 0 and less than 2, more preferably greater than or equal to 0 and less than or equal to 1.85, still more preferably greater than or equal to 0 and less than or equal to 1.7. For example, c/b is preferably greater than or equal to 0.05 and less than or equal to 1, more preferably greater than or equal to 0.1 and less than or equal to 0.8, still more preferably greater than or equal to 0.2 and less than or equal to 0.6.

First, starting materials are weighed. As a sample 1, lithium manganese oxide including nickel is formed using $Li_2CO_3$, $MnCO_3$, and NiO as starting materials. As a comparative sample, $Li_2MnO_3$ is formed.

For easy understanding, the case where the fourth element, i.e., nickel, is not used is described first. In order to form $Li_2MnO_3$ with a layered rock-salt structure, which is a comparative sample, the molar ratio of lithium to manganese is set to 2:1, whereas in order to form the lithium manganese oxide particle of one embodiment of the present invention, the molar ratio of lithium to manganese is preferably slightly changed from the above molar ratio. For example, the molar ratio of lithium to manganese may be set to 1.68:1.1242. In the case where $Li_2CO_3$ and $MnCO_3$ are used as starting materials, the starting materials are weighed so that the molar ratio of $Li_2CO_3$ to $MnCO_3$ is 0.84:1.1242.

Next, the case where nickel is used as the fourth element is described. In this case, some of manganese atoms are substituted with nickel atoms. When the molar ratio of Mn to Ni is 0.8062:0.318, for example, the molar ratio of Li to Mn and Ni is set to 1.68:0.8062:0.318. In the case where $Li_2CO_3$, $MnCO_3$, and NiO are used as starting materials, the starting materials are weighed so that the molar ratio of $Li_2CO_3$ to $MnCO_3$ and NiO is 0.84:0.8062:0.318.

In this embodiment, the starting materials of the lithium manganese oxide particle of one embodiment of the present invention are weighed so that the molar ratio of $Li_2CO_3$ to $MnCO_3$ and NiO is 0.84:0.8062:0.318 and starting materials of $Li_2MnO_3$ of the comparative sample are weighed so that the molar ratio of $Li_2CO_3$ to $MnCO_3$ is 1:1.

Next, acetone is added to the powder of these materials, and then, they are mixed in a ball mill to prepare mixed powder.

After that, heating is performed to volatilize acetone, so that a mixed material is obtained.

Then, the mixed material is put into a crucible, and is fired at a temperature higher than or equal to 600° C. and lower than or equal to 1300° C., preferably higher than or equal to 800° C. and lower than or equal to 1100° C. in the air for 5 hours to 20 hours inclusive to synthesize a novel material.

Subsequently, grinding is performed to separate the sintered particles. For the grinding, acetone is added and then mixing is performed in a ball mill.

After the grinding, heating was performed to volatilize acetone, and then, vacuum drying is performed. After the vacuum drying, firing may further be performed. The firing may be performed at a temperature higher than or equal to 500° C. and lower than or equal to 700° C. for 1 hour to 10 hours inclusive, for example.

Through the above steps, a powdery novel material is obtained.

Although $Li_2CO_3$, $MnCO_3$, and NiO are used as the starting materials in this embodiment, the materials are not limited thereto and can be other materials.

Although an example of application to a lithium-ion secondary battery is described in this embodiment, one embodiment of the present invention is not limited to this example. One embodiment of the present invention can be used for various power storage devices. Application to a variety of secondary batteries such as a lead-acid storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, and an air battery is also possible. Application to a variety of power storage devices such as a primary battery, a capacitor, and a lithium-ion capacitor is also possible.

This embodiment can be implemented in appropriate combination with any of the other embodiments.

Embodiment 2

In this embodiment, a structure of a storage battery using, as a positive electrode active material, the lithium manganese oxide particle formed by the method described in Embodiment 1, and examples of an electronic device including the storage battery are described with reference to FIGS. 13A to 13C, FIGS. 14A and 14B, FIG. 15, FIGS. 16A and 16B, FIGS. 17A and 17B, FIGS. 18A and 18B, FIGS. 19A to 19C, FIGS. 20A to 20D, FIGS. 21A to 21C, FIGS. 22A to 22C, FIGS. 23A and 23B, FIGS. 24A1, 24A2, 24B1, and 24B2, FIGS. 25A and 25B, FIGS. 26A to 26G, FIGS. 27A to 27C, FIG. 28, FIGS. 29A and 29B, and FIG. 30.

[Coin-Type Storage Battery]

Figure 13A:
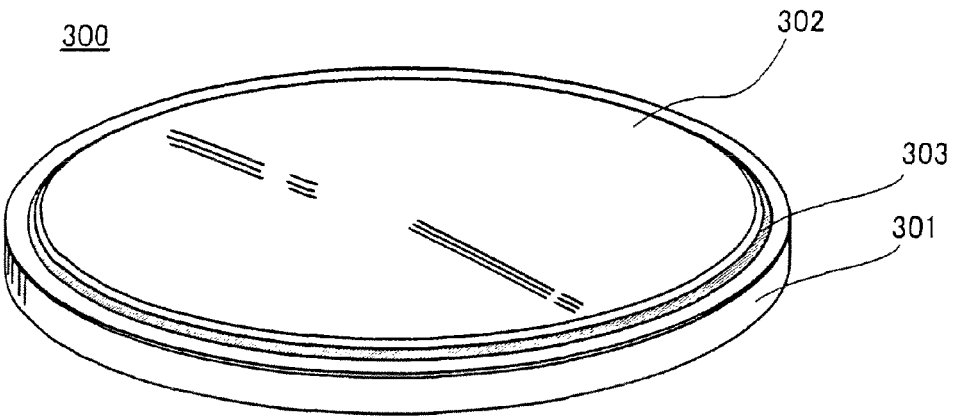
FIGS. 13A to 13C illustrate a coin-type storage battery.
Figure 13B:
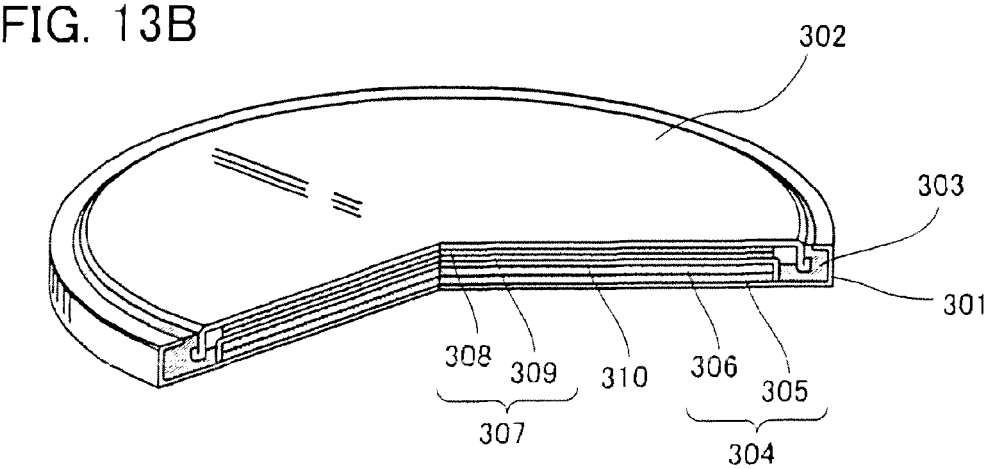

FIG. 13A is an external view of a coin-type (single-layer flat type) storage battery, and FIG. 13B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The positive electrode active material layer 306 may further include a binder for increasing adhesion of positive electrode active materials, a conductive additive for increasing the conductivity of the positive electrode active material layer, and the like in addition to the positive electrode active materials. As a conductive additive, a material that has a large specific surface area is preferably used; for example, acetylene black (AB) can be used. Alternatively, a carbon material such as a carbon nanotube, graphene, or fullerene can be used. A surface of the positive electrode current collector 305 may be covered with an undercoat before the positive electrode active material layer 306 is formed. The undercoat here refers to a film formed over a current collector before applying slurry onto the current collector for the purpose of reducing the interface resistance between the current collector and the positive electrode active material layer 306, i.e., the active material, the conductive additive, or the like or increasing the adhesion between the current collector and the positive electrode active material layer 306, i.e., the active material, the binder, the conductive additive, or the like. Note that the undercoat is not necessarily formed in a film shape, and may be formed in an island shape. For the undercoat, a carbon material can be used, for example. Examples of the carbon material are graphite, carbon black such as AB or ketjen black, and carbon nanotubes. Forming the undercoat over the current collector can reduce the resistance at the interface between the current collector and the positive electrode active material layer 306 formed later, and/or can increase adhesion between the current collector and the positive electrode active material layer 306. Note that if there is no problem with the adhesion between the current collector and the positive electrode active material layer 306, the electrode strength, and the interface resistance between the current collector and the electrode, it is not necessary to form the undercoat on the current collector.

A negative electrode 307 includes a negative electrode current collector 308 and a negative electrode active material layer 309 provided in contact with the negative electrode current collector 308. The negative electrode active material layer 309 may further include a binder for increasing adhesion of negative electrode active materials, a conductive additive for increasing the conductivity of the negative electrode active material layer, and the like in addition to the negative electrode active materials. A separator 310 and an electrolyte (not illustrated) are provided between the positive electrode active material layer 306 and the negative electrode active material layer 309. A surface of the negative electrode current collector 308 may be covered with an undercoat before the negative electrode active material layer 309 is formed. The description of the positive electrode 304 is referred to for the undercoat.

A material with which lithium can be dissolved and precipitated or a material into and from which lithium ions can be inserted and extracted can be used for the negative electrode active materials used for the negative electrode active material layer 309; for example, a lithium metal, a carbon-based material, and an alloy-based material can be used. The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (approximately 0.1 V to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active materials, an alloy-based material which enables charge-discharge reactions by an alloying reaction and a dealloying reaction with lithium can be used. In the case where carrier ions are lithium ions, a material containing at least one of Ga, Al, Si, Ge, Sn, Pb, Sb, Bi, Ag, Au, Zn, Cd, In, and the like can be used, for example. Such elements have higher capacity than carbon. In particular, silicon has a significantly high theoretical capacity of 4200 mAh/g. For this reason, silicon is preferably used for the negative electrode active materials. Examples of the alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Here, SiO is a film that contains silicon at higher proportion than $SiO_2$ does.

Alternatively, for the negative electrode active materials, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), and molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The positive electrode current collector 305 and the negative electrode current collector 308 can each be formed using a highly conductive material which is not alloyed with a carrier ion of, for example, lithium, such as a metal typified by stainless steel, gold, platinum, zinc, iron, nickel, copper, aluminum, titanium, tantalum, and manganese or an alloy thereof. Alternatively, an aluminum alloy to which an element which improves heat resistance, such as silicon, titanium, neodymium, scandium, and molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors can each have a foil-like shape, a plate-like shape (sheet-like shape), a net-like shape, a cylindrical shape, a coil shape, a punching-metal shape, an expanded-metal shape, or the like as appropriate. The current collectors each preferably have a thickness of 10 μm to 30 μm inclusive.

Any of the positive electrode active materials described in Embodiment 1 can be used for the positive electrode active material layer 306.

As the separator 310, an insulator such as cellulose (paper), polyethylene with pores, or polypropylene with pores can be used.

As an electrolyte in an electrolytic solution, a material which contains metal serving as a carrier ion is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone or two or more of them may be used in an appropriate combination and in an appropriate ratio.

Note that when carrier ions are alkali metal ions other than lithium ions, or alkaline-earth metal ions, instead of lithium in the above lithium salts, an alkali metal (e.g., sodium or potassium) or an alkaline-earth metal (e.g., calcium, strontium, barium, beryllium, or magnesium) may be used for the electrolyte.

For a solvent of the electrolytic solution, a material with carrier ion mobility is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage is improved. Furthermore, the storage battery can be thinner and more lightweight. Typical examples of gelled high-molecular materials include a silicone gel, an acrylic gel, an acrylonitrile gel, polyethylene oxide, polypropylene oxide, a fluorine-based polymer, and the like. Alternatively, the use of one or more of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging and others.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

For the positive electrode can 301 and the negative electrode can 302, a metal having corrosion resistance to an electrolytic solution, such as nickel, aluminum, or titanium, an alloy of such metals, or an alloy of such a metal and another metal (stainless steel or the like) can be used. Alternatively, it is preferable to cover the positive electrode can 301 and the negative electrode can 302 with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 13B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

Here, a current flow in charging a battery will be described with reference to FIG. 13C. When a battery using lithium is regarded as a closed circuit, lithium ions transfer and a current flows in the same direction. Note that in the battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode or a negative electrode.

Figure 13C:
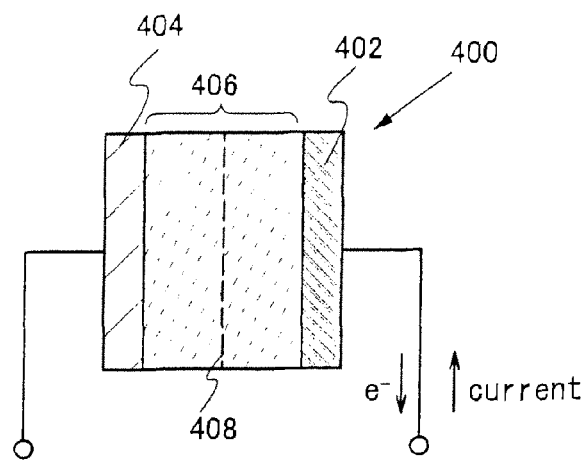

Two terminals in FIG. 13C are connected to a charger, and a storage battery 400 is charged. As the charge of the storage battery 400 proceeds, a potential difference between electrodes increases. The positive direction in FIG. 13C is the direction in which a current flows from one terminal outside the storage battery 400 to a positive electrode 402, flows from the positive electrode 402 to a negative electrode 404 in the storage battery 400, and flows from the negative electrode 404 to the other terminal outside the storage battery 400. In other words, a current flows in the direction of a flow of a charging current.

[Cylindrical Storage Battery]

Figure 14A:
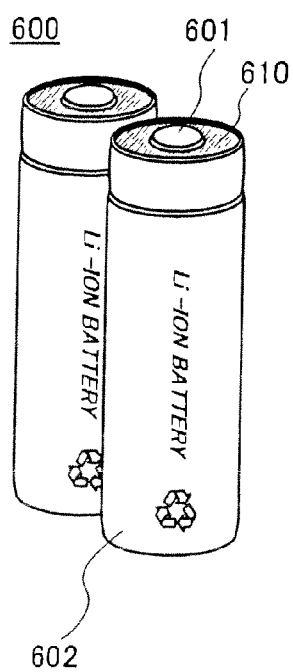
FIGS. 14A and 14B illustrate a cylindrical storage battery.

Next, an example of a cylindrical storage battery will be described with reference to FIGS. 14A and 14B. As illustrated in FIG. 14A, a cylindrical storage battery 600 includes a positive electrode cap (battery cap) 601 on the top surface and a battery can (outer can) 602 on the side surface and bottom surface. The positive electrode cap (battery cap) 601 and the battery can (outer can) 602 are insulated from each other by a gasket (insulating gasket) 610.

Figure 14B:
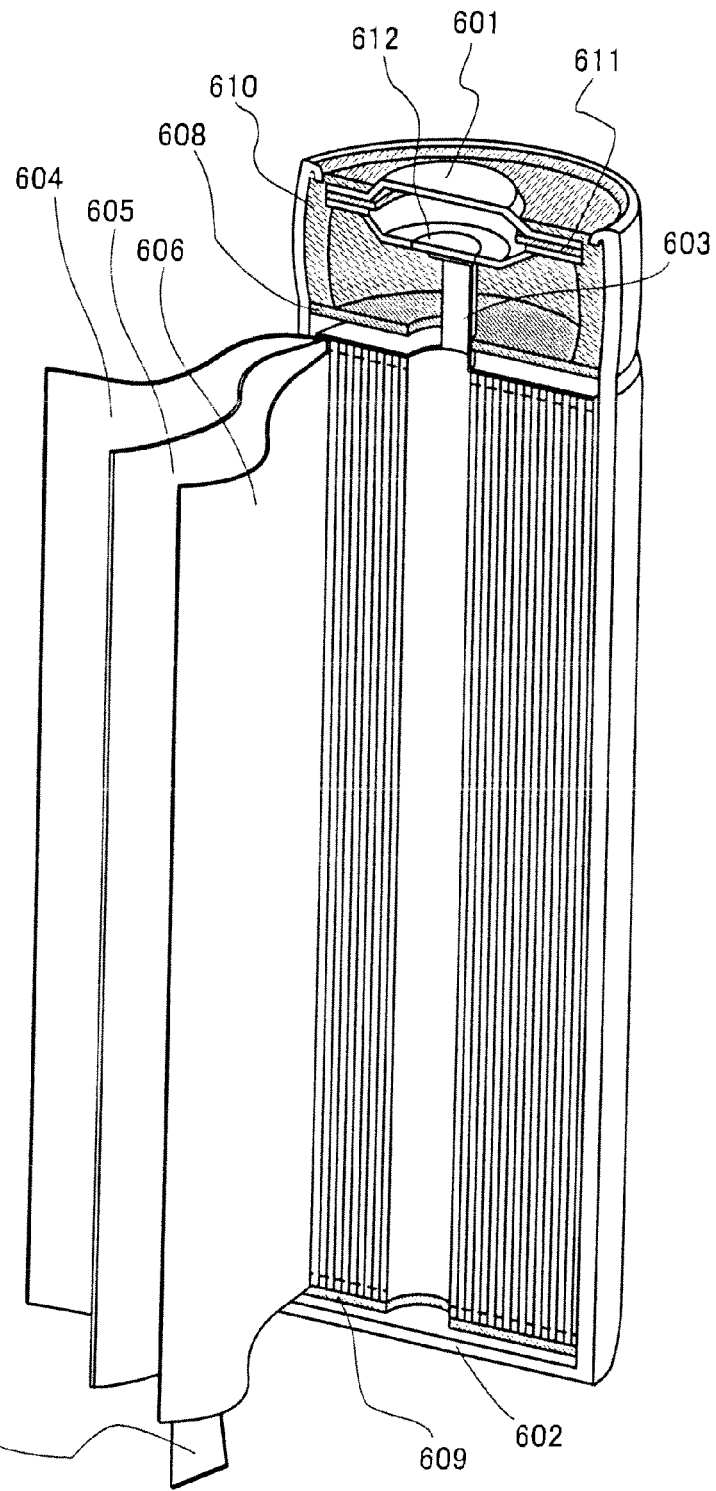

FIG. 14B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having corrosion resistance to an electrolytic solution, such as nickel, aluminum, or titanium, an alloy of such a metal, or an alloy of such a metal and another metal (e.g., stainless steel) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a nonaqueous electrolytic solution (not illustrated) is injected inside the battery can 602 provided with the battery element. As the nonaqueous electrolytic solution, a nonaqueous electrolytic solution which is similar to that of the above coin-type storage battery can be used.

Although the positive electrode 604 and the negative electrode 606 can be formed in a manner similar to that of the positive electrode and the negative electrode of the coin-type storage battery described above, the difference lies in that, since the positive electrode and the negative electrode of the cylindrical storage battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic or the like can be used for the PTC element.

[Thin Storage Battery]

Next, an example of a thin storage battery will be described below. When a flexible thin storage battery is used in an electronic device at least part of which is flexible, the storage battery can be bent as the electronic device is bent.

Figure 15:
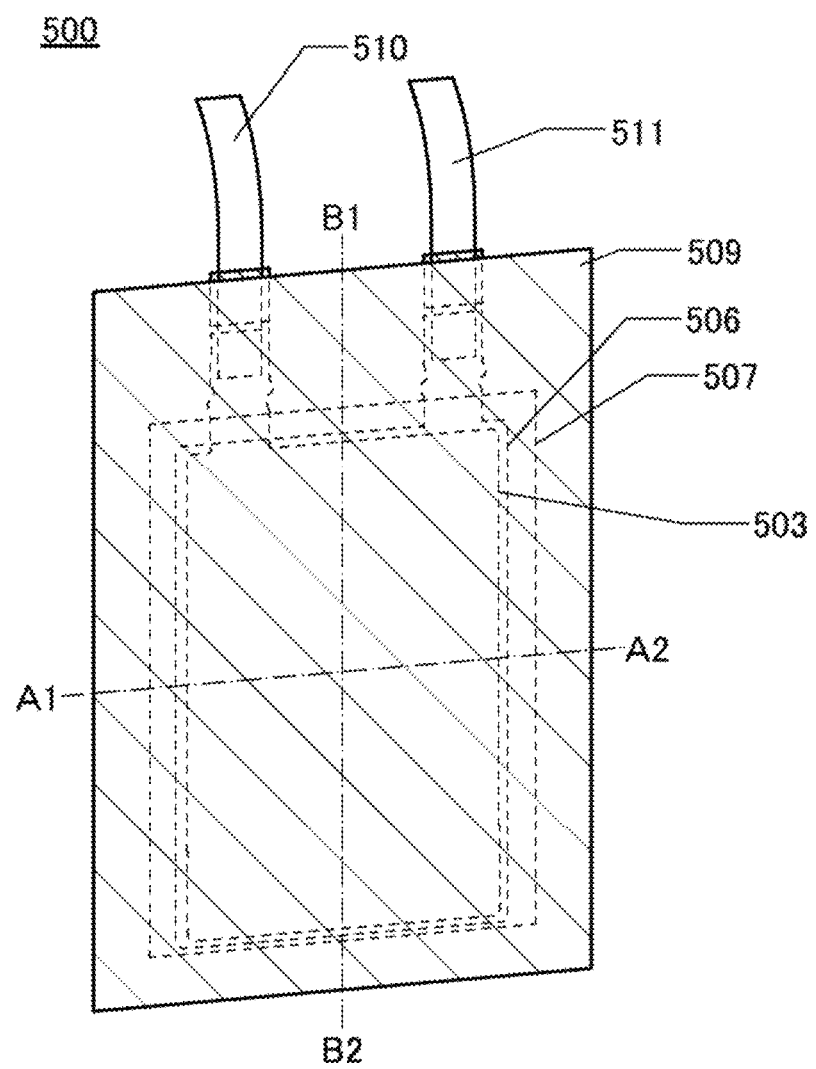
FIG. 15 illustrates a thin storage battery.
Figure 16A:
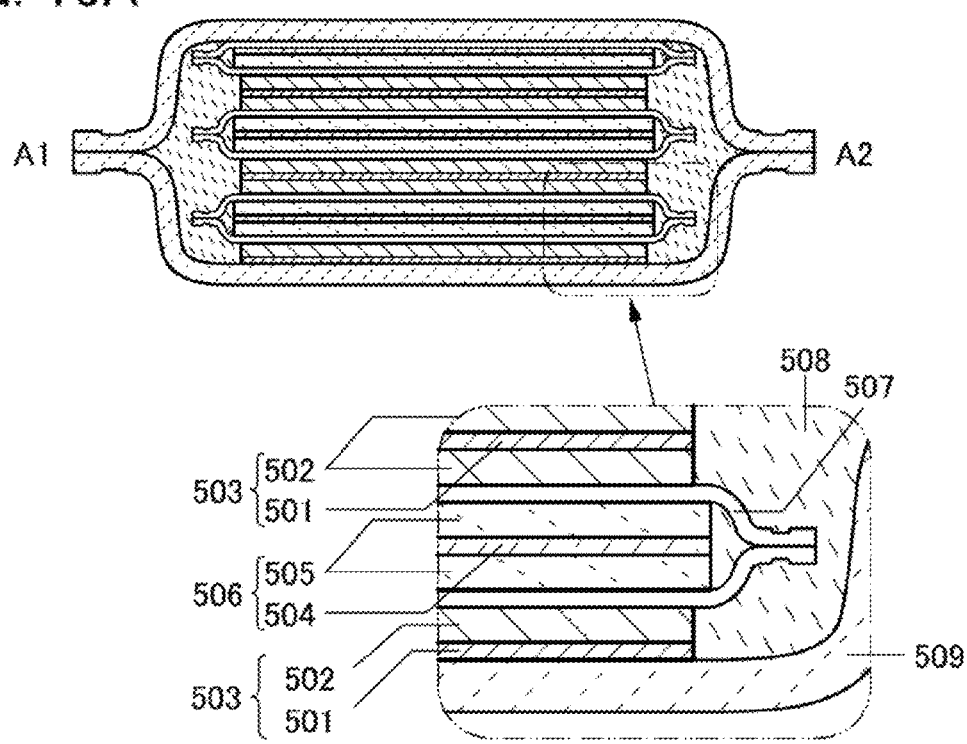
FIGS. 16A and 16B illustrate a thin storage battery.
Figure 16B:
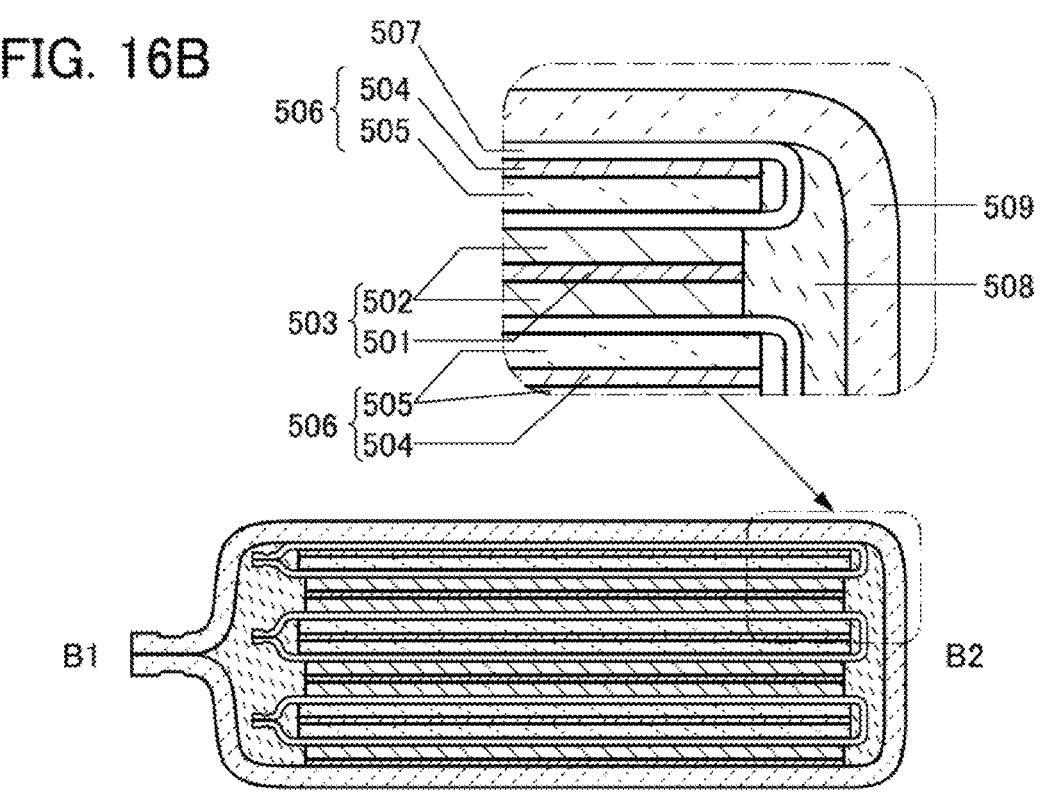

FIG. 15 is an external view of a thin storage battery 500. FIG. 16A is a cross-sectional view taken along dashed-dotted line A1-A2 in FIG. 15 and FIG. 16B is a cross-sectional view taken along dashed-dotted line B1-B2 in FIG. 15. The thin storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The exterior body 509 is filled with the electrolytic solution 508. The lithium manganese oxide composite particle described in Embodiment 1 can be used as a positive electrode active material of the positive electrode active material layer 502.

Figure 17A:
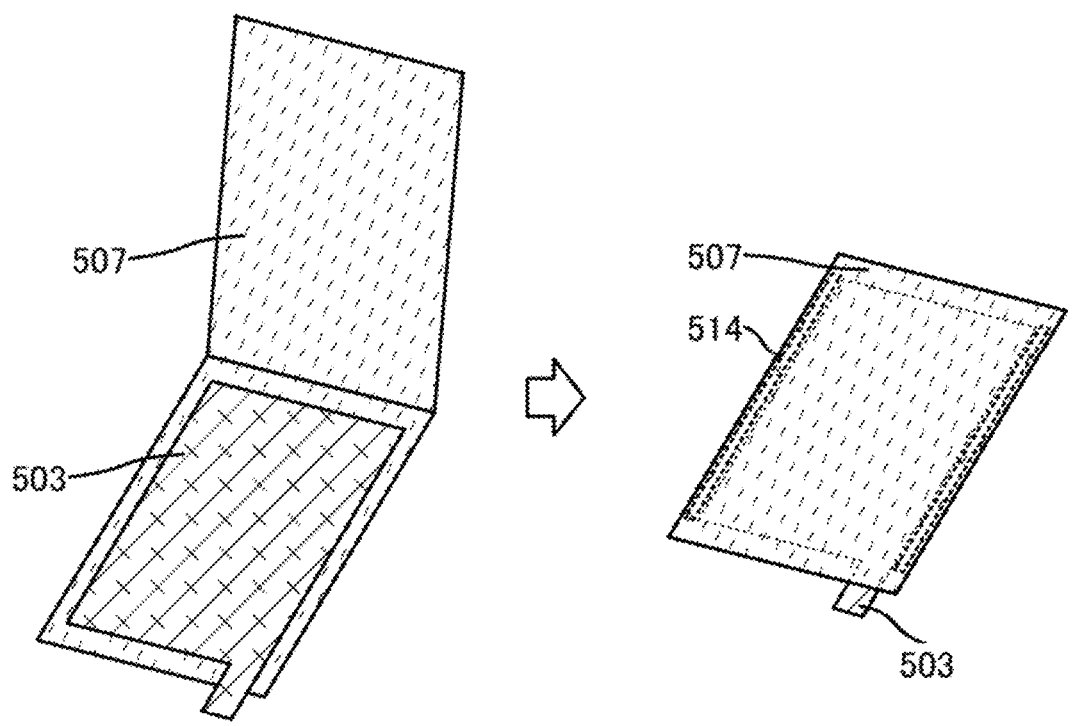
FIGS. 17A and 17B illustrate a thin storage battery.
Figure 17B:
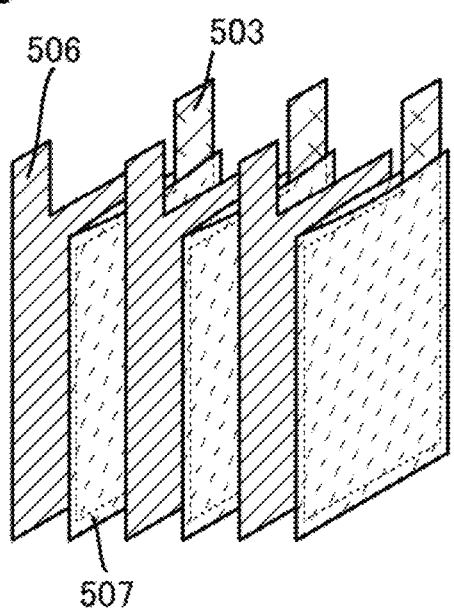

The separator 507 is preferably processed into a bag-like shape to surround one of the positive electrode 503 and the negative electrode 506. For example, as illustrated in FIG. 17A, the separator 507 is folded in two so that the positive electrode 503 is sandwiched, and sealed with a sealing member 514 in a region outside the region overlapping with the positive electrode 503; thus, the positive electrode 503 can be surely surrounded by the separator 507. Then, as illustrated in FIG. 17B, the positive electrodes 503 surrounded by the separators 507 and the negative electrodes 506 are alternately stacked and provided in the exterior body 509; thus, the thin storage battery 500 can be formed.

Figure 18A:
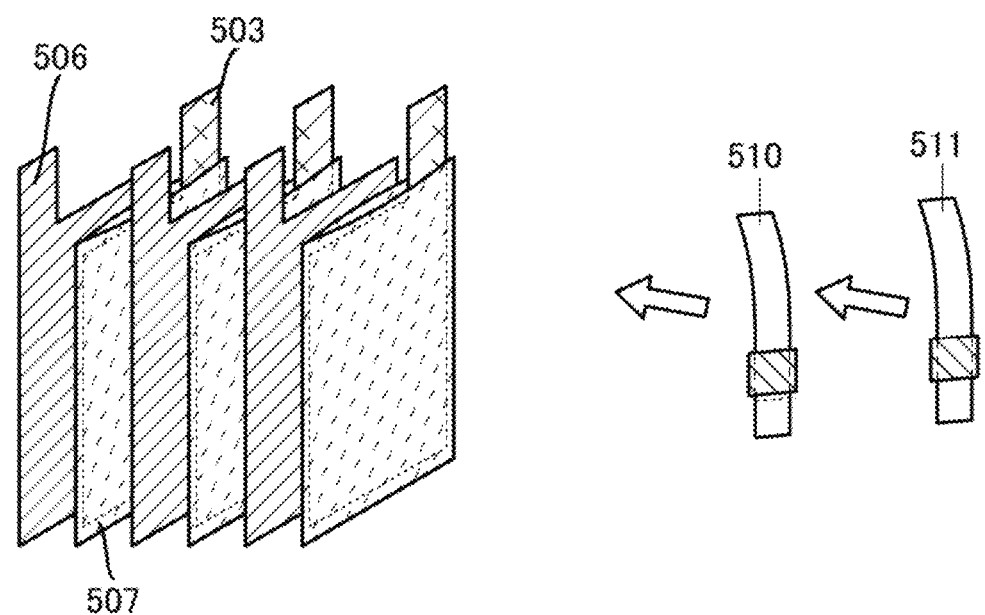
FIGS. 18A and 18B illustrate a thin storage battery.
Figure 18B:
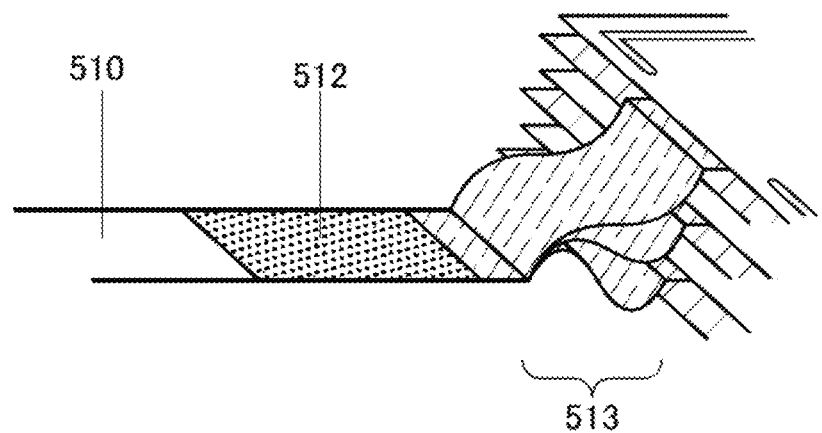

FIGS. 18A and 18B illustrate an example in which a current collector is welded to a lead electrode. An example in which the positive electrode current collector 501 is welded to a positive electrode lead electrode 510 is described. The positive electrode current collector 501 is welded to the positive electrode lead electrode 510 in a welding region 512 by ultrasonic welding or the like. Furthermore, the positive electrode current collector 501 includes a bent portion 513 as illustrated in FIG. 18B, so that stress due to external force applied after manufacture of the storage battery 500 can be relieved and the reliability of the storage battery 500 can be thus increased.

In the thin storage battery 500 illustrated in FIG. 15 and FIGS. 16A and 16B, the positive electrode current collector 501 and the negative electrode current collector 504 are welded to the positive electrode lead electrode 510 and a negative electrode lead electrode 511, respectively, by ultrasonic welding, and the positive electrode lead electrode 510 and the negative electrode lead electrode 511 are exposed to the outside of the exterior body 509. The positive electrode current collector 501 and the negative electrode current collector 504 can serve as terminals for electrical contact with the outside. In this case, without using the lead electrodes, the positive electrode current collector 501 and the negative electrode current collector 504 may be arranged so as to be partly exposed to the outside of the exterior body 509.

Figure 30:
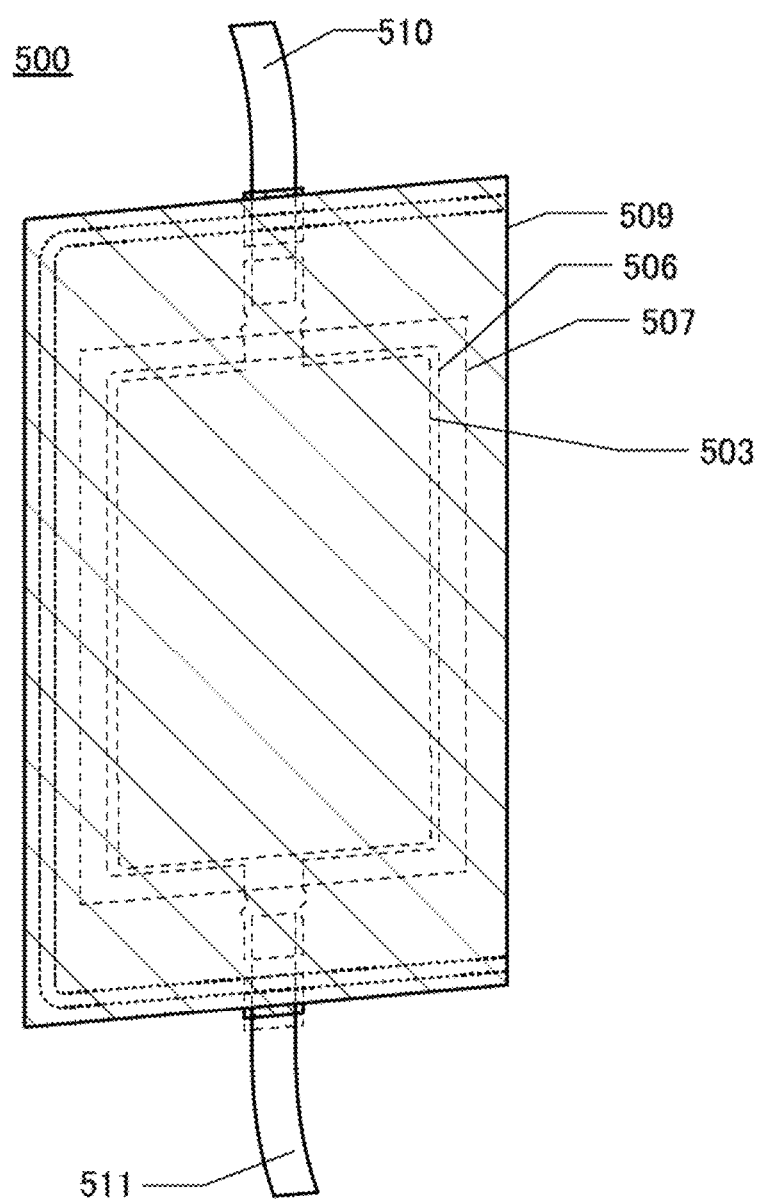
FIG. 30 illustrates a thin storage battery.

Although the positive electrode lead electrode 510 and the negative electrode lead electrode 511 are provided on the same side in FIG. 15, the positive electrode lead electrode 510 and the negative electrode lead electrode 511 may be provided on different sides as illustrated in FIG. 30. The lead electrodes of a storage battery of one embodiment of the present invention can be freely positioned as described above; therefore, the degree of freedom in design is high. Accordingly, a product including a storage battery of one embodiment of the present invention can have a high degree of freedom in design. Furthermore, production efficiency of products each including a storage battery of one embodiment of the present invention can be increased.

As the exterior body 509 in the thin storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide resin, a polyester resin, or the like is provided as the outer surface of the exterior body over the metal thin film can be used.

In FIGS. 16A and 16B, five pairs of a positive electrode and a negative electrode facing each other are illustrated as an example. Needless to say, the number of a pair of electrodes facing each other is not limited to 5 and may be more than 5 or less than 5. In the case of a large number of electrode layers, the storage battery can have higher capacity. In contrast, in the case of a small number of electrode layers, the storage battery can have small thickness and high flexibility.

In the above structure, the exterior body 509 of the secondary battery can change its form with a radius of curvature greater than or equal to 10 nm, preferably greater than or equal to 30 mm. One or two films are used as the exterior body of the secondary battery. In the case where the secondary battery has a layered structure, the battery has a cross-sectional structure surrounded by two curves of the film(s) of the exterior body when bent.

Figure 19A:
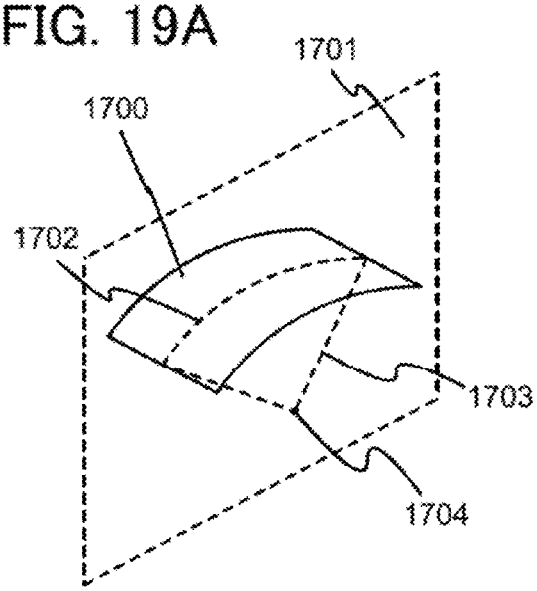
FIGS. 19A to 19C illustrate a radius of curvature of a surface.
Figure 19B:
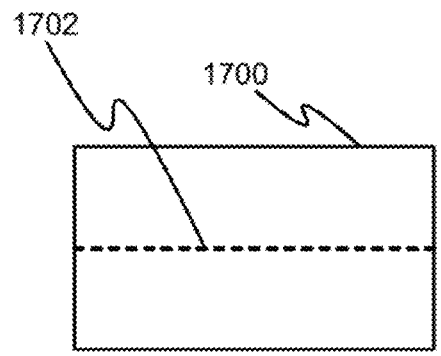
Figure 19C:
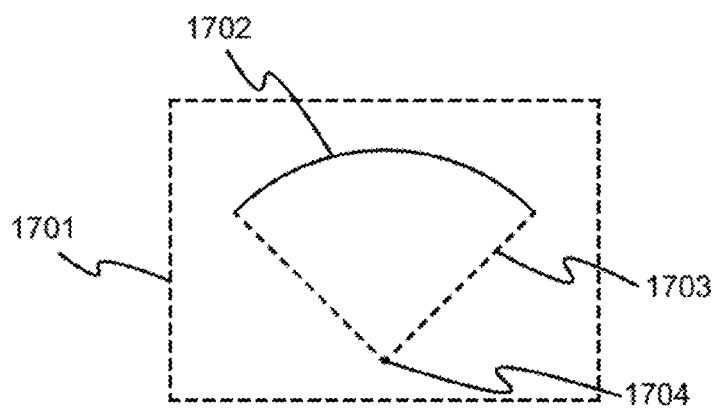

A description is given of the radius of curvature of a surface with reference to FIGS. 19A to 19C. In FIG. 19A, on a plane 1701 along which a curved surface 1700 is cut, part of a curve 1702 forming the curved surface 1700 is approximate to an arc of a circle, and the radius of the circle is referred to as a radius 1703 of curvature and the center of the circle is referred to as a center 1704 of curvature. FIG. 19B is a top view of the curved surface 1700. FIG. 19C is a cross-sectional view of the curved surface 1700 taken along the plane 1701. When a curved surface is cut along a plane, the radius of curvature of a curve in a cross section differs depending on the angle between the curved surface and the plane or on the cut position, and the smallest radius of curvature is defined as the radius of curvature of a surface in this specification and the like.

Figure 20A:
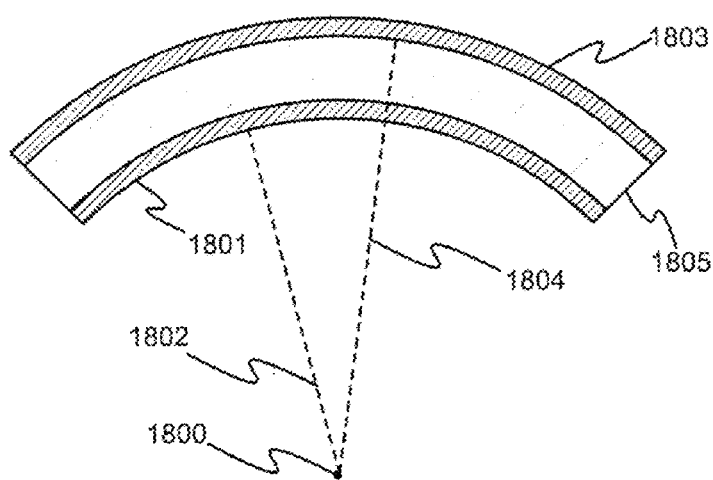
FIGS. 20A to 20D illustrate a radius of curvature of a film.
Figure 20B:
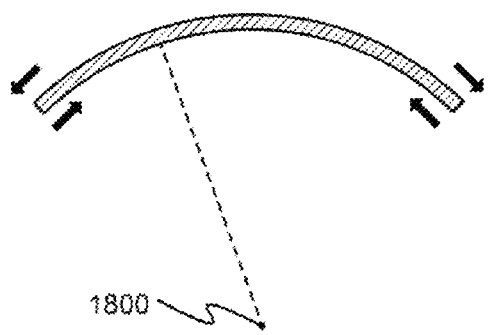

In the case of bending a secondary battery in which electrodes, an electrolytic solution, and the like are sandwiched between two films as exterior bodies, a radius 1802 of curvature of a film 1801 close to a center 1800 of curvature of the secondary battery is smaller than a radius 1804 of curvature of a film 1803 far from the center 1800 of curvature (FIG. 20A). When the secondary battery is curved and has an arc-shaped cross section, compressive stress is applied to a surface of the film on the side closer to the center 1800 of curvature and tensile stress is applied to a surface of the film on the side farther from the center 1800 of curvature (FIG. 20B). However, by forming a pattern including projections or depressions on surfaces of the exterior bodies, the influence of a strain can be reduced to be acceptable even when compressive stress and tensile stress are applied. For this reason, the secondary battery can change its form such that the exterior body on the side closer to the center of curvature has a curvature radius greater than or equal to 10 mm, preferably greater than or equal to 30 mm.

Figure 20C:
Figure 20D:

Note that the cross-sectional shape of the secondary battery is not limited to a simple arc shape, and the cross section can be partly arc-shaped; for example, a shape illustrated in FIG. 20C, a wavy shape illustrated in FIG. 20D, or an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has a curvature radius greater than or equal to 10 mm, preferably greater than or equal to 30 mm.

Note that in this embodiment, the coin-type storage battery, the cylindrical storage battery, and the thin storage battery are given as examples of the storage battery; however, any of storage batteries with a variety of shapes, such as a sealed storage battery and a square-type storage battery, can be used. Further, a structure in which a plurality of positive electrodes, a plurality of negative electrodes, and a plurality of separators are stacked or rolled may be employed.

For each of the positive electrodes of the storage batteries 300, 500, and 600, which are described in this embodiment, the positive electrode active layer of one embodiment of the present invention is used. Thus, the discharge capacity of the storage batteries 300, 500, and 600 can be increased. Further, it is possible to improve the cycle characteristics of the power storage device.

Figure 21A:
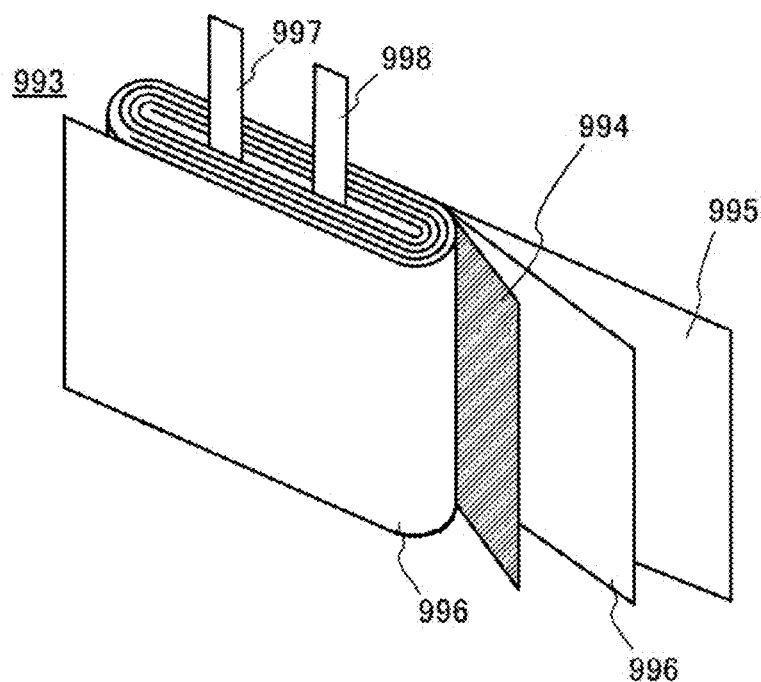
FIGS. 21A to 21C illustrate an example of a power storage device.
Figure 21B:
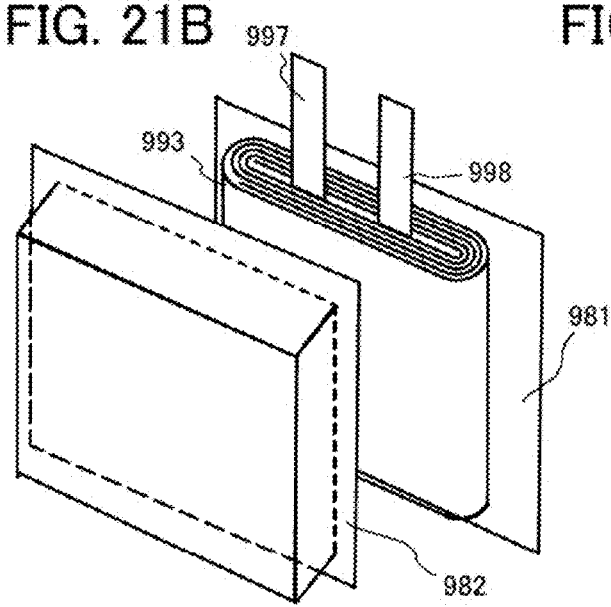
Figure 21C:
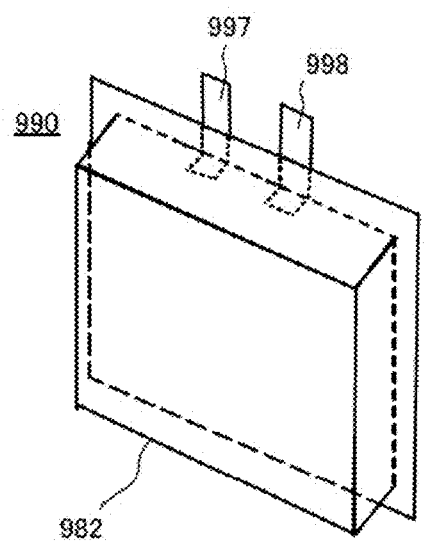

The thin storage battery is not limited to the one illustrated in FIG. 15. Another example of a thin storage battery is illustrated in FIGS. 21A to 21C. A wound body 993 illustrated in FIG. 21A includes a negative electrode 994, a positive electrode 995, and a separator 996.

The wound body 993 is obtained by winding a sheet of a stack in which the negative electrode 994 overlaps with the positive electrode 995 with the separator 996 therebetween. The wound body 993 is covered with a rectangular sealed container or the like; thus, a rectangular secondary battery is fabricated.

Note that the number of stacks each including the negative electrode 994, the positive electrode 995, and the separator 996 is determined as appropriate depending on capacity and element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

In a power storage device 990 illustrated in FIGS. 21B and 21C, the wound body 993 is packed in a space formed by bonding a film 981 which is an exterior body and a film 982 having a depressed portion by thermocompression bonding or the like. The wound body 993 includes the lead electrode 997 and the lead electrode 998, and is soaked in an electrolytic solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be fabricated.

Although FIGS. 21B and 21C illustrate an example where a space is formed by two films, the wound body 993 may be placed in a space formed by bending one film.

Furthermore, a flexible power storage device in which not only does a thin storage battery have flexibility but also an exterior body and a sealed container have flexibility can be fabricated when a resin material or the like is used for the exterior body and the sealed container. Note that in the case where a resin material is used for the exterior body and the sealed container, a conductive material is used for a portion connected to the outside.

For example, FIGS. 22A to 22C illustrate an example of a flexible rectangular storage battery. The wound body 993 illustrated in FIG. 22A is the same as that illustrated in FIG. 21A, and a detailed description thereof is omitted.

In the power storage device 990 illustrated in FIGS. 22B and 22C, the wound body 993 is packed in an exterior body 991. The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible rectangular storage battery can be fabricated.

Structural examples of power storage devices (storage batteries) will be described with reference to FIGS. 23A and 23B, FIGS. 24A1 to 24B2, and FIGS. 25A and 25B.

Figure 23A:
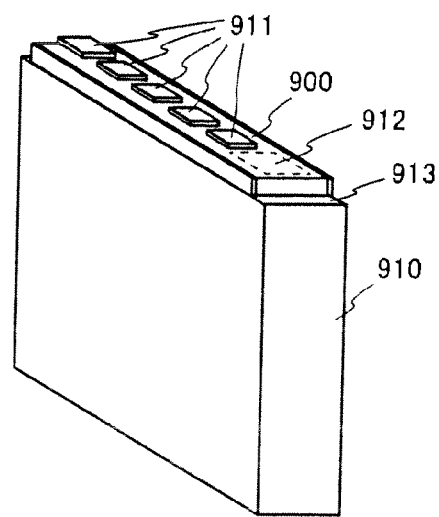
FIGS. 23A and 23B illustrate an example of a power storage device.
Figure 23B:
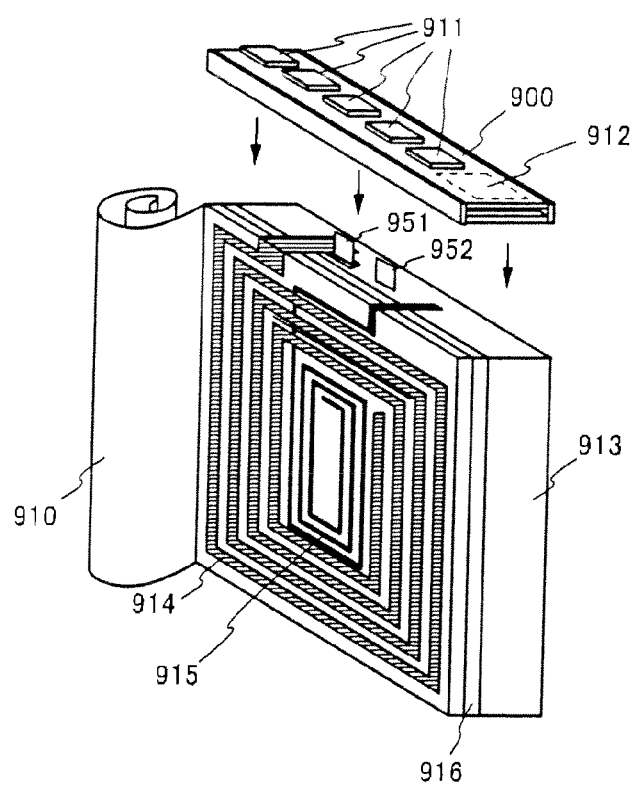

FIGS. 23A and 23B are external views of a power storage device. The power storage device includes a circuit board 900 and a storage battery 913. A label 910 is attached to the storage battery 913. As shown in FIG. 23B, the power storage device further includes a terminal 951 and a terminal 952, and includes an antenna 914 and an antenna 915 between the storage battery 913 and the label 910.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage device includes a layer 916 between the storage battery 913 and the antennas 914 and 915. The layer 916 has a function of blocking an electromagnetic field from the storage battery 913, for example. As the layer 916, for example, a magnetic body can be used.

Note that the structure of the power storage device is not limited to that shown in FIGS. 23A and 23B.

Figure 2:
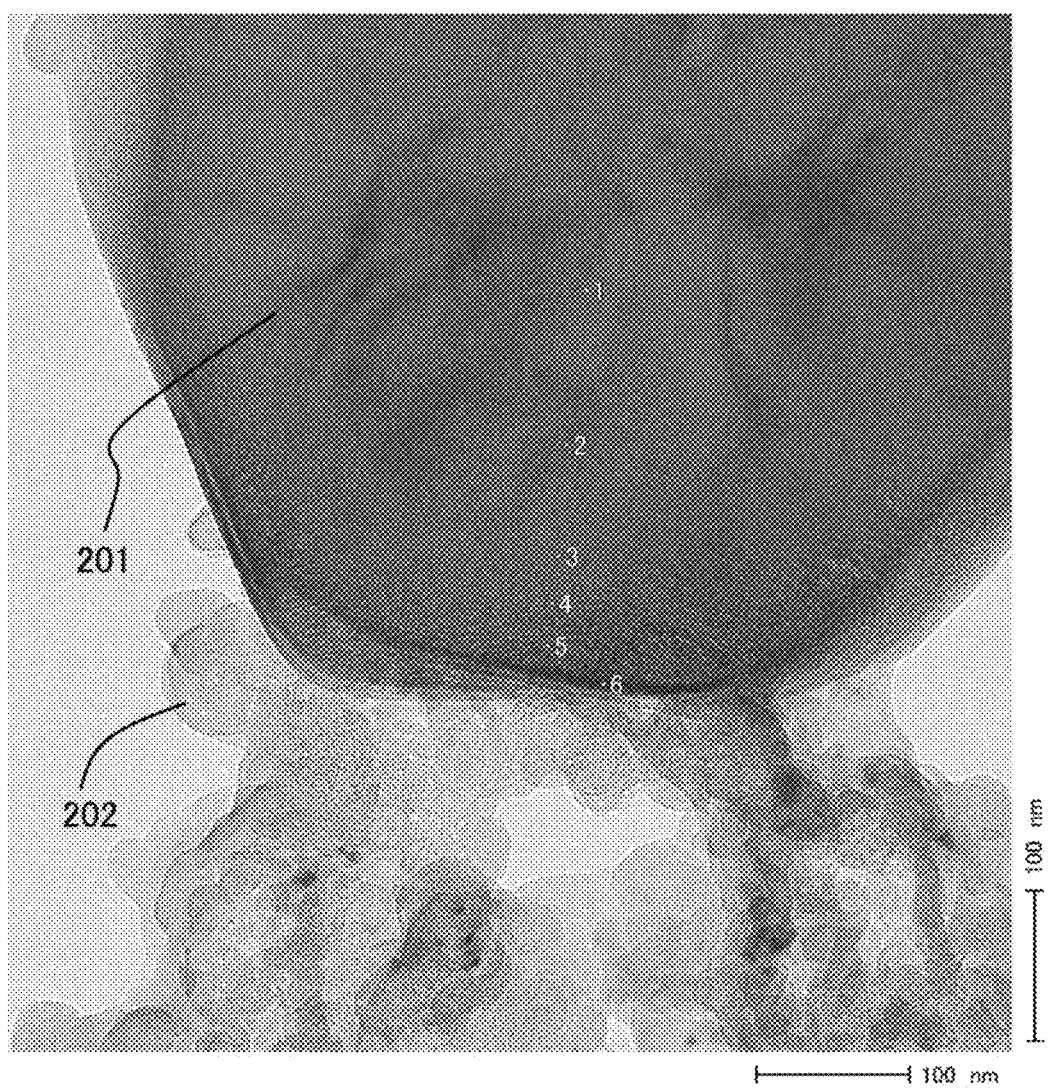
FIG. 2 is a photograph taken with a transmission electron microscope.

For example, as shown in FIGS. 24A1 and 24A2, two opposite surfaces of the storage battery 913 in FIGS. 23A and 23B may be provided with respective antennas. FIG. 24A1 is an external view showing one side of the opposite surfaces, and FIG. 24A2 is an external view showing the other side of the opposite surfaces. For portions similar to those in FIGS. 23A and 23B, a description of the power storage device illustrated in FIGS. 23A and 23B can be referred to as appropriate.

As illustrated in FIG. 24A1, the antenna 914 is provided on one of the opposite surfaces of the storage battery 913 with the layer 916 interposed therebetween, and as illustrated in FIG. 24A2, the antenna 915 is provided on the other of the opposite surfaces of the storage battery 913 with a layer 917 interposed therebetween. The layer 917 has a function of blocking an electromagnetic field from the storage battery 913, for example. As the layer 917, for example, a magnetic body can be used.

With the above structure, both of the antennas 914 and 915 can be increased in size.

Alternatively, as illustrated in FIGS. 24B1 and 24B2, two opposite surfaces of the storage battery 913 in FIGS. 23A and 23B may be provided with different types of antennas. FIG. 24B1 is an external view showing one side of the opposite surfaces, and FIG. 24B2 is an external view showing the other side of the opposite surfaces. For portions similar to those in FIGS. 23A and 23B, a description of the power storage device illustrated in FIGS. 23A and 23B can be referred to as appropriate.

As illustrated in FIG. 24B1, the antennas 914 and 915 are provided on one of the opposite surfaces of the storage battery 913 with the layer 916 interposed therebetween, and as illustrated in FIG. 24B2, an antenna 918 is provided on the other of the opposite surfaces of the storage battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage device and another device, a response method that can be used between the power storage device and another device, such as NFC, can be employed.

Figure 25A:
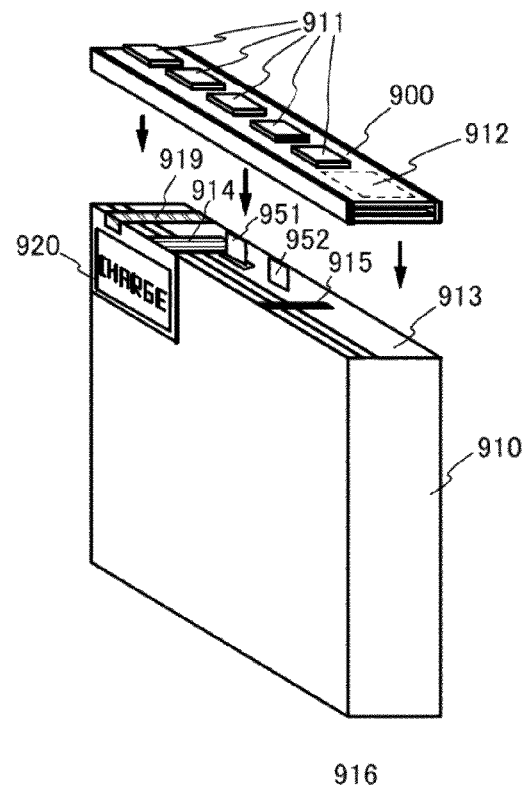
FIGS. 25A and 25B illustrate an example of a power storage device.

Alternatively, as illustrated in FIG. 25A, the storage battery 913 in FIGS. 23A and 23B may be provided with a display device 920. The display device 920 is electrically connected to the terminal 911 via a terminal 919. It is possible that the label 910 is not provided in a portion where the display device 920 is provided. For portions similar to those in FIGS. 23A and 23B, a description of the power storage device illustrated in FIGS. 23A and 23B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 25B:
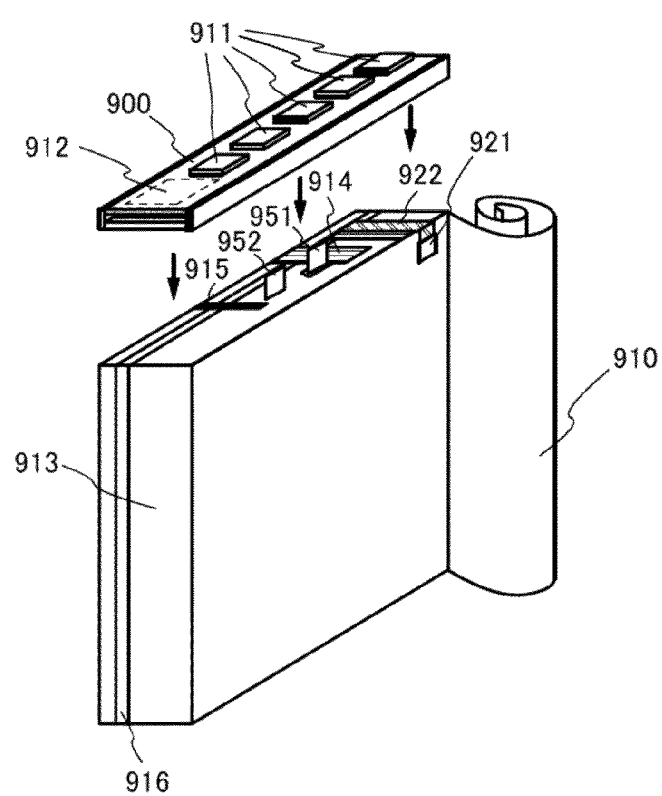

Alternatively, as illustrated in FIG. 25B, the storage battery 913 illustrated in FIGS. 23A and 23B may be provided with a sensor 921. The sensor 921 is electrically connected to the terminal 911 via a terminal 922. Note that the sensor 921 may be provided between the storage battery 913 and the label 910. For portions similar to those in FIGS. 23A and 23B, a description of the power storage device illustrated in FIGS. 23A and 23B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage device is placed can be determined and stored in a memory inside the circuit 912.

FIGS. 26A to 26G illustrate examples of electronic devices including the flexible storage batteries described in FIG. 15, FIGS. 21A to 21C, and FIGS. 22A to 22C. Examples of electronic devices each including a flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 26A:
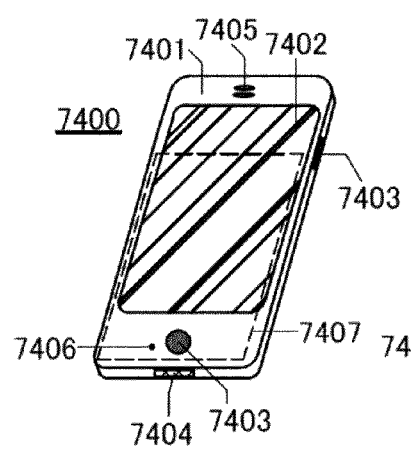
FIGS. 26A to 26G each illustrate an example of an electronic device.

FIG. 26A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 26B:
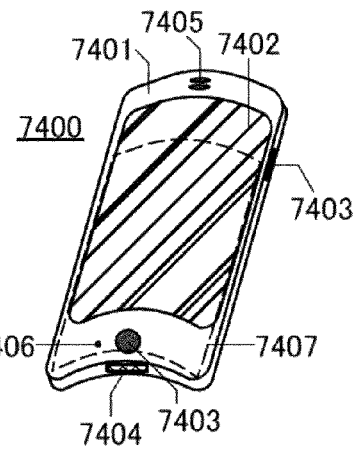
Figure 26C:
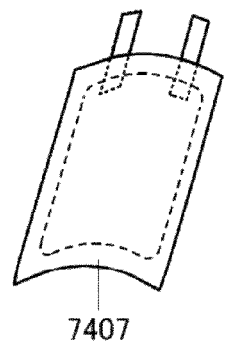

FIG. 26B illustrates the mobile phone 7400 that is bent. When the whole mobile phone 7400 is bent by the external force, the power storage device 7407 included in the mobile phone 7400 is also bent. FIG. 26C illustrates the bent power storage device 7407. The power storage device 7407 is a thin storage battery. The power storage device 7407 is fixed in a state of being bent. Note that the power storage device 7407 includes a lead electrode electrically connected to a current collector. The current collector is, for example, copper foil, and partly alloyed with gallium; thus, adhesion between the current collector and an active material layer in contact with the current collector is improved and the power storage device 7407 can have high reliability even in a state of being bent.

Figure 26D:
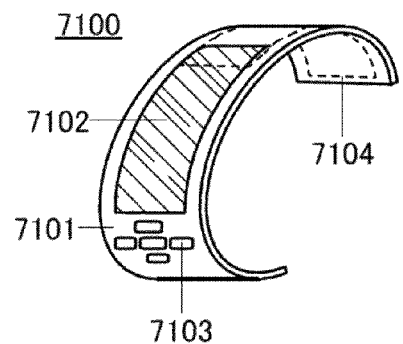
Figure 26E:
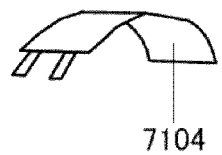

FIG. 26D illustrates an example of a bangle display device. A portable display device 7100 includes a housing 7101, a display portion 7102, an operation button 7103, and a power storage device 7104. FIG. 26E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm. When the radius of curvature at the main surface of the power storage device 7104 is greater than or equal to 40 mm and less than or equal to 150 mm, the reliability can be kept high. Note that the power storage device 7104 includes a lead electrode that is electrically connected to a current collector. The current collector is, for example, a copper foil, and partly alloyed with gallium; thus, adhesion between the current collector and an active material layer in contact with the current collector is improved and the power storage device 7104 can have high reliability even when the power storage device 7104 is bent and its curvature is changed many times.

Figure 26F:
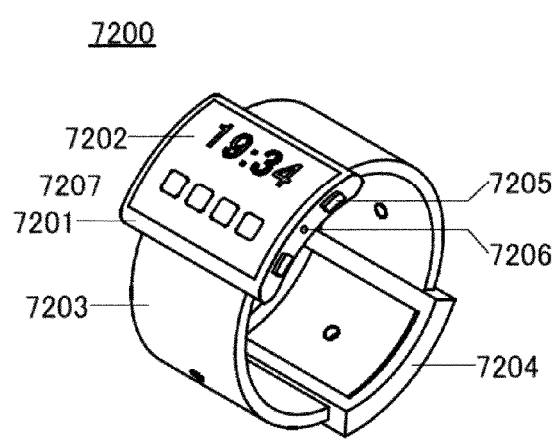

FIG. 26F illustrates an example of a watch-type portable information terminal. A portable information terminal 7200 includes a housing 7201, a display portion 7202, a band 7203, a buckle 7204, an operation button 7205, an input/output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as power on/off, on/off of wireless communication, setting and cancellation of a manner mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input/output terminal 7206, and data can be directly transmitted to and received from another information terminal via a connector. In addition, charging via the input/output terminal 7206 is possible. Note that the charging operation may be performed by wireless power feeding without using the input/output terminal 7206.

The display portion 7202 of the portable information terminal 7200 is provided with a power storage device including the electrode member of one embodiment of the present invention. For example, the power storage device 7104 illustrated in FIG. 26E that is in the state of being curved can be provided in the housing 7201. Alternatively, the power storage device 7104 illustrated in FIG. 26E can be provided in the band 7203 such that it can be curved.

Figure 26G:
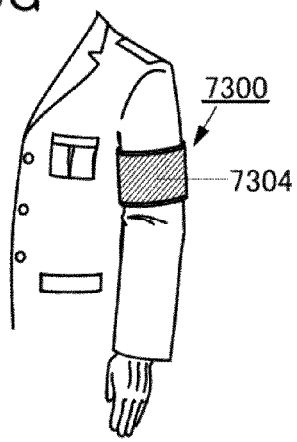

FIG. 26G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication that is a communication method in accordance with an existing communication standard.

The display device 7300 includes an input/output terminal, and data can be directly transmitted to and received from another information terminal via a connector. Power charging through the input/output terminal is possible. Note that the charging operation may be performed by wireless power feeding without using the input/output terminal.

Examples of Electronic Device

Figure 27A:
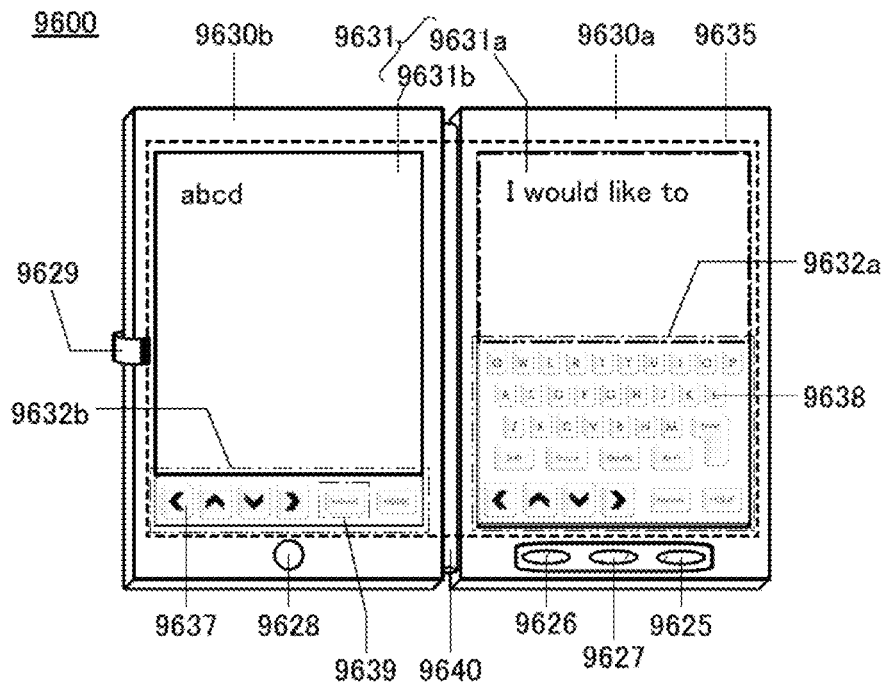
FIGS. 27A to 27C illustrate an example of an electronic device.
Figure 27B:
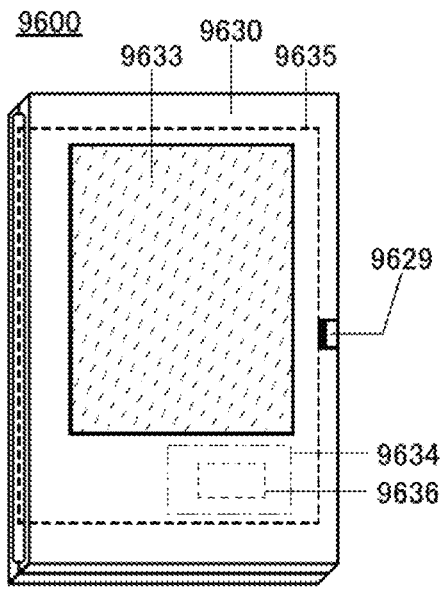

FIGS. 27A and 27B illustrate an example of a foldable tablet terminal. A tablet terminal 9600 illustrated in FIGS. 27A and 27B includes a housing 9630 provided with a housing 9630a, a housing 9630b, a movable portion 9640 connecting the housings 9630a and 9630b, a display portion 9631 provided with a display portion 9631a and a display portion 9631b, a display mode switch 9626, a power switch 9627, a power saver switch 9625, a fastener 9629, and an operation switch 9628. FIGS. 27A and 27B illustrate the tablet terminal 9600 opened and closed, respectively.

The tablet terminal 9600 includes a storage battery 9635 inside the housings 9630a and 9630b. The storage battery 9635 is provided across the housings 9630a and 9630b, passing through the movable portion 9640.

Part of the display portion 9631*a* can be a touch panel region 9632*a* and data can be input when a displayed operation key 9638 is touched. FIG. 27A shows, but is not limited to, a structure in which a half region in the display portion 9631*a* has only a display function and the other half region has a touch panel function. The whole area of the display portion 9631*a* may have a touch panel function. For example, the whole area of the display portion 9631*a* can display keyboard buttons and serve as a touch panel while the display portion 9631*b* can be used as a display screen.

As in the display portion 9631*a*, part of the display portion 9631*b* can be a touch panel region 9632*b*. When a keyboard display switching button 9639 displayed on the touch panel is touched with a finger, a stylus, or the like, a keyboard can be displayed on the display portion 9631*b*.

Touch input can be performed in the touch panel region 9632*a* and the touch panel region 9632*b* at the same time.

The display mode switch 9626 can switch the display between portrait mode, landscape mode, and the like, and between monochrome display and color display, for example. The power saver switch 9625 can control display luminance in accordance with the amount of external light in use of the tablet terminal 9600, which is measured with an optical sensor incorporated in the tablet terminal 9600. The tablet terminal may include another detection device such as a gyroscope or an acceleration sensor in addition to the optical sensor.

FIG. 27A illustrates, but is not limited to, an example in which the display portions 9631*a* and 9631*b* have the same display area. The display portions 9631*a* and 9631*b* may have different display areas and different display quality. For example, higher-resolution images may be displayed on one of the display portions 9631*a* and 9631*b*.

The tablet terminal is closed in FIG. 27B. The tablet terminal includes the housing 9630, a solar cell 9633, and a charge and discharge control circuit 9634 including a DC-DC converter 9636. The storage battery of one embodiment of the present invention is used for the storage battery 9635.

The tablet terminal 9600 can be folded in two so that the housings 9630*a* and 9630*b* overlap with each other when not in use. Thus, the display portions 9631*a* and 9631*b* can be protected, which increases the durability of the tablet terminal 9600. In addition, the storage battery 9635 of one embodiment of the present invention has flexibility and can be repeatedly bent without a large decrease in charge and discharge capacity. Thus, a highly reliable tablet terminal can be provided.

The tablet terminal illustrated in FIGS. 27A and 27B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the storage battery 9635 can be charged efficiently. The use of a lithium-ion battery as the storage battery 9635 brings an advantage such as a reduction in size.

Figure 27C:
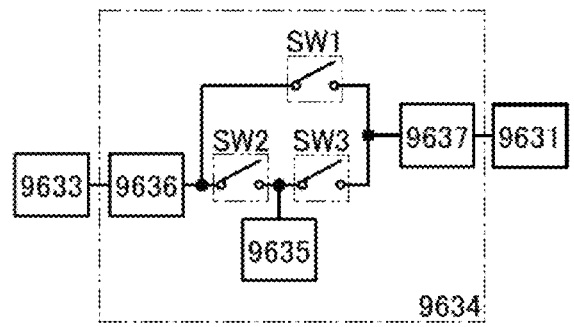

The structure and operation of the charge and discharge control circuit 9634 in FIG. 27B are described with reference to a block diagram in FIG. 27C. The solar cell 9633, the storage battery 9635, the DC-DC converter 9636, a converter 9637, switches SW1 to SW3, and the display portion 9631 are illustrated in FIG. 27C, and the storage battery 9635, the DC-DC converter 9636, the converter 9637, and the switches SW1 to SW3 correspond to the charge and discharge control circuit 9634 in FIG. 27B.

First, an example of the operation in the case where electric power is generated by the solar cell 9633 using external light is described. The voltage of electric power generated by the solar cell is raised or lowered by the DC-DC converter 9636 to a voltage for charging the storage battery 9635. Then, when the electric power from the solar cell 9633 is used for the operation of the display portion 9631, the switch SW1 is turned on and the voltage of the electric power is raised or lowered by the converter 9637 to a voltage needed for the display portion 9631. When display on the display portion 9631 is not performed, the switch SW1 is turned off and the switch SW2 is turned on, so that the storage battery 9635 can be charged.

Note that the solar cell 9633 is described as an example of a power generation means; however, one embodiment of the present invention is not limited to this example. The storage battery 9635 may be charged using another power generation means such as a piezoelectric element or a thermoelectric conversion element (Peltier element). For example, the storage battery 9635 may be charged using a non-contact power transmission module that transmits and receives electric power wirelessly (without contact) or using another charging means in combination.

Figure 28:
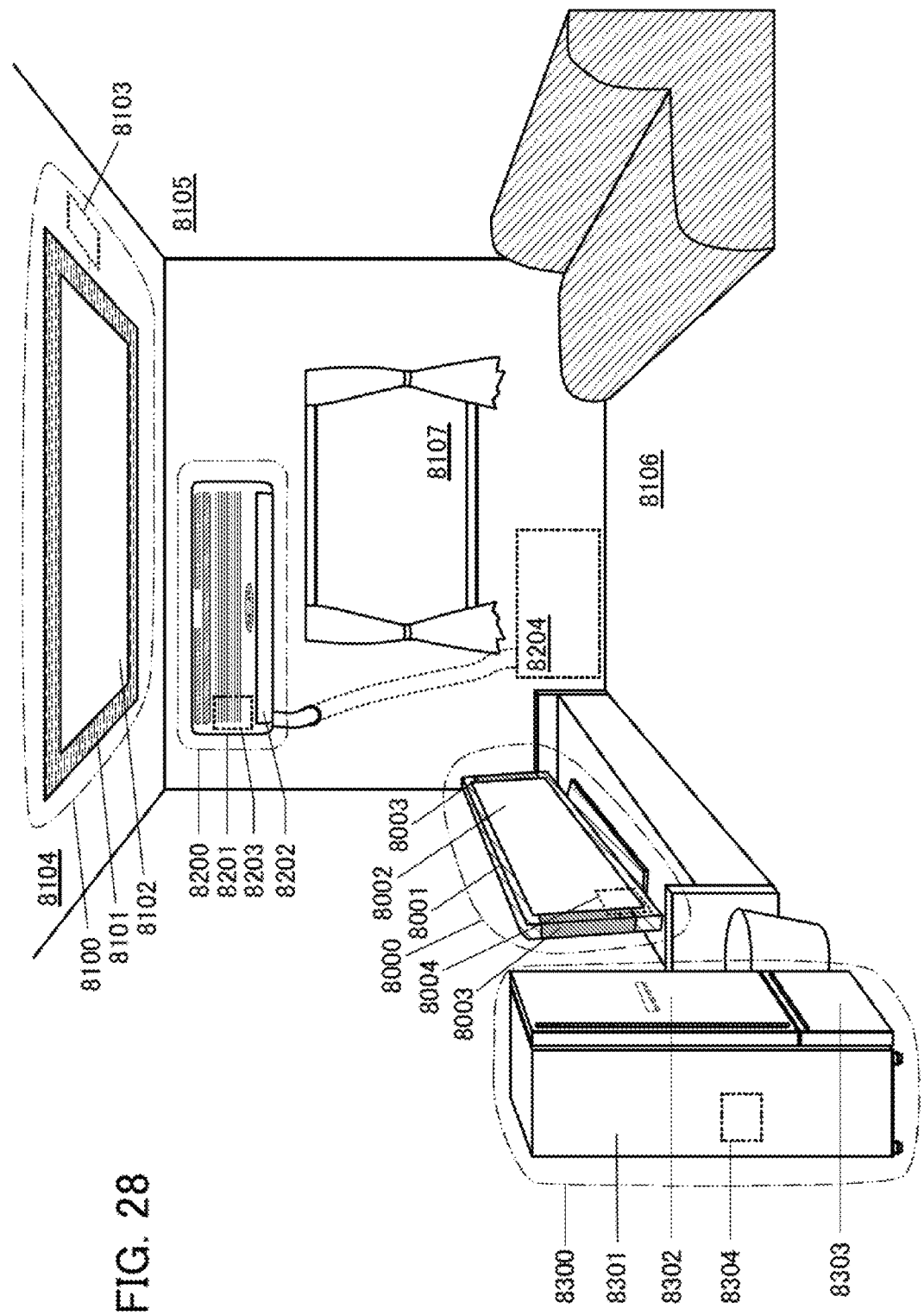
FIG. 28 illustrates examples of electronic devices.

FIG. 28 illustrates examples of other electronic devices. In FIG. 28, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, the power storage device 8004, and the like. The power storage device 8004 of one embodiment of the present invention is provided in the housing 8001. The display device 8000 can receive electric power from a commercial power source or use electric power stored in the power storage device 8004. Thus, the display device 8000 can operate with the use of the power storage device 8004 of one embodiment of the present invention as an uninterruptible power source even when electric power cannot be supplied from a commercial power source because of power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all information display devices for personal computers, advertisement displays, and the like besides the ones for TV broadcast reception.

In FIG. 28, an installation lighting device 8100 is an example of an electronic device including a power storage device 8103 of one embodiment of the present invention. Specifically, the lighting device 8100 includes a housing 8101, a light source 8102, the power storage device 8103, and the like. Although FIG. 28 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power source or use electric power stored in the power storage device 8103. Thus, the lighting device 8100 can operate with the use of the power storage device 8103 of one embodiment of the present invention as an uninterruptible power source even when electric power cannot be supplied from a commercial power source because of power failure or the like.

Note that although the installation lighting device 8100 provided in the ceiling 8104 is illustrated in FIG. 28 as an example, the power storage device of one embodiment of the present invention can be used in an installation lighting device provided in, for example, a wall 8105, a floor 8106, a window 8107, or the like besides the ceiling 8104. Alternatively, the power storage device can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 28, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, the power storage device 8203, and the like. Although FIG. 28 illustrates the case where the power storage device 8203 is provided in the indoor unit 8200, the power storage device 8203 may be provided in the outdoor unit 8204. Alternatively, the power storage device 8203 may be provided in both the indoor unit 8200 and the outdoor unit 8204. The air conditioner can receive electric power from a commercial power source or use electric power stored in the power storage device 8203. Particularly in the case where the power storage device 8203 is provided in both the indoor unit 8200 and the outdoor unit 8204, the air conditioner can operate with the use of the power storage device 8203 of one embodiment of the present invention as an uninterruptible power source even when electric power cannot be supplied from a commercial power source because of power failure or the like.

Note that although the split-type air conditioner including the indoor unit and the outdoor unit is illustrated in FIG. 28 as an example, the power storage device of one embodiment of the present invention can be used in an air conditioner in which the functions of an indoor unit and an outdoor unit are integrated in one housing.

In FIG. 28, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, the power storage device 8304, and the like. The power storage device 8304 is provided in the housing 8301 in FIG. 28. The electric refrigerator-freezer 8300 can receive electric power from a commercial power source or use electric power stored in the power storage device 8304. Thus, the electric refrigerator-freezer 8300 can operate with the use of the power storage device 8304 of one embodiment of the present invention as an uninterruptible power source even when electric power cannot be supplied from a commercial power source because of power failure or the like.

Note that among the electronic devices described above, the high-frequency heating appliances such as microwave ovens, the electric rice cookers, and the like require high electric power in a short time. The tripping of a circuit breaker of a commercial power source in use of the electronic devices can be prevented by using the power storage device of one embodiment of the present invention as an auxiliary power source for making up for the shortfall in electric power supplied from a commercial power source.

In addition, in a time period when electronic devices are not used, specifically when the proportion of the amount of electric power which is actually used to the total amount of electric power which can be supplied from a commercial power source (such a proportion is referred to as power usage rate) is low, electric power can be stored in the power storage device, whereby the power usage rate can be reduced in a time period when the electronic devices are used. For example, in the case of the electric refrigerator-freezer 8300, electric power can be stored in the power storage device 8304 in the nighttime when the temperature is low and the door for a refrigerator 8302 and the door for a freezer 8303 are not often opened or closed. On the other hand, in the daytime when the temperature is high and the door for a refrigerator 8302 and the door for a freezer 8303 are frequently opened and closed, the power storage device 8304 is used as an auxiliary power source; thus, the power usage rate in daytime can be reduced.

The use of a power storage device in vehicles can lead to next-generation clean energy vehicles such as hybrid electric vehicles (HEVs), electric vehicles (EVs), and plug-in hybrid electric vehicles (PHEVs).

Figure 29A:
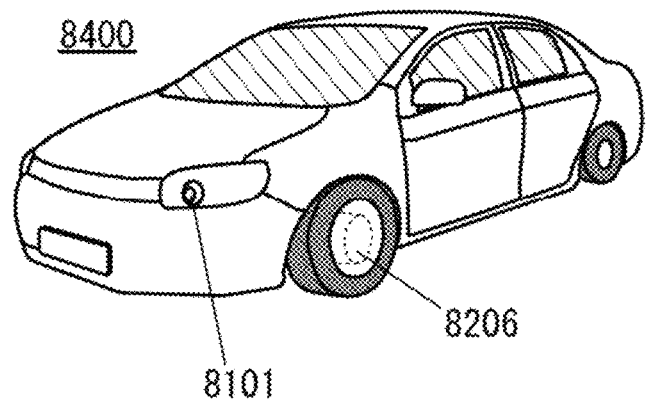
FIGS. 29A and 29B illustrate examples of electronic devices.
Figure 29B:
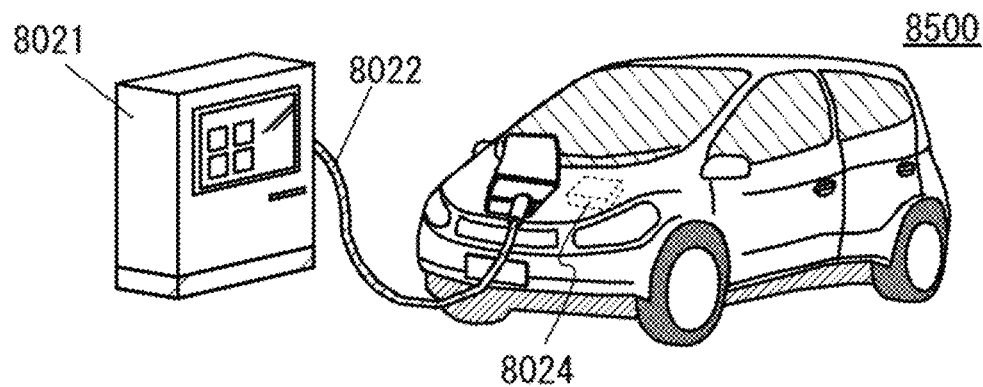

FIGS. 29A and 29B each illustrate an example of a vehicle using one embodiment of the present invention. An automobile 8400 illustrated in FIG. 29A is an electric vehicle which runs on the power of the electric motor. Alternatively, the automobile 8400 is a hybrid electric vehicle capable of driving using either the electric motor or the engine as appropriate. One embodiment of the present invention achieves a high-mileage vehicle. The automobile 8400 includes the power storage device. The power storage device is used not only for driving the electric motor, but also for supplying electric power to a light-emitting device such as a headlight 8401 or a room light (not illustrated).

The power storage device can also supply electric power to a display device included in the automobile 8400, such as a speedometer or a tachometer. Furthermore, the power storage device can supply electric power to a semiconductor device included in the automobile 8400, such as a navigation system.

FIG. 29B illustrates an automobile 8500 including the power storage device. The automobile 8500 can be charged when the power storage device is supplied with electric power through external charging equipment by a plug-in system, a contactless power supply system, or the like. In FIG. 29B, the power storage device included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, a power storage device 8024 included in the automobile 8500 can be charged by being supplied with electric power from outside. The charging can be performed by converting AC electric power into DC electric power through a converter such as an AC-DC converter.

Although not illustrated, the vehicle may include a power receiving device so as to be charged by being supplied with electric power from an above-ground power transmitting device in a contactless manner. In the case of the contactless power supply system, by fitting the power transmitting device in a road or an exterior wall, charging can be performed not only when the automobile stops but also when moves. In addition, the contactless power supply system may be utilized to perform transmission/reception between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Moreover, the power storage device included in the vehicle can be used as a power source for supplying electric power to products other than the vehicle. In that case, the use of a commercial power supply can be avoided at peak time of electric power demand.

This embodiment can be implemented in appropriate combination with any of the other embodiments.

Example 1

In this example, lithium manganese oxide was synthesized by the synthesis method described in Embodiment 1.
[Synthesis of Lithium Manganese Oxide]

First, a lithium manganese oxide particle of one embodiment of the present invention, which is the sample A, was formed. Starting materials $Li_2CO_3$, $MnCO_3$, and NiO were weighed so that the molar ratio of $Li_2CO_3$ to $MnCO_3$ and NiO was 0.84:0.8062:0.318. To form the comparative sample B, starting materials $Li_2CO_3$ and $MnCO_3$ were weighed so that the molar ratio of $Li_2CO_3$ to $MnCO_3$ was 1:1.

Next, acetone was added to the powder of these materials, and then, they were mixed in a ball mill to prepare mixed powder.

After that, first heating was performed to volatilize acetone, so that a mixed material was obtained.

Then, the mixed material of the sample A was put into a crucible, and was fired at 1000° C. for 10 hours in the air at a flow rate of 10 L/min., so that the sample A was synthesized.

The mixed material of the comparative sample B was also put into a crucible, and was fired at 1100° C., so that the comparative sample B was obtained.

Subsequently, grinding was performed on the sample A to separate the sintered particles. For the grinding, acetone was added and then mixing was performed in a ball mill.

After the grinding, second heating was performed on the sample A to volatilize acetone, and then, vacuum drying was performed.

Then, third heating was performed at 600° C. for 3 hours in the air at a flow rate of 10 L/min. Through the above process, the sample A was obtained.
[Composition Analysis]

Table 1 shows the amounts of lithium, manganese, and nickel of the sample A, measured by inductively coupled plasma mass spectrometry (ICP-MS), and the atomic ratio of each element to lithium when lithium is taken as 1. The ratio of lithium to manganese and nickel obtained by ICP-MS was 1:0.464:0.193. The ratio of nickel to manganese (Ni/Mn) was 0.416 and the ratio of lithium to manganese (Li/Mn) was 2.16. The ratio of lithium to the sum of nickel and manganese (Li/(Ni+Mn)) was 1.52.

TABLE 1

| Element | Amount detected [µg/g] | Amount detected [mol/g] | Atomic ratio with Li taken as 1 |
|---|---|---|---|
| Li | 98000 | 0.01412 | 1 |
| Mn | 360000 | 0.006553 | 0.464 |
| Ni | 160000 | 0.002726 | 0.193 |

Example 2

In this example, half cells were made using the sample A2 and the comparative sample B, and the discharge characteristics thereof were evaluated. Note that the sample A2 was synthesized in the same manner as the sample A in Example 1 except the third heating was not performed on the sample A2.
[Formation of Electrode]

Electrodes were formed using the sample A and the comparative sample B. The sample A, polyvinylidene fluoride (PVdF), and AB were mixed with N-methyl-2-pyrrolidone (NMP) as a polar solvent to form slurry.

A current collector covered with an undercoat was prepared. The slurry was applied on the current collector covered with the undercoat and dried. Then, a plurality of electrodes of the electrode A-1, the electrode A-2, and the electrode A-3 was stamped out from the sheet of the current collector. The comparative electrode B was formed in the same manner using the comparative sample B.
[Formation of Cell]

Half cells were formed using the electrode A-1, the electrode A-2, the electrode A-3, and the comparative electrode B. Metallic lithium was used for each counter electrode. The half cell including the electrode A-1 was neither charged nor discharged. The half cell including the electrode A-2 was only charged, and the half cell including the electrode A-3 was charged and discharged.

An electrolytic solution was formed by dissolving $LiPF_6$ as a salt in a mixed solution containing ethylene carbonate and diethyl carbonate, which are aprotic organic solvents, at a volume ratio of 1:1. As the separator, polypropylene (PP) was used.
[Discharge Characteristics Measurement]

The charge capacity and discharge capacity of the half cells were measured. Charging was performed at a constant current with a current density of 30 mA/g until the voltage reached a termination voltage of 4.8 V. Discharging was performed at a constant current with a current density of 30 mA/g until the voltage reached an end voltage of 2.0 V. The current density was a value per unit weight of a positive electrode active material. Charging and discharging measurement was performed at 25° C. The charge capacity of the half cell including the electrode A-3 was 306.8 mAh/g and the discharge capacity thereof was 237.3 mAh/g. The charge capacity of the half cell including the comparative electrode B was 11.2 mAh/g and the discharge capacity thereof was 10.0 mAh/g. The charge capacity and discharge capacity here each represented the value per weight of a positive electrode active material. The charge capacity and discharge capacity of the half cell including the electrode A-3 formed using the sample A were higher than those of the half cell including the comparative electrode B formed using the comparative sample B.

[Observation with Transmission Electron Microscope]

Figure 3:
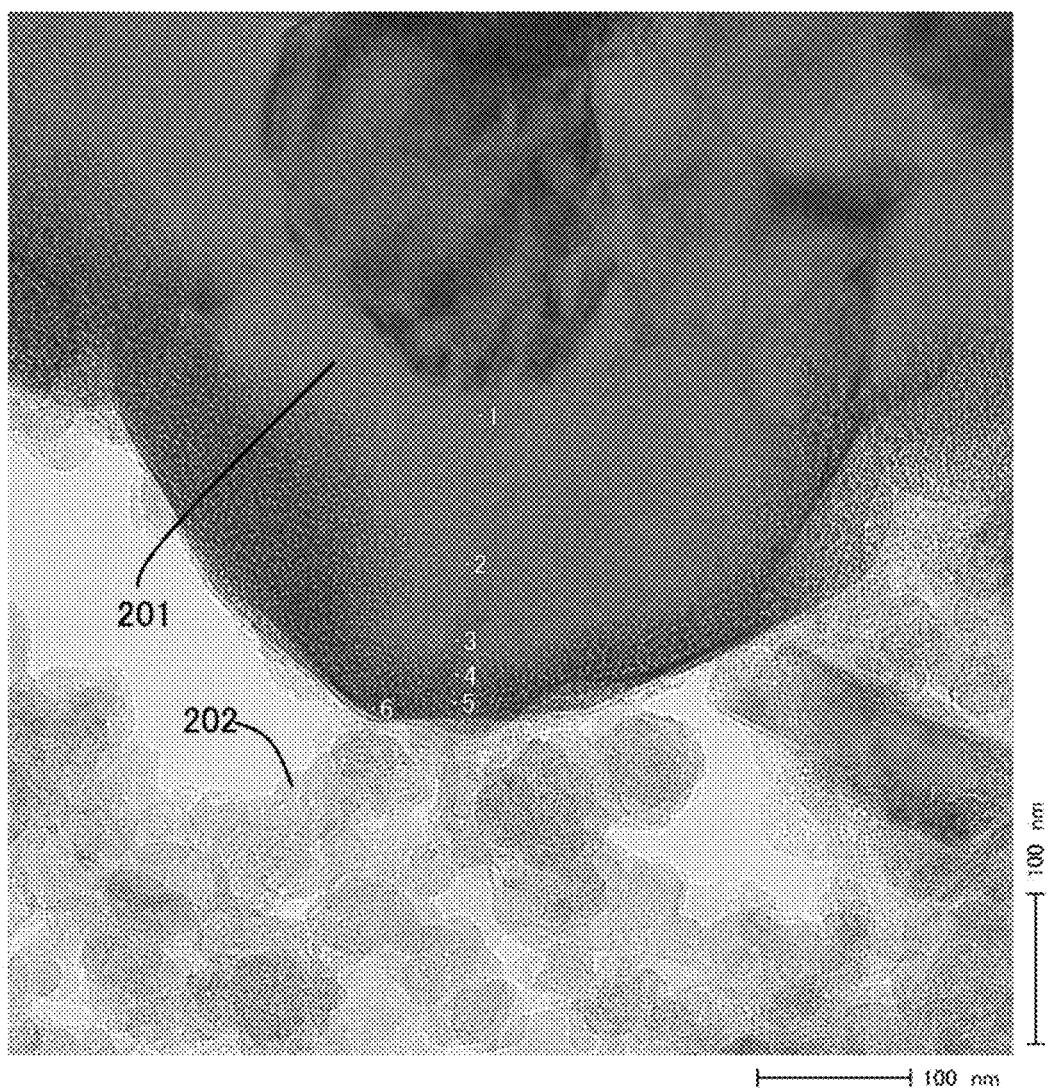
FIG. 3 is a photograph taken with a transmission electron microscope.

The electrode subjected to only charging, the electrode subjected to charging and discharging, and the electrode subjected to neither charging nor discharging were observed. After formation of the half cells, the half cells were disassembled to take out the electrode A-1 subjected to neither charging nor discharging, the electrode A-2 subjected to only charging, and the electrode A-3 subjected to charging and discharging. The electrodes taken out were sliced, and cross sections of the sliced electrodes were observed with a transmission electron microscope (TEM). Note that disassembly of the cells and introduction to the TEM were performed in an inert atmosphere to observe the lithium-manganese oxide particles. FIG. 1, FIG. 2, and FIG. 3 show results of the TEM observation. FIG. 1, FIG. 2, and FIG. 3 are the observation results of the electrode A-1, the electrode A-2, and the electrode A-3, respectively. As shown in each of FIG. 1, FIG. 2, and FIG. 3, a lithium manganese oxide particle 201 and acetylene black (AB) 202 were observed.

[Analysis by TEM-EDX]

Figure 12:
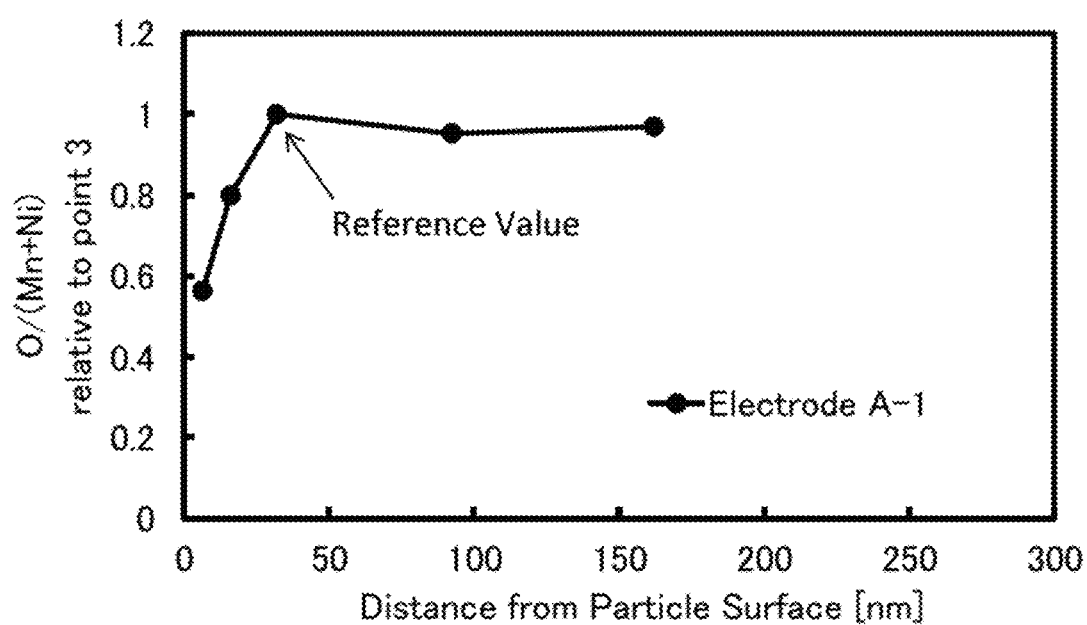
FIG. 12 is a graph showing the measurement result of energy dispersive X-ray spectroscopy.

Elemental analysis by energy dispersive X-ray spectroscopy (EDX) was performed on points 1 to 5 in the TEM observation photograph of FIG. 1. FIG. 12 shows the ratio of the number of oxygen atoms to the sum of the number of manganese atoms and nickel atoms (O/(Mn+Ni)). Note that the vertical axis indicates the relative value with the value of point 3 taken as 1 (a distance from the particle was approximately 31 nm). The horizontal axis indicates the distance between a surface of the lithium manganese oxide composite particle and an observation point. The distance from the particle surface was calculated from the photograph of the cross section. For example, the diameter of a circle with an observation point as the center may be regarded as the distance from the surface. In that case, the circle should have the shortest diameter of circles in contact with the particle surface. It was found from FIG. 12 that the value O/(Mn+Ni) in a region 17 nm or less from the particle surface was small as compared to those in the other observation points.

[Measurement by EELS]

Next, the lithium manganese oxide particles, which were observed by TEM, were measured by EELS. Observation points are indicated in FIG. 1, FIG. 2, and FIG. 3.

Figure 5A:
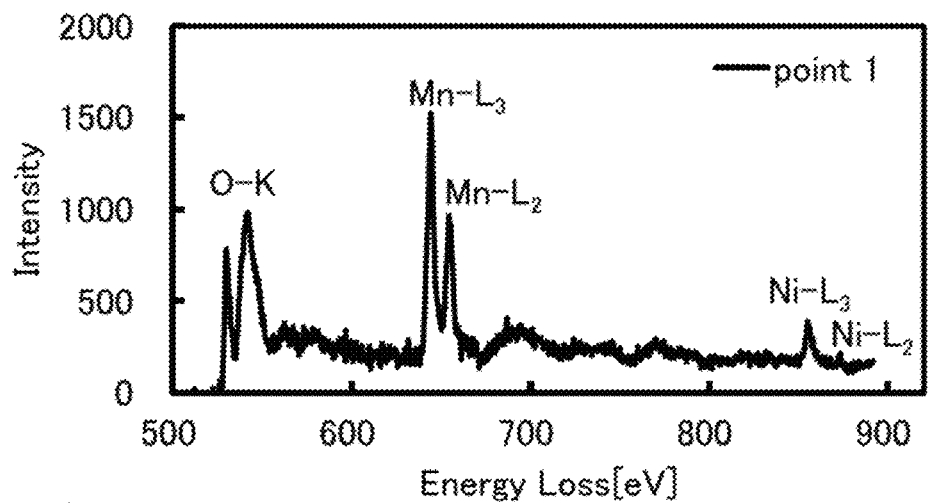
FIGS. 5A to 5C are graphs showing the measurement results of electron energy loss spectroscopy.
Figure 5B:
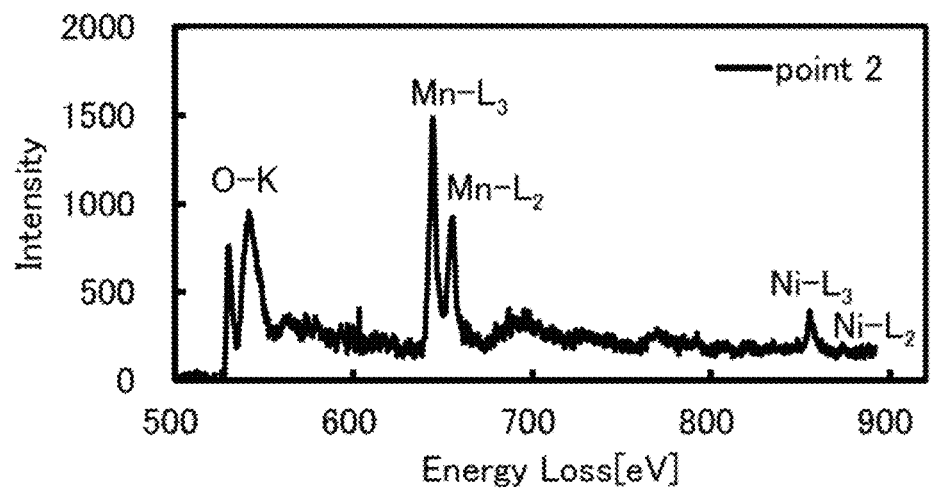
Figure 5C:
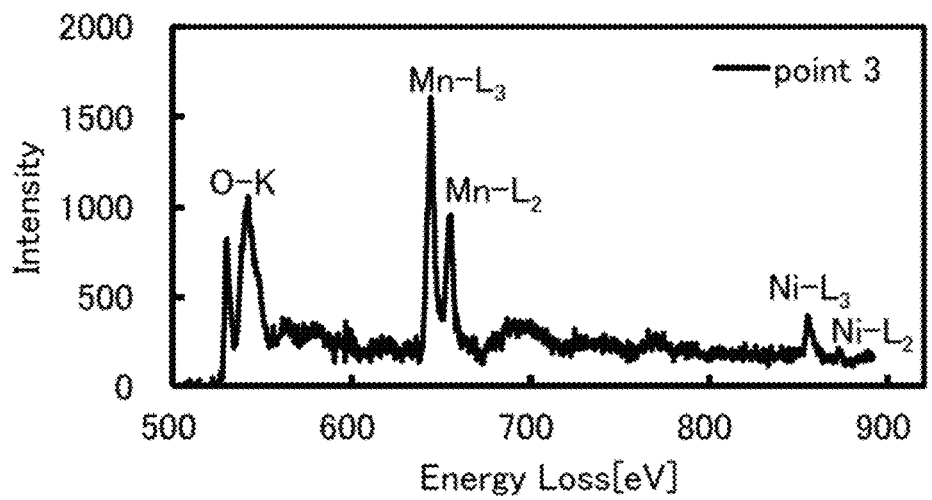
Figure 6A:
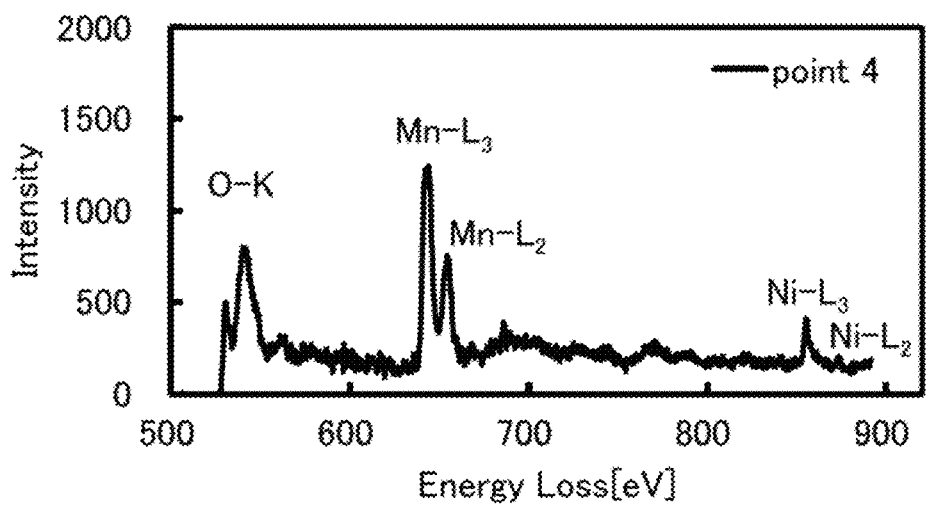
FIGS. 6A and 6B are graphs showing the measurement results of electron energy loss spectroscopy.
Figure 6B:
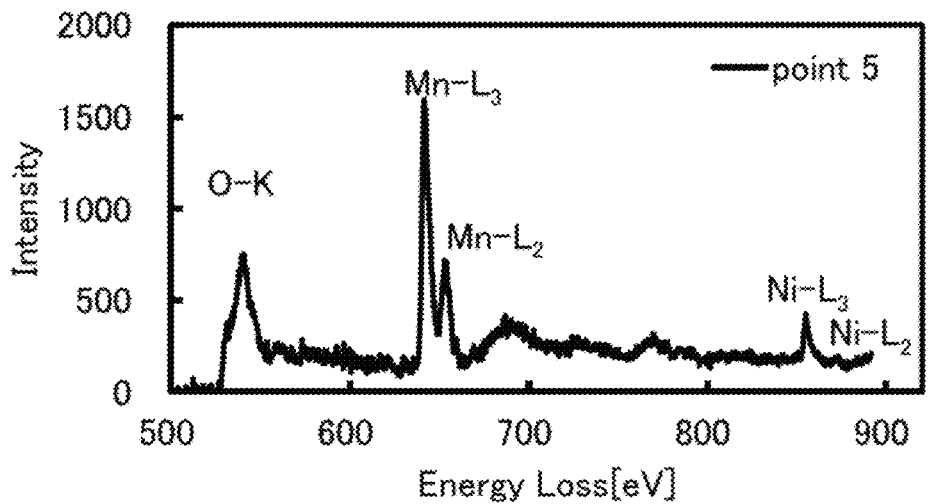
Figure 7A:
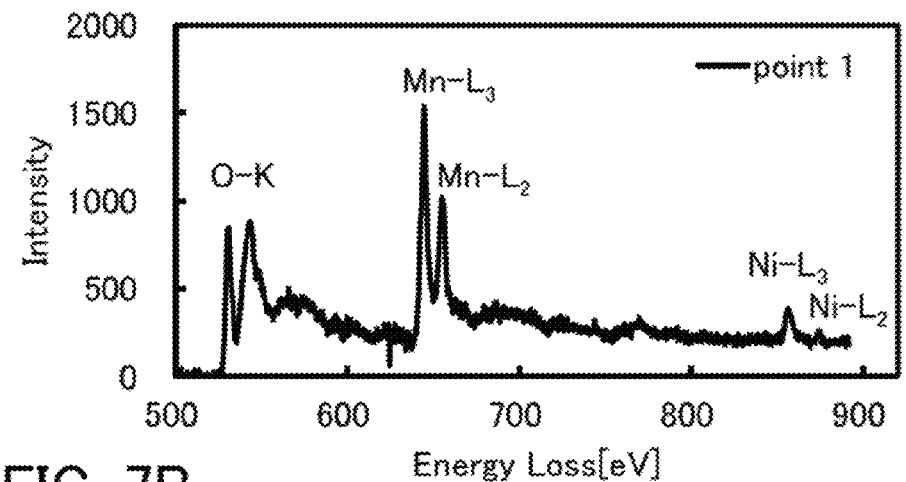
FIGS. 7A to 7C are graphs showing the measurement results of electron energy loss spectroscopy.
Figure 7B:
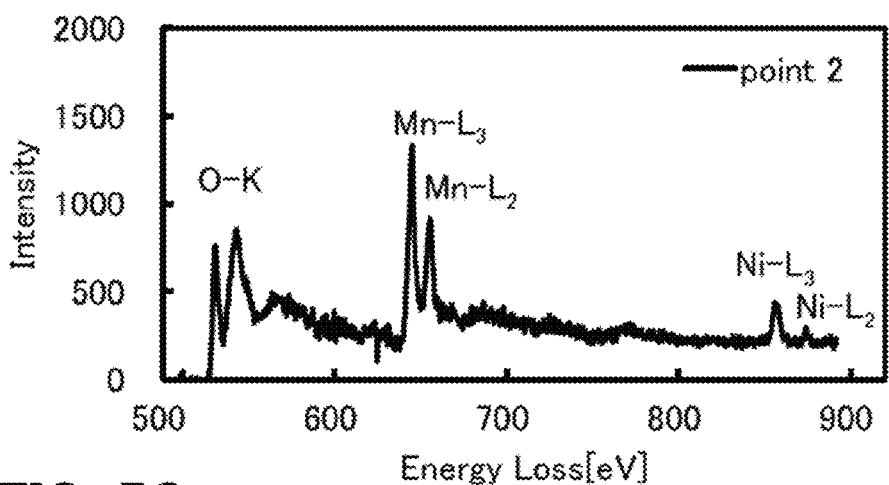
Figure 7C:
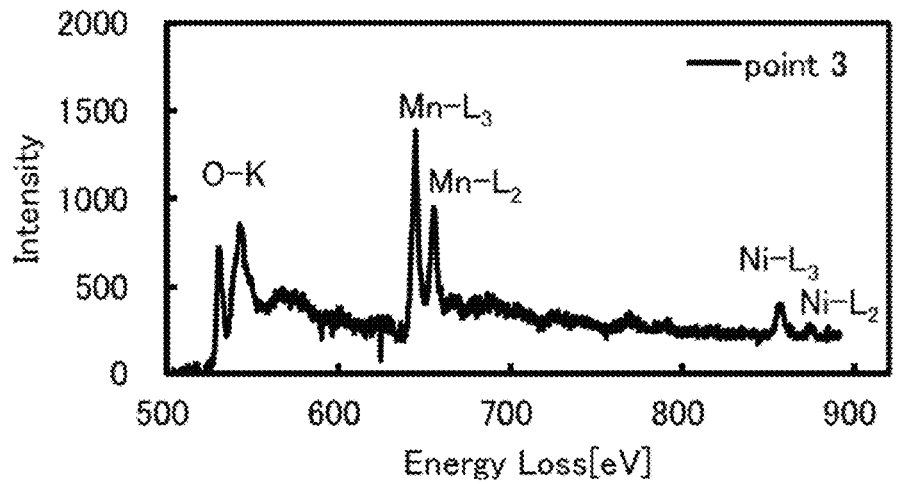
Figure 8A:
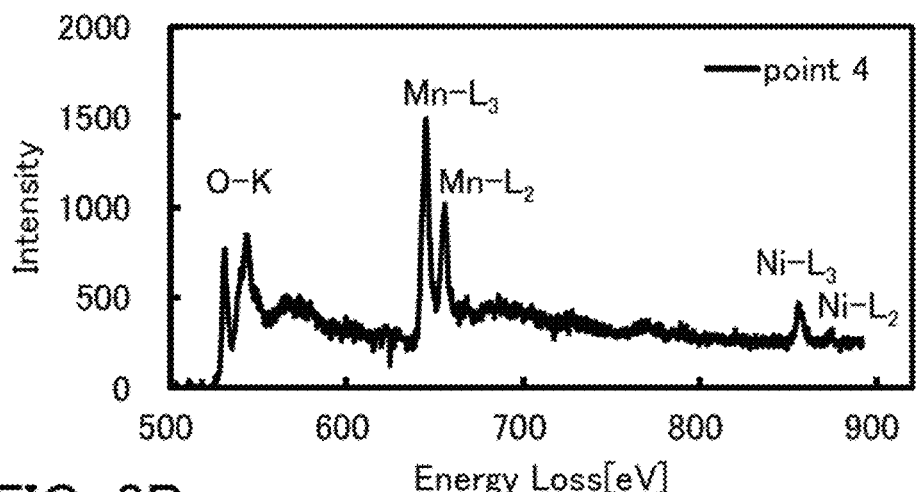
FIGS. 8A to 8C are graphs showing the measurement results of electron energy loss spectroscopy.
Figure 8B:
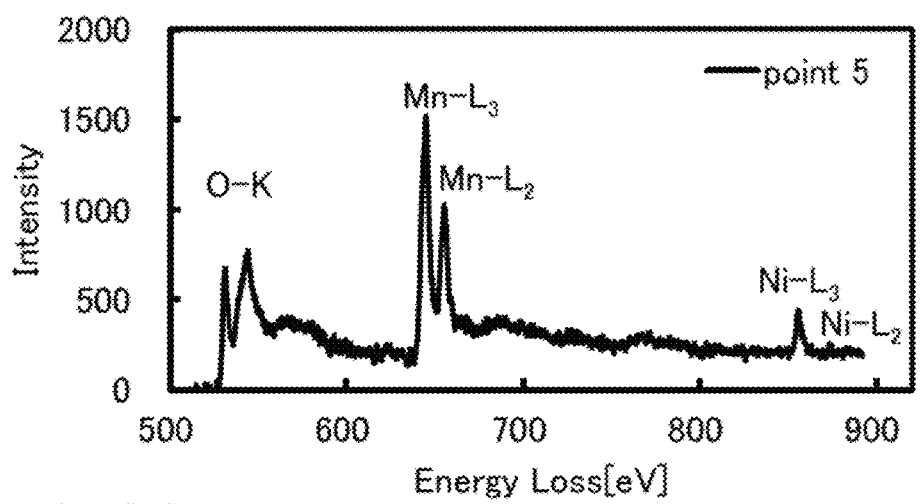
Figure 8C:
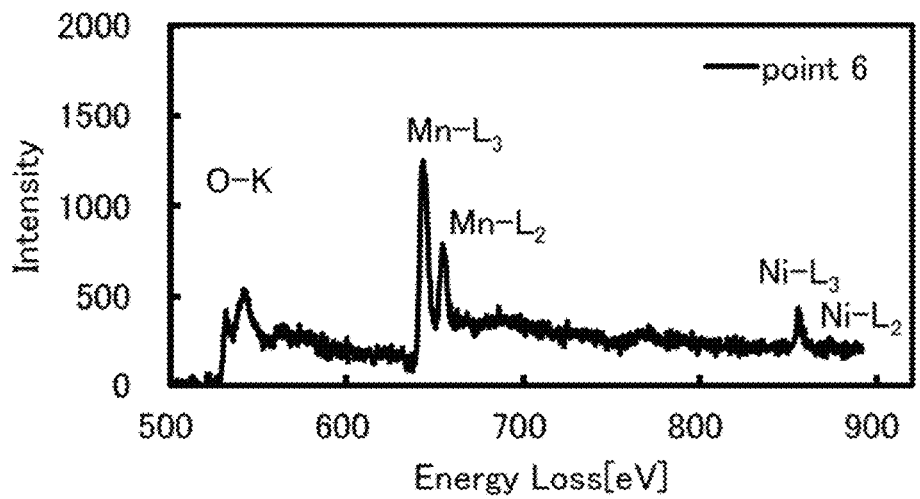
Figure 9A:
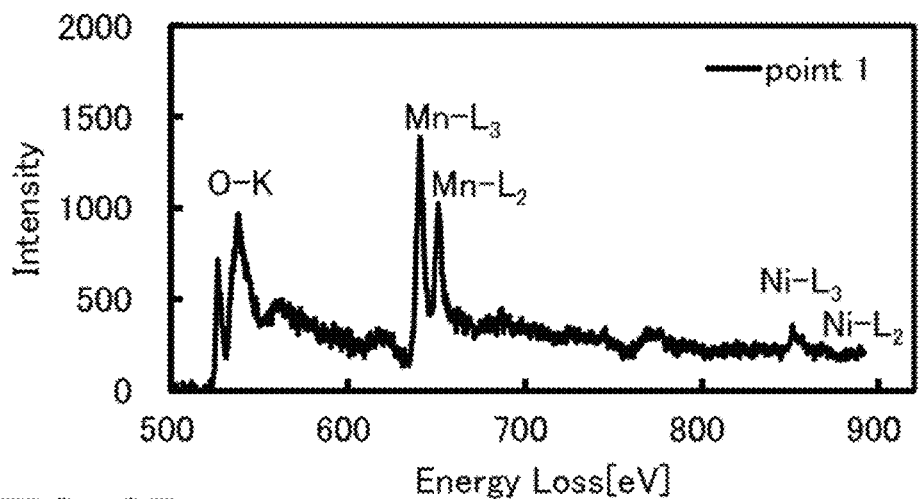
FIGS. 9A to 9C are graphs showing the measurement results of electron energy loss spectroscopy.
Figure 9B:
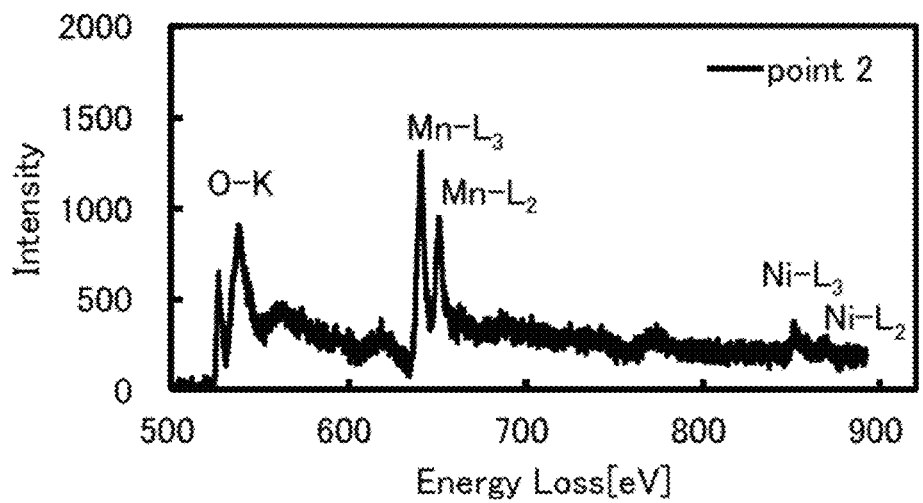
Figure 9C:
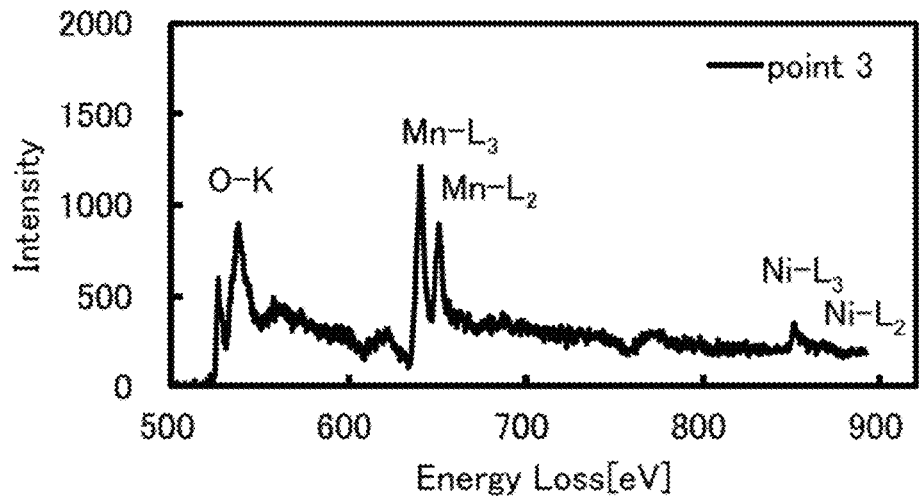
Figure 10A:
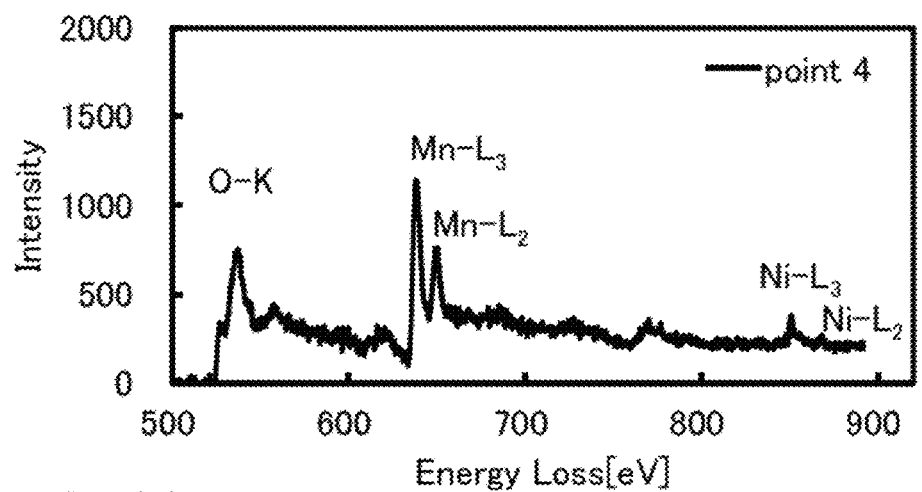
FIGS. 10A to 10C are graphs showing the measurement results of electron energy loss spectroscopy.
Figure 10B:
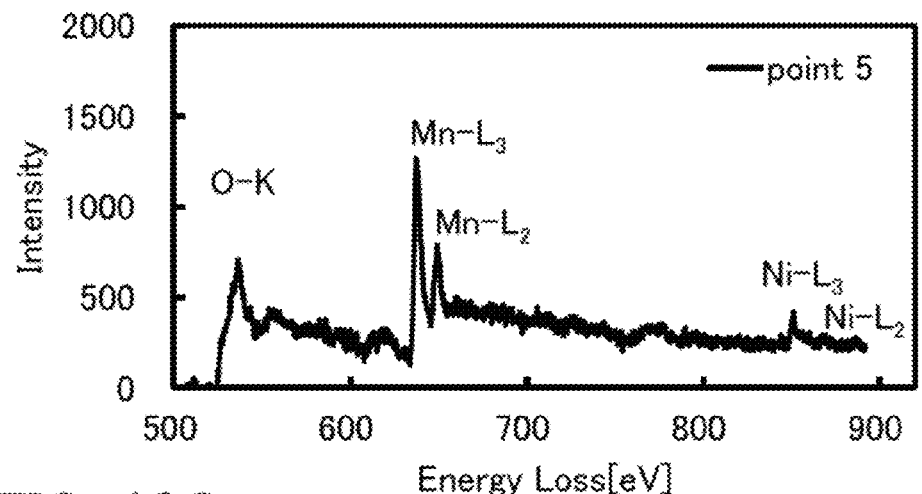
Figure 10C:
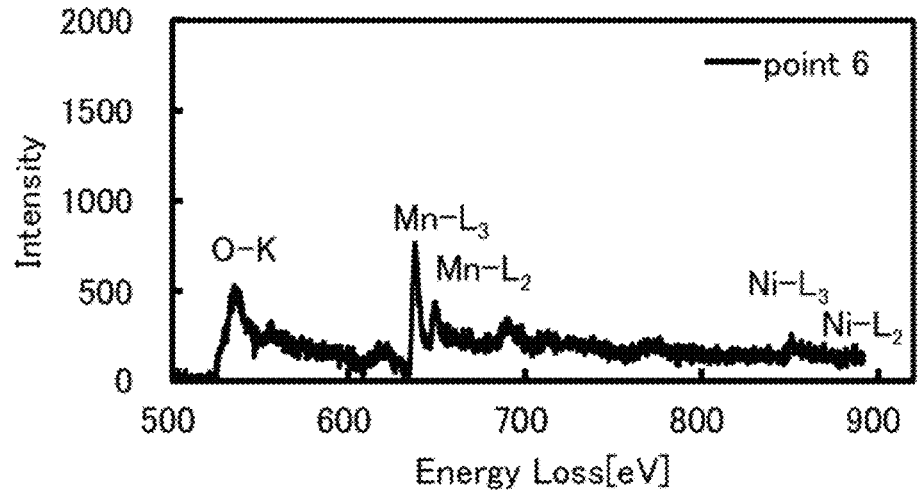
Figure 11A:
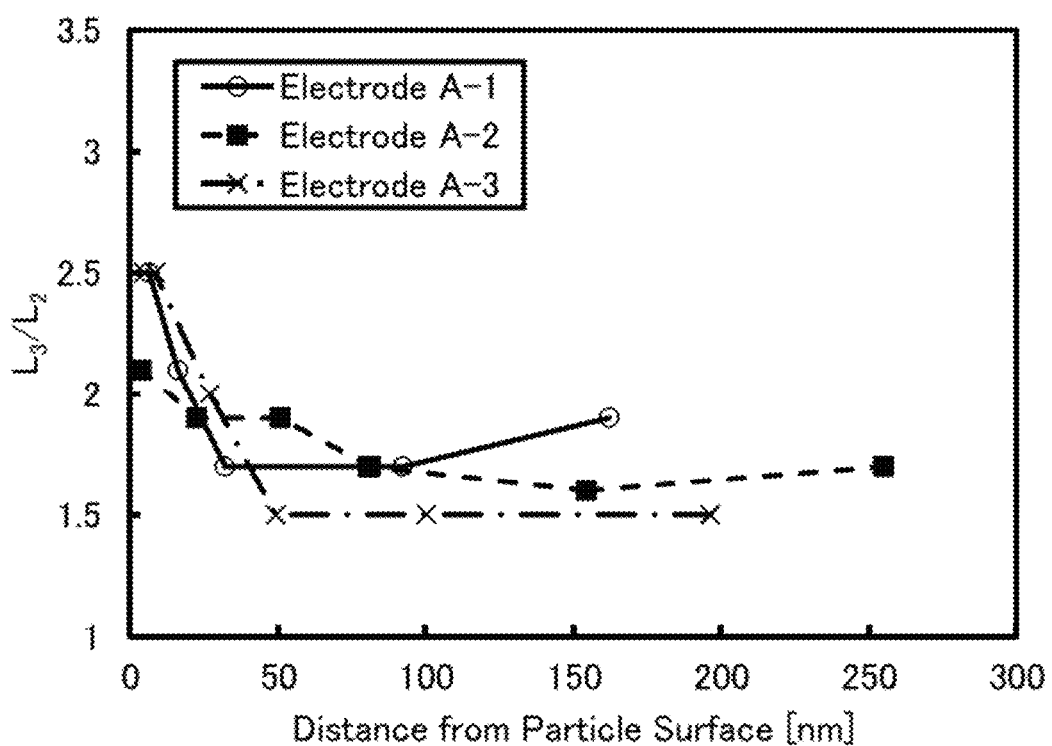
FIGS. 11A and 11B are graphs showing the measurement results of electron energy loss spectroscopy.
Figure 11B:
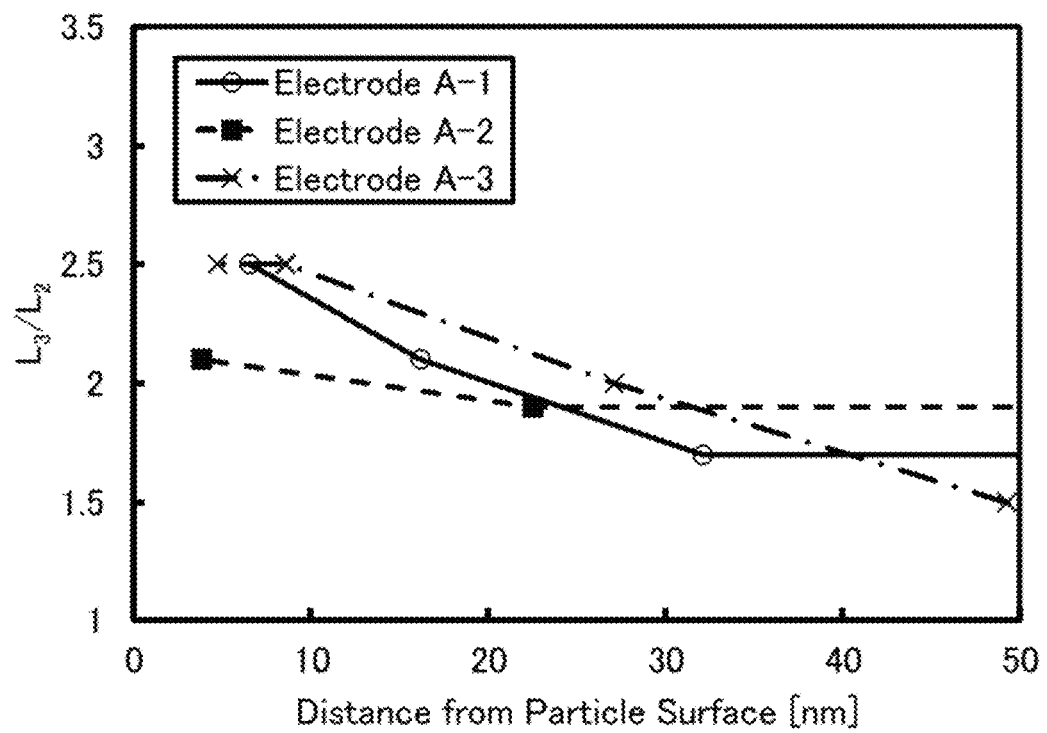

The EELS measurement results are shown in FIGS. 5A to 5C, FIGS. 6A and 6B, FIGS. 7A to 7C, FIGS. 8A to 8C, FIGS. 9A to 9C, and FIGS. 10A to 10C. FIGS. 5A, 5B, and 5C are the EELS measurement results of the point 1, the point 2, and the point 3, respectively, in the TEM observation photograph of the electrode A-1 of FIG. 1. FIGS. 6A and 6B are the EELS measurement results of the point 4 and the point 5, respectively, in the TEM observation photograph of the electrode A-1 of FIG. 1. FIGS. 7A, 7B, and 7C are the EELS measurement results of the point 1, the point 2, and the point 3, respectively, in the TEM observation photograph of the electrode A-2 of FIG. 2. FIGS. 8A, 8B, and 8C are the EELS measurement results of the point 4, the point 5, and the point 6, respectively, in the TEM observation photograph of the electrode A-2 of FIG. 2. FIGS. 9A, 9B, and 9C are the EELS measurement results of the point 1, the point 2, and the point 3, respectively, in the TEM observation photograph of the electrode A-3 of FIG. 3. FIGS. 10A, 10B, and 10C are the EELS measurement results of the point 4, the point 5, and the point 6, respectively, in the TEM observation photograph of the electrode A-3 of FIG. 3. FIGS. 11A and 11B show the ratio of the integral intensity of $L_3$ peak to the integral intensity of $L_2$ peak ($L_3/L_2$) of manganese on the vertical axis and the distance from the particle surface on the horizontal axis. The background was removed using a Hartree-Slater cross section in calculating $L_3/L_2$.

The results in FIGS. 11A and 11B are described. First, regions 9 nm or less from the particle surface are focused. The $L_3/L_2$ of manganese of each of the electrode A-1 and the electrode A-3 was approximately 2.5; accordingly, the valence number of manganese of each of the electrode A-1 and the electrode A-3 is estimated to be higher than or equal to 8/3 and lower than or equal to 3 according to Non-Patent Documents 1 and 2. In contrast, the $L_3/L_2$ of manganese of the electrode A-2 which had been subjected to charging was approximately 2.1; accordingly, the valence number of manganese of the electrode A-2 is estimated to be higher than or equal to 3 and lower than 4. Therefore, it is indicated that the valence number of manganese increased, that is, an oxidation reaction occurred in charging, and that the valence number of manganese decreased, that is, a reduction reaction occurred in discharging.

Note that there is a possibility that the valence number of nickel increases and lithium is released in charging and that the valence number of nickel decreases and lithium is inserted in discharging, although a change in the valence number of nickel is not calculated from the EELS measurement results here because of a weak peak derived from nickel in EELS.

Here, the composition of the lithium manganese oxide particle is represented by $Li_aMn_bNi_cO_d$. An example in which a charging reaction is caused by a change in the valence number of manganese and a change in the valence number of nickel is expressed by Chemical Reaction Formula 5, and an example in which a discharging reaction is caused by a change in the valence number of manganese and a change in the valence number of nickel is expressed by Chemical Reaction Formula 6.

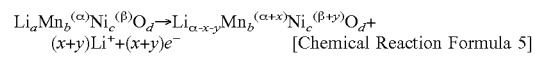

$$Li_aMn_b^{(\alpha)}Ni_c^{(\beta)}O_d \rightarrow Li_{\alpha-x-y}Mn_b^{(\alpha+x)}Ni_c^{(\beta+y)}O_d + (x+y)Li^+ + (x+y)e^- \quad \text{[Chemical Reaction Formula 5]}$$

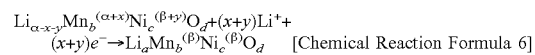

$$Li_{\alpha-x-y}Mn_b^{(\alpha+x)}Ni_c^{(\beta+y)}O_d + (x+y)Li^+ + (x+y)e^- \rightarrow Li_aMn_b^{(\beta)}Ni_c^{(\beta)}O_d \quad \text{[Chemical Reaction Formula 6]}$$

In Chemical Reaction Formulae 5 and 6, α and β represent the valence number of manganese and the valence number of nickel, respectively, before charging. Furthermore, a, b, c, d, x, and y satisfy a>0, b>0, c>0, d>0, x>0, y>0, and a>x+y>0. When the reactions expressed by Chemical Reaction Formulae 5 and 6 occur, the valence numbers of Mn and Ni increase in charging and the valence numbers of Mn and Ni decrease in discharging.

Meanwhile, when regions 49 nm or more from the particle surface are focused, the $L_3/L_2$ of manganese of the electrode A-3 is less than the $L_3/L_2$ of manganese of the electrode A-2, which means that the $L_3/L_2$ of manganese decreases through discharging. In other words, the valence number of manganese probably increases. Accordingly, in the reaction expressed by Chemical Reaction Formula 6, a reduction reaction of Mn could hardly occur. There is a possibility that, at least in discharging, a reaction of an element other than manganese, for example, a reduction reaction of nickel, is dominant in a battery reaction. Alternatively, it is suggested that a reaction other than the one expressed by Chemical Reaction Formula 6, such as charge compensation by another atom, contributes to the battery reaction.

The high capacity was obtained with the sample 1 formed in Example 1, that is, with the lithium manganese oxide particle of one embodiment of the present invention.

Example 3

In this example, described are the results of X-ray absorption near edge structure (XANES) analysis and extended X-ray absorption fine structure (EXAFS) analysis of a lithium manganese oxide particle of one embodiment of the present invention.

[Synthesis of Lithium Manganese Complex Oxide]

First, a lithium manganese oxide particle of one embodiment of the present invention, which is the sample C, was formed. Starting materials $Li_2CO_3$, $MnCO_3$, and NiO were weighed so that the molar ratio of $Li_2CO_3$ to $MnCO_3$ and NiO was 0.84:0.8062:0.318. To form the comparative sample B, starting materials $Li_2CO_3$ and $MnCO_3$ were weighed so that the molar ratio of $Li_2CO_3$ to $MnCO_3$ was 1:1.

Next, acetone was added to the powder of these materials, and then, they were mixed in a ball mill to prepare mixed powder.

After that, heating was performed to volatilize acetone, so that a mixed material was obtained.

Then, the mixed material was put into a crucible, and was fired at 1000° C. for 10 hours in the air at a flow rate of 10 L/min.

Subsequently, grinding was performed to separate the sintered particles. For the grinding, acetone was added and then ball milling was performed.

After the grinding, heating was performed to volatilize acetone, and then, vacuum drying was performed. Through the above process, the sample C was obtained.

[Formation of Electrode]

Electrodes were formed using the sample C. The sample C, PVdF, and AB were mixed with NMP as a polar solvent to form slurry. The weight ratio of the sample C to PVdF and AB was 80:15:5 (weight %).

A current collector covered with an undercoat was prepared. The slurry was applied on the current collector covered with the undercoat and dried. Then, 12 electrodes (the electrodes C-1 to C-12) were stamped out from the sheet of the current collector.

[Formation of Cell]

Half cells were formed using the electrodes C-1 to C-12. Metallic lithium was used for each counter electrode.

An electrolytic solution was formed by dissolving $LiPF_6$ as a salt in a mixed solution containing ethylene carbonate and diethyl carbonate, which are aprotic organic solvents, at a volume ratio of 1:1. As the separator, polypropylene (PP) was used.

[Discharge Characteristics Evaluation]

Neither charging nor discharging was performed on the electrodes C-1 and C-6 (before charge). Charging was performed on the electrodes C-2 and C-7 only once (1st charge). Charging and discharging were performed on the electrodes C-3 and C-8 once (1st discharge). Note that the phrase "charging and discharging" means that discharging is performed after charging. On the electrodes C-4 and C-9, charging and discharging were performed twice and then charging was performed once more (3rd charge). Charging and discharging were performed on the electrodes C-5 and C-10 three times (3rd discharge). In the above operations, charging was performed at a constant current with a current density of 30 mA/g until the voltage reached a termination voltage of 4.8 V, and discharging was performed at a constant current with a current density of 30 mA/g until the voltage reached an end voltage of 2.0 V. The current density represented a value per weight of a positive electrode active material. Charging and discharging were performed at 25° C. The electrode C-11 were subjected to charging of 50 mAh/g at a constant current with the same current density as above (step 1), and the electrode C-12 were subjected to charging of 200 mAh/g in the same manner (step 2).

The charge capacity of the half cell including the electrode C-7 was 296 mAh/g. The charge capacity of the half cell including the electrode C-8 was 290 mAh/g and the discharge capacity thereof was 207 mAh/g. The charge capacity and discharge capacity here each represented a value per weight of a positive electrode active material.

Next, in a controlled atmosphere, each of the cells was disassembled, and each electrode was wrapped with a laminate film and then sealed. Then, XANES analysis and EXAFS analysis were performed by a transmission method. A film in which aluminum is covered with a resin was used as the laminate film.

[XANES Analysis]

Figure 33:
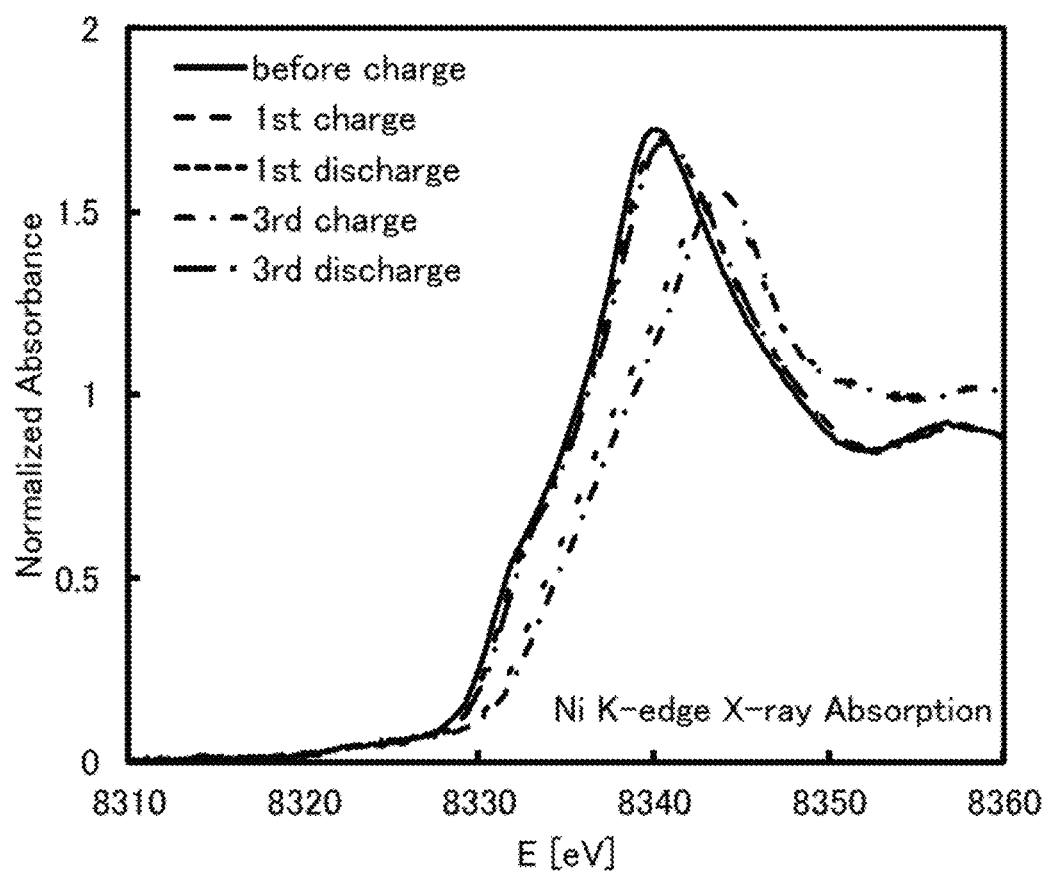
FIG. 33 is a graph showing the results of XANES analysis.
Figure 34:
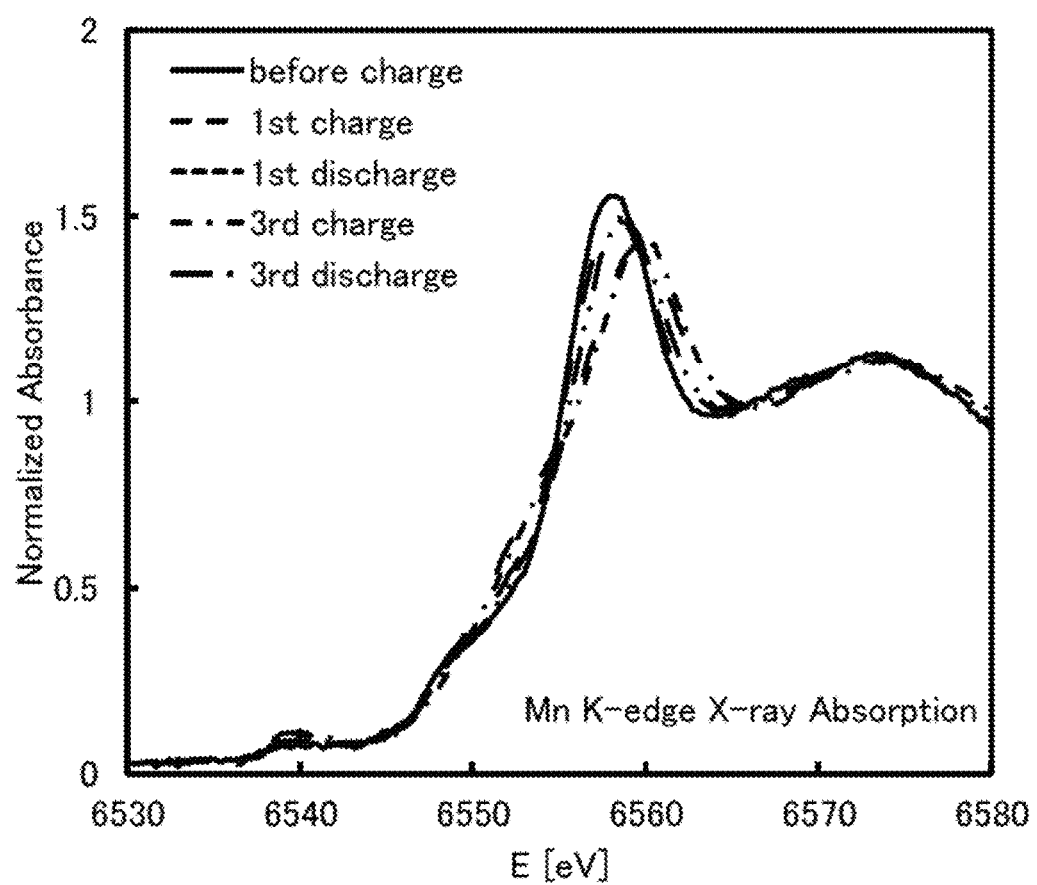
FIG. 34 is a graph showing the results of XANES analysis.

FIG. 33 shows the measurement results of Ni K-edge X-ray absorption spectra of the electrodes C-6 to C-10. FIG. 34 shows the measurement results of Mn K-edge X-ray absorption spectra of the electrodes C-1 to C-5.

Figure 35:
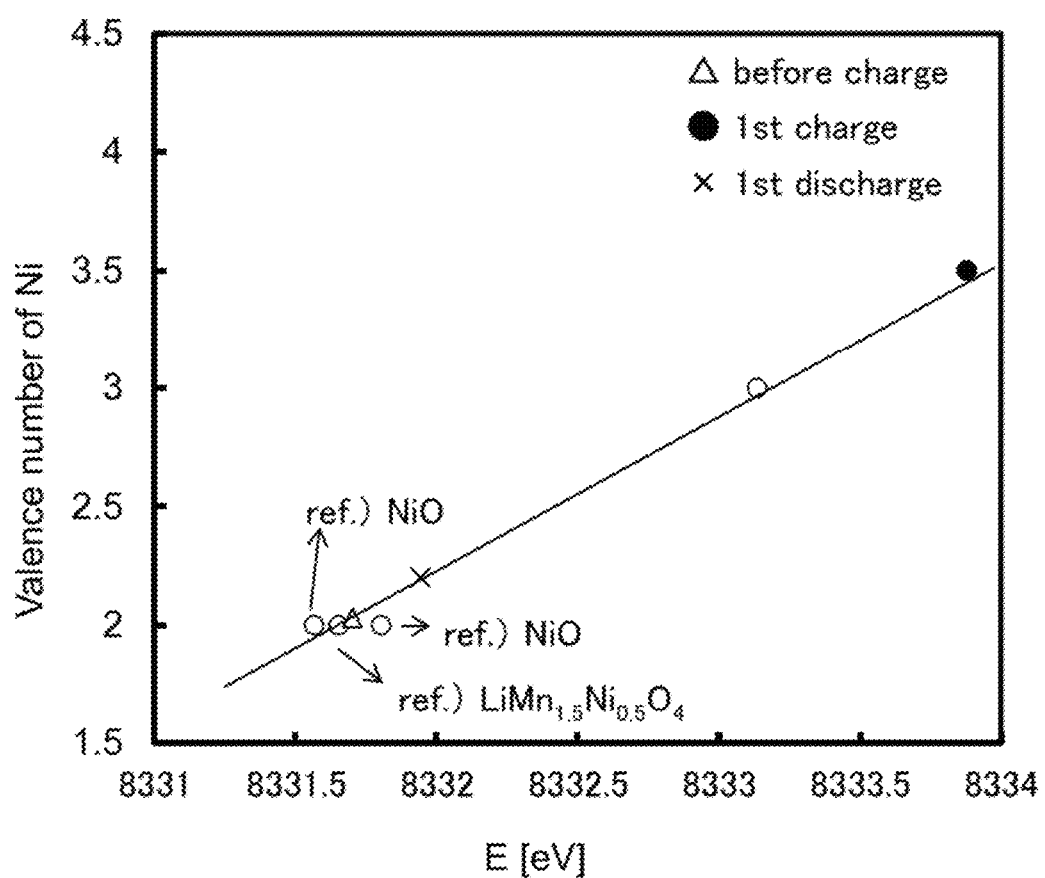
FIG. 35 is a graph showing the results of XANES analysis.

The Ni K-edges of standard samples NiO, $LiMn_{1.5}Ni_{0.5}O_4$, and $LiNiO_2$ were measured and plotted on FIG. 35. In FIG. 35, the horizontal axis indicates the energy position of Ni K-shell absorption edge and the vertical axis indicates the valence of Ni. Then, the valence numbers of Ni in the electrodes C-6 to C-10 were calculated on the basis of the obtained approximation straight line. An obtained approximation curve and the measurement results of three points of each electrode are shown in FIG. 35.

As shown in FIG. 35, the valence number of Ni of the electrode C-6 (before charge) was approximately 2.0, the valence number of Ni of the electrode C-7 (after 1st charge) was approximately 3.5, and the valence number of Ni of the electrode C-8 (after 1st discharge) was approximately 2.2. The valence number of Ni of the electrode C-9 (after 3rd charge) was approximately 3.9, and the valence number of Ni of the electrode C-10 (after 3rd discharge) was approximately 2.3.

Figure 36:
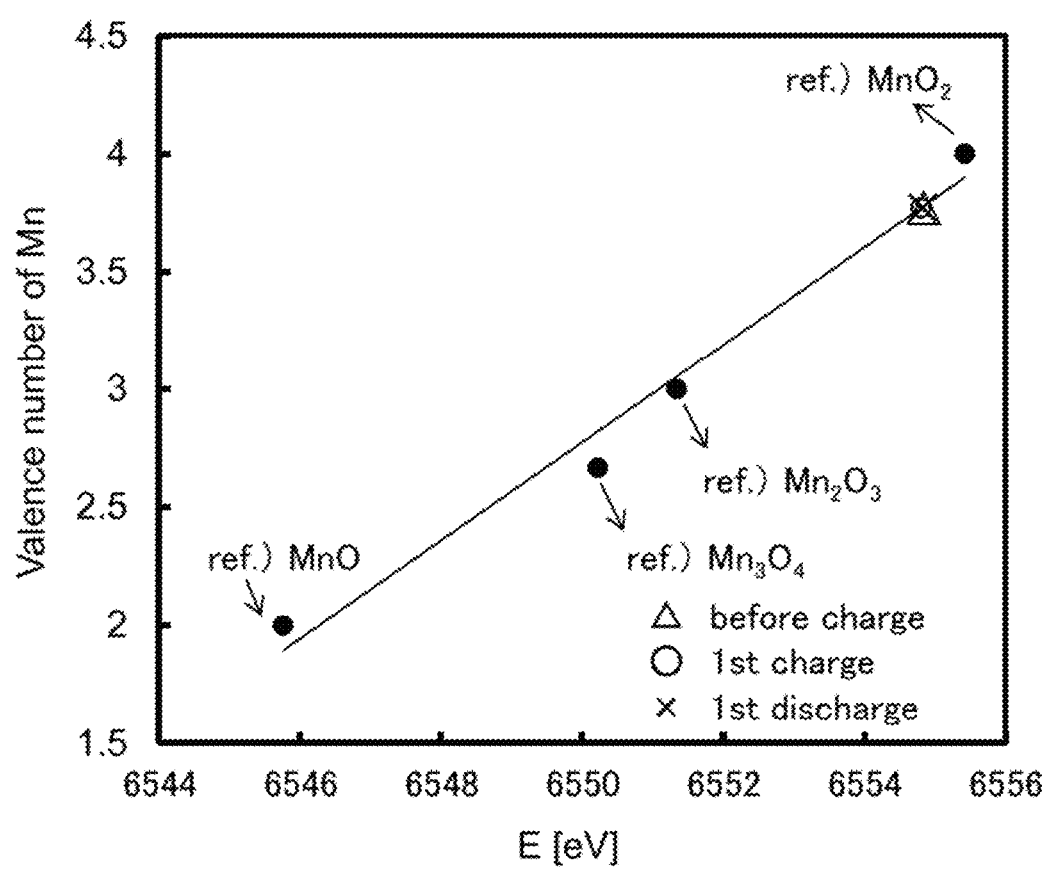
FIG. 36 is a graph showing the results of XANES analysis.

The valences of Mn were also calculated from the results of the electrodes C-1 to C-5. MnO, $Mn_3O_4$, $Mn_2O_3$, and $MnO_2$ were used as standard samples. In FIG. 36, the horizontal axis indicates the energy position of Mn K-shell absorption edge and the vertical axis indicates the valence of Mn, and the results were plotted. A change in the valence numbers of Mn of the electrodes C-1 to C-5 is small and the valence number is estimated to be approximately 3.8.

Next, the measurement results of Ni L-edge X-ray absorption spectra are described.

Ni L-edge X-ray absorption spectra of the electrodes C-1 to C-3, C-11, and C-12 were measured. In XANES measurement, data of a surface of the lithium manganese oxide particle was obtained by a total electron yield (TEY) method, and data of bulk of the lithium manganese oxide particle was obtained by a partial fluorescent yield (PFY) method.

Figure 37A:
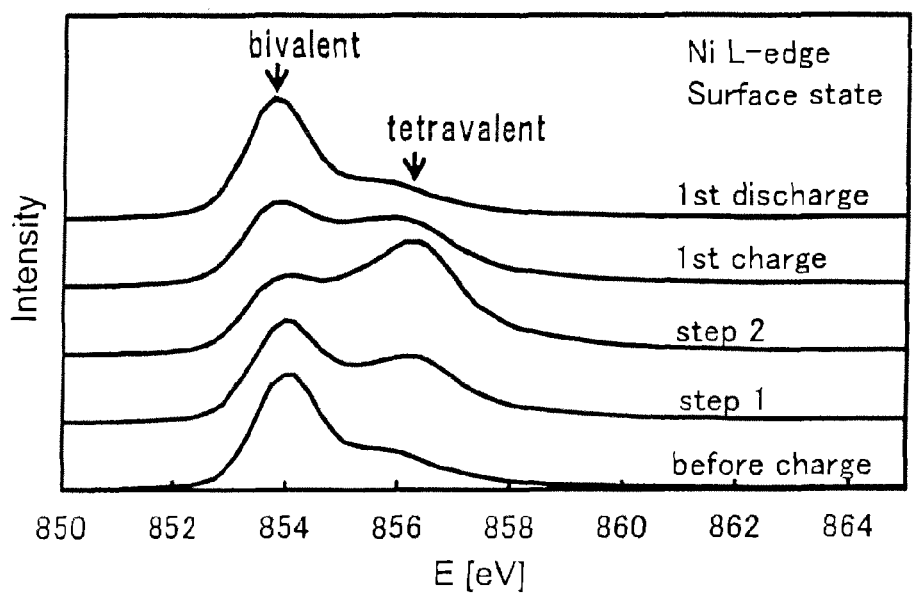
FIGS. 37A and 37B are graphs showing the results of XANES analysis.
Figure 37B:
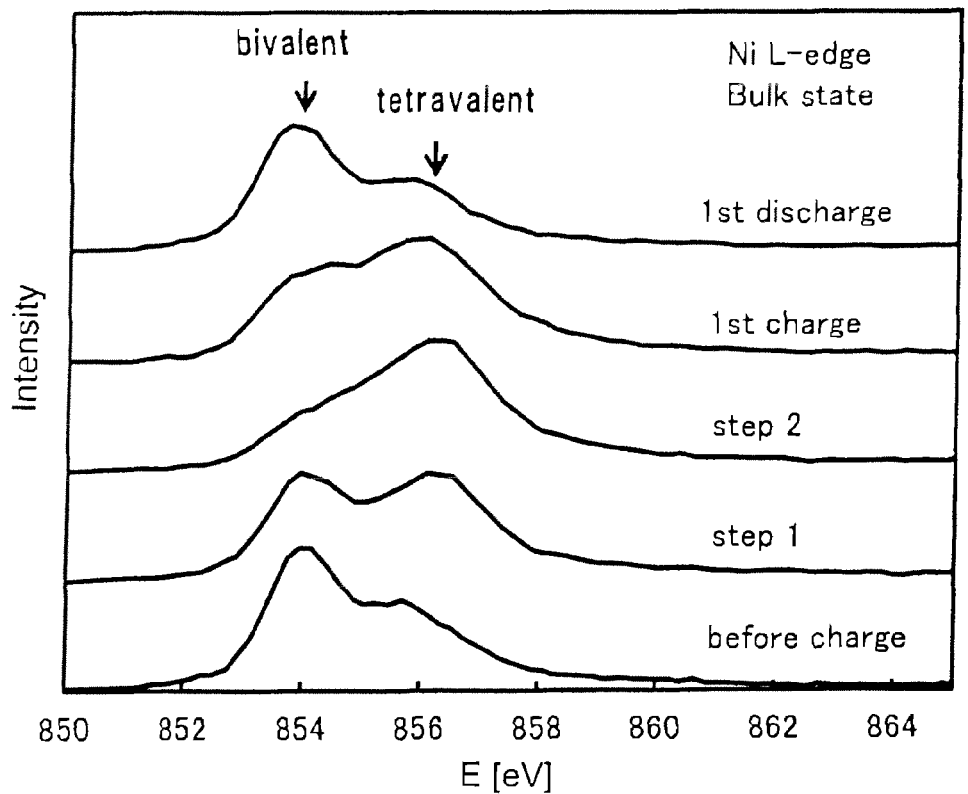

FIG. 37A shows the Ni L-edge spectra obtained by a TEY method, and FIG. 37B shows the Ni L-edge spectra obtained by a PFY method.

As shown in FIGS. 37A and 37B, peaks around 854 eV correspond to bivalent Ni and peaks around 856 eV correspond to quadrivalent Ni.

In both the surface and the bulk, the peaks of bivalent Ni decreased and the peaks of quadrivalent Ni increased from the start of charging to the end of the step 2. In other words, the valence number of Ni showed the tendency to increase. Furthermore, at the end of charging, the valence number decreased as compared to that at the end of the second step and the peak intensity was substantially equivalent to that at the end of the step 1.

The valence number further decreased through discharging, and the peak intensity after discharging was substantially equivalent to that before charging.

The above results show that an oxidation reaction occurs because of an increase in the valence number of Ni in the process of charging, which is accompanied by release of lithium. In contrast, the valence number of Ni decreases after the end of the second step; therefore, the charging process after the end of the second step might not be described by only release of lithium due to an oxidation reaction.

The peak of bivalence tends to be stronger in the data of the surface than in the data of the bulk. Accordingly, it is assumed that the valence number of Ni of the surface of the obtained lithium manganese composite oxide particle is lower than that of the inside.

[EXAFS Analysis]

Figure 38A:
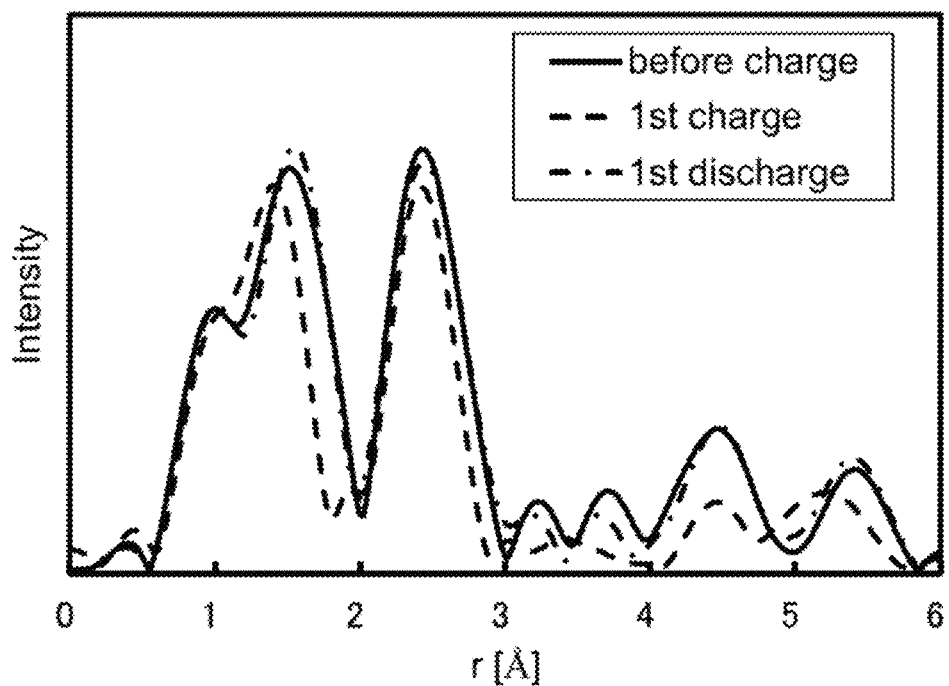
FIGS. 38A and 38B are graphs showing the results of EXAFS analysis.
Figure 38B:
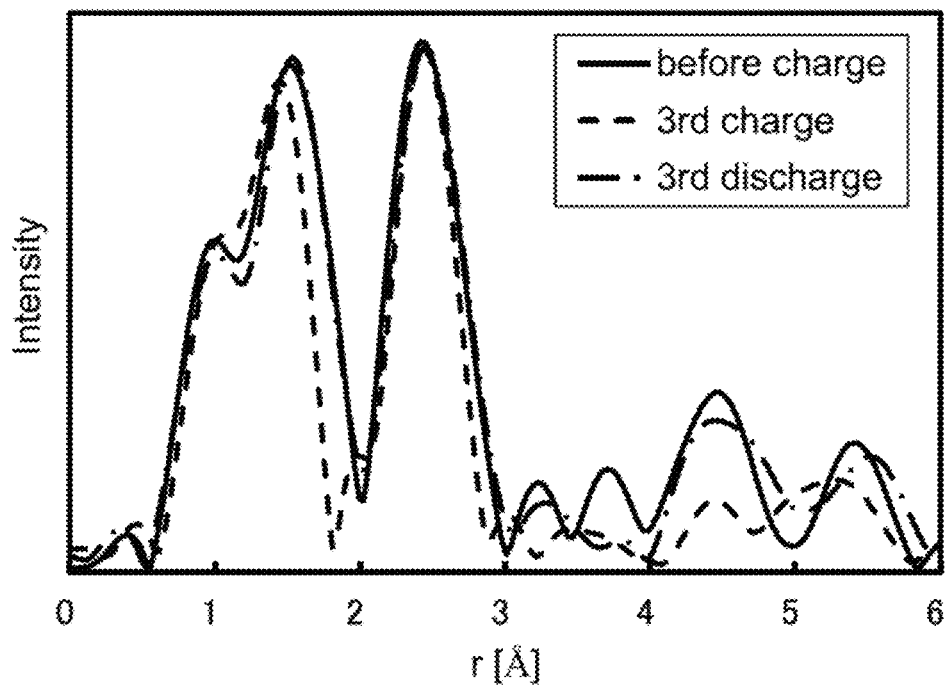
Figure 39A:
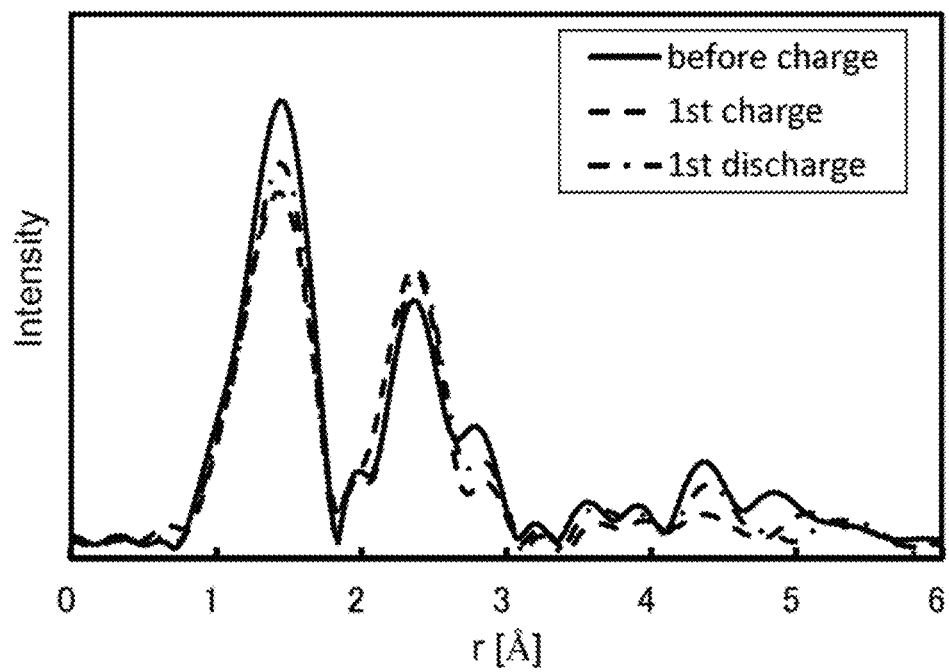
FIGS. 39A and 39B are graphs showing the results of EXAFS analysis.
Figure 39B:
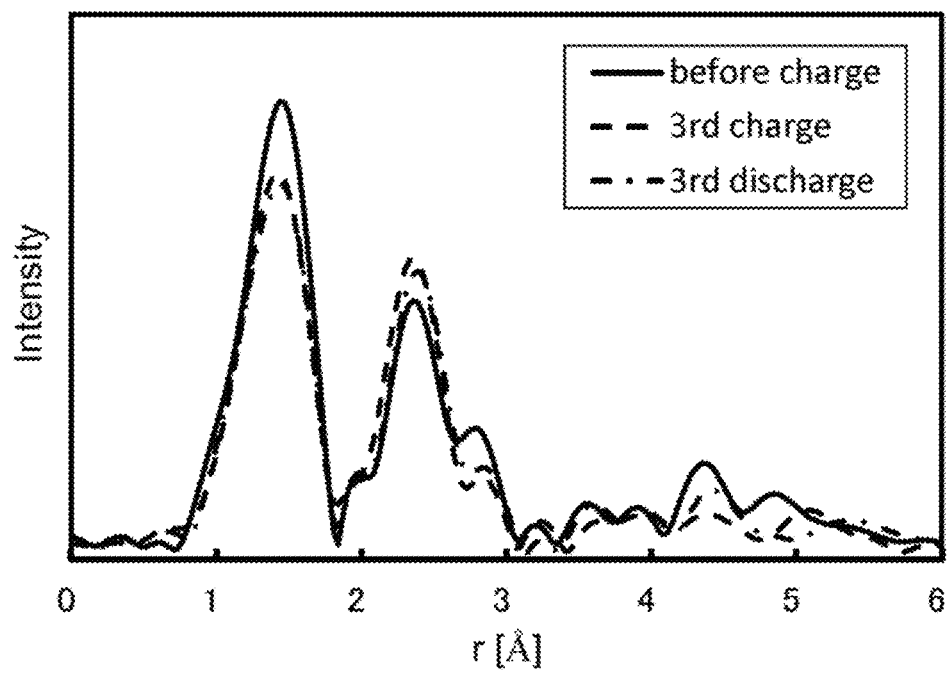

Next, EXAFS analysis was performed. FIG. 38A shows the results of analyzing EXAFS amplitudes of Ni K-shell edges of the electrodes C-6 to C-8. FIG. 38B shows the analysis results of the electrodes C-6, C-9, and C-10. FIGS. 39A and 39B show the results of analyzing the EXAFS amplitudes of Mn K-shell edges of the electrodes C-1 to C-5.

Analysis processes of FIGS. 38A and 38B and FIGS. 39A and 39B are explained. Assume that the energy position of the absorption edge is $E_0$ and the mass of electron is m, the relation between E of the horizontal axis of FIG. 33 and k is expressed by Formula 1 using $E_0$ and m.

$$\hbar^2 k^2/2m = E - E_0 \qquad \text{[Formula 1]}$$

Next, the background is removed from the absorbance of X-ray, and the amplitude of the absorbance derived from an atom near a Mn atom or a Ni atom is calculated. FIGS. 38A and 38B and FIGS. 39A and 39B each show Fourier transform of the EXAFS amplitude with respect to the electron wave number k, which show distribution of atoms existing at a distance R from Mn or Ni.

The nearest neighbor atom of a Ni atom is probably an O atom. In FIGS. 38A and 38B, the first peak is shifted to the short distance side after 1st charge and 3rd charge, which indicates that the Ni—O bond length in this state is shorter than that in other states.

The Ni—O bond length was calculated quantitatively. The Ni—O bond length in the electrode C-6 (before charge) was 2.02 Å, the Ni—O bond length in the electrode C-7 (after 1st charge) was 1.88 Å, the Ni—O bond length in the electrode C-8 (after 1st discharge) was 2.03 Å, the Ni—O bond length in the electrode C-9 (after 3rd charge) was 1.89 Å, and the Ni—O bond length in the electrode C-10 (after 3rd discharge) was 2.03 Å.

Then, EXAFS analysis of Mn was performed on the electrodes C-1 to C-5 to calculate the Mn—O bond lengths. In each of the electrodes C-1 to C-5, the bond length was approximately 1.9 Å, which suggests that a change in the Mn—O bond length due to charging and discharging is small.

As described above, through charging, the valence number of Ni increased to approximately 3.5 or more and the Ni—O bond length decreased to 1.9 or less, whereas through discharging, the valence number of Ni decreased and the Ni—O bond length increased. Furthermore, it is indicated that the valence number of Ni slightly increases by repeated charging and discharging. In contrast, it is indicated that a change in the valence number of Mn is smaller than a change in the valence number of Ni and that a change in the Mn—O bond length is also small. Accordingly, Ni is considered to mainly take part in oxidation-reduction reactions in charging and discharging.

REFERENCE NUMERALS

101: first region, 102: second region, 201: lithium manganese oxide particle, 202: acetylene black (AB), 300: storage battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 400: storage battery, 402: positive electrode, 404: negative electrode, 500: storage battery, 501: positive electrode current collector, 502: positive electrode active material layer, 503: positive electrode, 504: negative electrode current collector, 505: negative electrode active material layer, 506: negative electrode, 507: separator, 508: electrolytic solution, 509: exterior body, 510: positive electrode lead electrode, 511: negative electrode lead electrode, 512: welding region, 513: bent portion, 514: sealing member, 600: storage battery, 601: positive electrode cap, 602: battery can, 603: positive electrode terminal, 604: positive electrode, 605: separator, 606: negative electrode, 607: negative electrode terminal, 608: insulating plate, 609: insulating plate, 610: gasket, 611: PTC element, 612: safety valve mechanism, 900: circuit board, 910: label, 911: terminal, 912: circuit, 913: storage battery, 914: antenna, 915: antenna, 916: layer, 917: layer, 918: antenna, 919: terminal, 920: display device, 921: sensor, 922: terminal, 951: terminal, 952: terminal, 981: film, 982: film, 990: power storage device, 991: exterior body, 992: exterior body, 993: wound body, 994: negative electrode, 995: positive electrode, 996: separator, 997: lead electrode, 998: lead electrode, 1700: curved surface, 1701: plane, 1702: curve, 1703: radius of curvature, 1704: center of curvature, 1800: center of curvature, 1801: film, 1802: radius of curvature, 1803: film, 1804: radius of curvature, 7100: portable display device, 7101: housing, 7102: display portion, 7103: operation button, 7104: power storage device, 7200: portable information terminal, 7201: housing, 7202: display portion, 7203: band, 7204: buckle, 7205: operation button, 7206: input/output terminal, 7207: icon, 7300: display device, 7304: display portion, 7400: mobile phone, 7401: housing, 7402: display portion, 7403: operation button, 7404: external connection port, 7405: speaker, 7406: microphone, 7407: power storage device, 8000: display device, 8001: housing, 8002: display portion, 8003: speaker portion, 8004: power storage device, 8021: charging apparatus, 8022: cable, 8024: power storage device, 8100: lighting device, 8101: housing, 8102: light source, 8103: power storage device, 8104: ceiling, 8105: wall, 8106: floor, 8107: window, 8200: indoor unit, 8201: housing, 8202: air outlet, 8203: power storage device, 8204: outdoor unit, 8300: electric refrigerator-freezer, 8301: housing, 8302: door for a refrigerator, 8303: door for a freezer, 8304: power storage device, 8400: automobile, 8401: headlight, 8500: automobile, 9600: tablet terminal, 9625: switch, 9626: switch, 9627: power switch, 9628: operation switch, 9629: fastener, 9630: housing, 9630*a*: housing, 9630*b*: housing, 9631: display portion, 9631*a*:

display portion, 9631*b*: display portion, 9632*a*: region, 9632*b*: region, 9633: solar cell, 9634: charge and discharge control circuit, 9635: storage battery, 9636: DC-DC converter, 9637: converter, 9638: operation key, 9639: button, and 9640: movable portion.

This application is based on Japanese Patent Application serial no. 2013-247345 filed with Japan Patent Office on Nov. 29, 2013, and Japanese Patent Application serial no. 2014-212170 filed with Japan Patent Office on Oct. 17, 2014, the entire contents of which are hereby incorporated by reference.

The invention claimed is:

1. An active material particle comprising:
a first region; and
a second region,
wherein the active material particle is a primary particle,
wherein the second region is on an inner side of the first region,
wherein each of the first region and the second region comprises lithium manganese oxide comprising nickel,
wherein each composition of the first region and the second region is represented by $Li_aMn_bM_cO_d$,
wherein M is nickel,
wherein a, b, c and d each satisfy a>0, b>0, c>0 and d>0,
wherein a ratio of a number of oxygen atoms to a sum of a number of manganese atoms and nickel atoms in the first region is small as compared to that in the second region,
wherein a valence number of manganese in the first region is lower than a valence number of manganese in the second region,
wherein the valence number of manganese in the first region is higher than or equal to 1.5 and lower than or equal to 5,
wherein the valence number of manganese in the second region is higher than or equal to 2, and
wherein each of the valence number of manganese in the first region and the valence number of manganese in the second region is obtained by electron energy loss spectroscopy.

2. The active material particle according to claim 1, wherein the first region is within 30 nm of a surface of the active material particle.

3. The active material particle according to claim 1,
wherein a valence number of manganese in the active material particle is higher than or equal to 3.5,
wherein a valence number of nickel in the active material particle is lower than or equal to 3, and
wherein each of the valence number of manganese in the active material particle and the valence number of nickel in the active material particle is determined by X-ray absorption near edge structure spectroscopy.

4. The active material particle according to claim 1,
wherein a valence number of nickel in the first region is lower than a valence number of nickel in the second region, and
wherein each of the valence number of nickel in the first region and the valence number of nickel in the second region is obtained by electron energy loss spectroscopy.

5. The active material particle according to claim 1,
wherein a ratio of a number of lithium atoms to a sum of a number of manganese atoms and nickel atoms in the active material particle is greater than or equal to 0 and less than 2, and wherein a ratio of a number of nickel atoms to a number of manganese atoms in the active material particle is greater than or equal to 0.05 and less than or equal to 1.

6. A storage battery comprising the active material particle according to claim 1.

7. An electronic device comprising the storage battery according to claim 6.

8. An active material particle comprising:
a first region; and
a second region,
wherein the active material particle is a primary particle,
wherein the second region is on an inner side of the first region,
wherein each of the first region and the second region comprises lithium manganese oxide,
wherein each composition of the first region and the second region is represented by $Li_aMn_bM_cO_d$,
wherein M is nickel,
wherein a, b, c and d each satisfy a>0, b>0, c>0 and d>0,
wherein a ratio of a number of oxygen atoms to a sum of a number of manganese atoms and nickel atoms in the first region is small as compared to that in the second region,
wherein a valence number of manganese in the first region is lower than a valence number of manganese in the second region,
wherein the valence number of manganese in the first region is higher than or equal to 1.5 and lower than or equal to 5,
wherein the valence number of manganese in the second region is higher than or equal to 2,
wherein each of the valence number of manganese in the first region and the valence number of manganese in the second region is obtained by electron energy loss spectroscopy,
wherein in the first region, a ratio of the integral intensity of $L_3$ peak to the integral intensity of $L_2$ peak of manganese measured by electron energy loss spectroscopy is a first ratio,
wherein in the second region, a ratio of the integral intensity of $L_3$ peak to integral intensity of $L_2$ peak of manganese measured by electron energy loss spectroscopy is a second ratio, and
wherein the first ratio is greater than the second ratio.

9. The active material particle according to claim 8,
wherein the first ratio is greater than 1 and less than or equal to 10, and
wherein the second ratio is less than or equal to 4.

10. The active material particle according to claim 8, wherein the first region is within 30 nm of a surface of the active material particle.

11. The active material particle according to claim 8,
wherein a valence number of manganese in the active material particle is higher than or equal to 3.5,
wherein a valence number of nickel in the active material particle is lower than or equal to 3, and
wherein each of the valence number of manganese in the active material particle and the valence number of nickel in the active material particle is determined by X-ray absorption near edge structure spectroscopy.

12. The active material particle according to claim 8,
wherein a ratio of a number of lithium atoms to a sum of a number of manganese atoms and nickel atoms in the active material particle is greater than or equal to 0 and less than 2, and wherein a ratio of a number of the nickel atoms to a number of manganese atoms in the active material particle is greater than or equal to 0.05 and less than or equal to 1.

13. A storage battery comprising the active material particle according to claim 8.

14. An electronic device comprising the storage battery according to claim 13.

* * * * *